United States Patent
Yamamoto et al.

(10) Patent No.: US 6,529,506 B1
(45) Date of Patent: Mar. 4, 2003

(54) DATA PROCESSING APPARATUS AND DATA RECORDING MEDIA

(75) Inventors: Masaya Yamamoto, Katano (JP); Tomoyuki Nonomura, Osaka (JP); Masataka Minami, Burbank, CA (US); Masayuki Kozuka, Arcadia, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/414,726

(22) Filed: Oct. 8, 1999

(30) Foreign Application Priority Data

Oct. 8, 1998 (JP) .............................. 10-287086

(51) Int. Cl.[7] .................. H04L 12/28; G06K 9/00; H04N 7/173; G06F 11/30
(52) U.S. Cl. .................. 370/389; 370/469; 382/100; 713/176; 725/87; 725/98
(58) Field of Search .................. 725/87, 88, 98, 725/91, 109, 113, 144; 713/179, 178, 193, 201; 382/100, 202, 205, 232, 248; 370/348, 389, 470, 471, 486, 522; 348/461, 465, 467, 468; 380/202; 705/58, 53, 57

(56) References Cited

U.S. PATENT DOCUMENTS

| | | | | | |
|---|---|---|---|---|---|
| 5,933,798 | A | * | 8/1999 | Linnartz | 380/202 |
| 6,069,914 | A | * | 5/2000 | Cox | 375/130 |
| 6,243,481 | B1 | * | 6/2001 | Tao | 375/265 |
| 6,341,350 | B1 | * | 1/2002 | Miyahara et al. | 713/176 |
| 6,359,998 | B1 | * | 3/2002 | Cooklev | 382/100 |

FOREIGN PATENT DOCUMENTS

| | | |
|---|---|---|
| EP | 0 860 823 | 8/1998 |
| EP | 0860997 A2 | 8/1998 |
| EP | 0908881 A2 | 4/1999 |
| JP | 06268840 | 9/1994 |
| JP | 09191394 | 7/1997 |
| JP | 09191395 | 7/1997 |
| JP | 11-55639 | 2/1998 |
| JP | 10-294726 | 11/1998 |
| JP | 11-86436 | 3/1999 |
| WO | 00 67477 | 11/2000 |

OTHER PUBLICATIONS

Chio–Tung Hzu, et al., "Digital Watermarking for Video". Digital Signal Processings 13th International Conference, IEEE, Jul. 2–4, 1997, vol. 1, pp 217–220.*
Bors et al. "Image Watermarking Using DCT Domain Constraint", IEEE 1996, pp 231–234.*
Tao et al. "Adaptive Waterarking in the DCT Domain", Apr. 1997, Department of Engineering, Princeton University, Princeton, N.J.*

* cited by examiner

Primary Examiner—Alpus H. Hsu
Assistant Examiner—Afsar M. Qureshi
(74) Attorney, Agent, or Firm—Wenderoth, Lind & Ponack, L.L.P.

(57) ABSTRACT

A data processing apparatus is provided with a data obtaining unit which receives a network signal sn on a network N and obtains distributed audio data Dau in which copyright information or the like is embedded, and a control unit which obtains information indicating a watermarking method which has been used when embedding the copyright information or the like in the audio data. The embedded information is extracted by an appropriate watermarking method according to the obtained information indicating the used watermarking method. The extracted information is again embedded in the distributed audio data Dau by using a predetermined watermarking method, and thus obtained audio data is recorded on a recording medium. Therefore, regardless of the watermarking method used for embedding the copyright information or the like in the distributed audio data Dau, the distributed audio data Dau can be appropriately reproduced by reproduction apparatuses as domestic electrical equipment, according to the embedded information.

26 Claims, 21 Drawing Sheets

| first bit | second bit | used watermarking method |
|---|---|---|
| 0 | 0 | no information is embedded by watermarking |
| 0 | 1 | information is embedded by watermarking method A |
| 1 | 0 | information is embedded by watermarking method B |
| 1 | 1 | information is embedded by watermarking method C |

Ium

| first bit | second bit | used watermarking method |
|---|---|---|
| 0 | 0 | method A |
| 0 | 1 | method B |
| 1 | 0 | method C |
| 1 | 1 | method D | lum

Fig.16 (a)

| first bit | second bit | operation at recording |
|---|---|---|
| 0 | 0 | no embedding of information by watermarking is performed |
| 0 | 1 | embedding by watermarking method A is performed |
| 1 | 0 | embedding by watermarking method B is performed |
| 1 | 1 | embedding by watermarking method C is performed |

Irm

Fig.16 (b)

| first bit | second bit | operation at recording |
|---|---|---|
| 0 | 0 | no embedding of information by watermarking has not been performed |
| 0 | 1 | embedding by watermarking method A has been performed |
| 1 | 0 | embedding by watermarking method B has been performed |
| 1 | 1 | embedding by watermarking method C has been performed |

Ium

DATA PROCESSING APPARATUS AND DATA RECORDING MEDIA

FIELD OF THE INVENTION

The present invention relates to data processing apparatuses and data recording media and, more particularly, to a process of embedding a watermark (information to be embedded) in digital data such as audio data obtained by electronic distribution or from recording media, by using a specific watermarking method such as a watermarking method employed for versatile data reproduction apparatuses.

BACKGROUND OF THE INVENTION

In recent years, with the progress of digitization of video data and audio data, the facility of forming a perfect copy of original digital data has become a great problem.

As a countermeasure against such problem, a watermarking technique has been employed. The watermarking technique is described in detail in Japanese Published Patent Applications Nos. Hei.9-191394 and Hei.9-191395.

The watermarking technique is not a direct method for preventing original digital data to be reproduced, such as video data or audio data, from being copied, but a method for restricting copying of the original digital data by embedding copyright information relating to the copyright for the digital data, in the digital data.

For example, by embedding, as a watermark, copyright information indicating the name of the copyright holder (information source) in digital data such as video data and audio data, the copyright information (watermark) is copied when the digital data is copied. Therefore, when the copyright holder has found digital data (video data or audio data) formed by illegal copying, the copyright holder can prove the illegality by using the copyright information embedded in the digital data.

Hereinafter, the watermarking technique will be described with reference to FIG. 18.

FIGS. 18(a) and 18(b) are diagrams for explaining, as an example of a watermarking technique for video, a process of embedding information relating to the copyright holder of digital video data (relevant information Dwmi) in digital video data to be supplied from the distribution end to the user (supply digital data). Hereinafter, this relevant information is called "watermark" or "embedded information".

To simplify the description, as shown in FIG. 18(a), it is assumed that an image F is a gray-scale still picture, and its size is vertical 50 pixels×horizontal 50 pixels. Further, each of pixels P constituting the image F takes an integral value within a range from 0 to 99, as a luminance level (pixel value) indicating its brightness.

In the watermark embedding process, initially, the image F is divided into a plurality of blocks B each comprising a predetermined number of pixels (vertical 10 pixels× horizontal 10 pixels). That is, the original still picture F is divided into 25 blocks (vertical 5 blocks×horizontal 5 blocks) as shown in FIG. 18(b). At this time, the pixel values constituting image data corresponding to each block (subimaqe) B are represented as the values of the respective components of a matrix of 10 rows×10 columns.

Next, this matrix is subjected to DCT (Discrete Cosine Transform) to obtain a transformed matrix of 10 rows×10 columns. The numerical values arranged at the lower-right portion of the transformed matrix are values which represent the high-frequency components of the image data corresponding to the original image.

By the way, it is known that the human sense of sight is less responsive to change of high-frequency components of image data than to change of low-frequency components thereof. In other words, even if the original image is subjected to image processing for changing the values of the high-frequency components to slightly different values, it is very difficult for the human sense of sight to recognize the difference between the processed image (reconstructed image) and the original image. The reconstructed image is, to be specific, an image corresponding to image data reconstructed from an inversely-transformed matrix which is obtained by subjecting the transformed matrix to inverse DCT.

The watermarking technique for video utilizes the above-described characteristics of human sight, and it is able to embed information in the image data corresponding to the original image, by controlling the high-frequency components of the original image, without making the viewer sense the degradation of the image quality.

Although the watermarking technique for video has been described above, there is a watermarking technique for audio. Further, there is a watermarking technique which is able to extract or remove information from video data or audio data in which the information is embedded.

Moreover, according to the watermarking technique, when digital data recorded in a digital recording medium is copied to another digital recording medium, information embedded in the digital data can be copied as well. Further, when the digital data recorded in the digital recording medium is once converted to analog data by a DA converter and then recorded in an analog recording medium, the embedded information can be held in the analog data recorded in the analog recording medium.

Hereinafter, a description will be given of the watermarking technique for audio.

FIG. 19 is a diagram conceptually illustrating an information embedding process and an information extracting process for digital audio data.

With reference to FIG. 19, signature data (information to be embedded) is embedded in digital audio data recorded as an audio data file ODau (signature data embedding process Pad), and then the digital audio data in which the signature data is embedded is recorded as a signature-data-embedded audio data file SDau.

The signature data Dwmx embedded in the digital audio data is extracted in accordance with the digital audio data which is recorded as the audio data file ODau and the digital audio data which is recorded as the signature-data-embedded audio data file SDau (signature data extraction process Pex).

FIG. 20 is a flowchart of the information embedding process.

Initially, digital audio data is subjected to blocking (step S1). This process is to divide the digital audio data into a plurality of data groups (blocks) each comprising a predetermined number of sampling data, for convenience in the subsequent process.

Next, each block is subjected to the Fourier transform (step S2). The arithmetic operation for the Fourier transform will be later described in detail.

Thereafter, the following data transform is carried out as the watermark (information to be embedded) embedding process.

The watermark is composed of multiple bits of digital data (signature data), and each bit of the signature data corresponds to each block.

Initially, it is confirmed that the value of each bit as a component of a block string (bit string) of the signature data is "0" or "1" (step S3). A block corresponding to a bit of "0" is not subjected to the watermark embedding process. A block corresponding to a bit of "1" is subjected to the watermark embedding process, wherein an imaginary part and a real part of a function which has been obtained by subjecting the audio data corresponding to this block to the Fourier transform (hereinafter, referred to as a Fourier transformed function), are replaced with each other, and the real part is multiplied with −1 (step S4). This process is performed for each block.

Then, the Fourier transformed function corresponding to each block is subjected to the inverse Fourier transform (step S5). Thereby, audio data of each block is restored. The inverse Fourier transform will be later described in more detail.

Through the above-described processes, information to which a normal human ear does not respond is embedded in the audio data.

Hereinafter, the respective processes of the watermarking technique will be described in more detail.

Initially, the Fourier transform and the inverse Fourier transform will be briefly described. The Fourier transform employed in the process of embedding a watermark (information to be embedded) is called "discrete Fourier transform" which is defined as follows.

When a discrete one-dimensional real number function $f(n)$ ($n \in Z$, $0 \leq n < N$) is given, a function obtained by performing the discrete Fourier transform on the $f(n)$ is defined by a discrete one-dimensional complex number function $F(k)$ ($k \in Z$, $0 \leq k < N$) which is given by formula (1).

Here, Z denotes the set of whole integers. Further, formula (1) satisfies the conditions given by formulae (2) and (3).

$$F(k) = \sum_{n=0}^{N-1} f(n) W_N^{-kn} \quad (k = 0, 1 \ldots N-1) \quad (1)$$

$$j^2 = -1 \quad (2)$$

$$W_N = e^{j2\pi/N} = \cos(2\pi/N) + j \sin(2\pi/N) \quad (3)$$

Further, the inverse discrete Fourier transform will be described hereinafter.

When a discrete one-dimensional real number function $f(n)$ ($n \in Z$, $0 \leq n < N$) is given and a discrete one-dimensional complex number function $F(k)$ ($k \in Z$, $0 \leq k < N$) is a function obtained by performing the discrete Fourier transform on the $f(n)$, the following formula (4) holds.

Here, Z denotes the set of whole integers. Further, formula (4) satisfies the conditions given by formulae (5) and (6).

$$f(n) = \sum_{n=0}^{N-1} F(n) W_N^{kn} \quad (k = 0, 1 \ldots N-1) \quad (4)$$

$$j^2 = -1 \quad (5)$$

$$W_N = e^{j2\pi/N} = \cos(2\pi/N) + j \sin(2\pi/N) \quad (6)$$

Next, the watermark embedding process for audio data will be described more specifically.

First of all, blocking of audio data will be described with reference to FIG. 21.

Blocking is a process to represent sample values Sound(i) of digital audio data in which a watermark is to be embedded (hereinafter, referred to as target audio data) as a set of blocks each comprising samples as many as the n-th power of 2 ($2^n$). Here, it is assumed that the total number of blocks obtained by blocking the target audio data is (t+1), the first block is block $B_0$, the k-th block (k: arbitrary number) is block $B_k$, and the last block is block $B_t$. Further, the sample values of the k-th block are represented by $B_k(j)$.

The relationship between the sample values Sound(i) of the target audio data and the respective sample values $B_k(j)$ in the block is represented by the following formula (7).

$$B_k(j) = \text{Sound}(i)$$

where Z denotes the set of whole integers, k and j satisfy $k, j \in Z$, and i satisfies $i = 2^n k + j$ ($0 \leq j < 2^n$).

It is needless to say that the variables n and k used here are different from the variables n and k used in formula (1) which defines the general discrete one-dimensional Fourier transform and formula (4) which defines the discrete one-dimensional inverse Fourier transform.

Next, the watermark embedding process will be described.

Initially, the audio data (sample values) $B_k(j)$ of the k-th block $B_k$ are subjected to the discrete Fourier transform to obtain data $F_k(m)$. Here, k is a variable indicating an arbitrary block amongst the blocks $B_0 \sim B_t$, and it satisfies $k \in Z$, $k \in [0, t$(total block number)].

Further, a data bit string to be inserted is defined by a one-dimensional discrete integral number function U(d), and data which is obtained by embedding information in the data $F_k(m)$ ($m \in Z, m \in [1, 2^n]$) according to the value of each bit in the data bit string defined by the function U(d), is represented by $F'_k(m)$.

Here, d and $d_n$ satisfy the condition $(d, d_n \in Z)$. When $d_n$ satisfies $d_n < 2^{n-1}$, U(d) is 1 or 0. When d does not satisfy $d \in [1, d_n]$, U(d) is 0.

Then, $F'_k(m)$ is represented by the following formulae (8)~(15), wherein m satisfies $m \in Z$, $m \in [1, 2^n]$.

$$Re(F'_k(m)) = -Im(F_k(m)) \text{ (when } U(m)=1) \quad (8)$$

$$Re(F'_k(m)) = Re(F_k(m)) \text{ (when } U(m)=0) \quad (9)$$

$$Im(F'_k(m)) = Re(F_k(m)) \text{ (when } U(m)=1) \quad (10)$$

$$Im(F'_k(m)) = Im(F'_k(m)) \text{ (when } U(m)=0) \quad (11)$$

$$Re(F'_k(2^n-m+1)) = -Im(F_k(m)) \text{ (when } U(m)=1) \quad (12)$$

$$Re(F'_k(2^n-m+1)) = Re(F_k(m)) \text{ (when } U(m)=0) \quad (13)$$

$$Im(F'_k(2^n-m+1)) = Re(F_k(m)) \text{ (when } U(m)=1) \quad (14)$$

$$Im(F'_k-(2^n-m+1)) = Im(F_k(m)) \text{ (when } U(m)=0) \quad (15)$$

The above-described formulae (8)~(11) are applied to the low-frequency components amongst the $2^n$ pieces of data (frequency components) $F_k(m)$ obtained by subjecting the $2^n$ pieces of data (sample values) $B_k(j)$ to the discrete Fourier transform. On the other hand, the above-described formulae (12)~(15) are applied to the high-frequency components of the $2^n$ pieces of data (frequency components) $F_k(m)$ obtained by subjecting the $2^n$ pieces of data (sample values) $B_k(j)$ to the discrete Fourier transform.

Further, as represented by formulae (9), (11), (13) and (15), a block corresponding to a bit of 0 in the signature data bit string is not subjected to the watermark embedding process. On the other hand, as represented by formulae (8), (10), (12) and (14), a block corresponding to a bit of 1 in the signature data bit string is subjected to the watermark embedding process, in which the imaginary part and the real part of the data $F_k(m)$ obtained by the Fourier transform of the audio data (sample values) $B_k(j)$ corresponding to this block are replaced with each other, and the real part is multiplied with $-1$.

Further, the watermark embedding process is performed on pairs of the Fourier transformed data on the low-frequency side and the corresponding Fourier transformed data on the high-frequency side so that the target audio data in which information is embedded is not offensive to the ear of the listener. Here, the m-th Fourier transformed data $F'_k(m)$ which has been subjected to the watermark embedding process corresponds to the $(2^n-m+1)$th Fourier transformed data $F'_k(2^n-m+1)$ which has been subjected to the watermark embedding process.

Next, the watermark extraction process will be described.

FIG. 22 is a flowchart of the watermark extraction process.

Initially, audio data which has been subjected to the information embedding process is divided into plural blocks (step S11a), and each block is subjected to the Fourier transform (step S12a). Further, audio data which has not been subjected to the information embedding process is divided into plural blocks (step S11b), and the audio data of each block is subjected to the Fourier transform (step S12b).

Then, the data obtained as the results of the above-described Fourier transform steps are compared, block by block, between the blocks of the audio data which has been subjected to the information embedding process and the corresponding blocks of the audio data which has not been subjected to the information embedding process (step S13).

As the result of the comparison, when the data of the corresponding blocks agree with each other, it is decided that no information is embedded in the block which has been subjected to the information embedding process, and the signature data bit is 0 (step S14). When the data of the corresponding blocks are different from each other, it is decided that information is embedded in the block which has been subjected to the information embedding process, and the signature data bit is 1 (step S15).

This process is repeated block by block to extract the bit string (embedded information) constituting the signature data.

Next, the watermark (information to be embedded) embedding process and the watermark (embedded information) extracting process will be described more specifically.

Initially, the process of embedding information in each block will be described.

In the following description, Sound(n) represents audio data (sample values) in one block in which signature data is to be embedded, and syomei[u] represents a signature data bit string to be embedded in data which is obtained by subjecting the audio data Sound(n) in one block to the Fourier transform. Further, F[Sound](p) represents data obtained by subjecting the target audio data Sound(n) to the discrete Fourier transform, and F'[Sound](p) represents data obtained by embedding the signature data bit string in the F[Sound](p).

Here, the audio data Sound(n) is a function defined in the integral space and having an integer as its value, and n=0,1, . . . ,N.

Further, the signature data bit string syomei[u] is also a function defined in the integral space (refer to formula (16)) and having only 0 or 1 as its value, and u=0,1.

$$syomei[u]=\{1,0\} \tag{16}$$

When the audio data Sound(n) is subjected to the Fourier transform, the corresponding Fourier transformed data F[Sound](p) is obtained as follows.

$$F[Sound](p) = \sum_{n=0}^{N} Sound(n)e^{j2\pi pn/N} \tag{17}$$

This F[Sound](p) is a function defined in the integral space and having a complex number as its value, and p=0,1, . . . N.

Assuming that the real part of the Fourier transformed data F[Sound](p) which is a complex number is Re{F[Sound](p)} while the imaginary part thereof is Im{F[Sound](p)}, the data F'[Sound](p) can be represented by using the above-described formulae (8)~(15) in accordance with the value of the signature data bit string syomei[u].

Assuming that the signature data bit string to be embedded in the Fourier transformed data F[Sound](p) corresponding to one block is syomei[0]=1, the first bit value F[Sound](1) of the Fourier transformed data F[Sound](p) and the N-th bit value F[Sound](N) thereof are subjected to the information embedding process by using the above-described formulae (8), (10), (12) and (14).

The following formulae (18)~(21) represent the Fourier transformed data F'[Sound](1) and F'[Sound](N) obtained in the information embedding process.

$$Re\{F'[Sound](1)\}=-Im\{F[Sound](1)\} \tag{18}$$

$$Im\{F'[Sound](1)\}=Re\{F[Sound](1)\} \tag{19}$$

$$Re\{F'[Sound](N)\}=-Im\{F[Sound](N)\} \tag{20}$$

$$Im\{F'[Sound](N)\}=Re\{F[Sound](N)\} \tag{21}$$

where Re and Im indicate the real part and the imaginary part of the complex number in { }, respectively.

On the other hand, assuming that the signature data bit string to be embedded in the audio data Sound(n) corresponding to one block is syomei[1]=0, the second bit value F[Sound](2) of the Fourier transformed data F[Sound](p) and the (N-1)th bit value F[Sound](N-1) thereof are subjected to the information embedding process by using the above-described formulae (9), (11), (13) and (15).

The following formulae (22)~(25) represent the Fourier transformed data F'[Sound](2) and F'[Sound](N-1) obtained in the information embedding process.

$$Re\{F'[Sound](2)\}=Re\{F[Sound](2)\} \tag{22}$$

$$Im\{F'[Sound](2)\}=Im\{F[Sound](2)\} \tag{23}$$

$$Re\{F'[Sound](N-1)\}=Re\{F[Sound](N-1)\} \tag{24}$$

$$Im\{F'[Sound](N-1)\}=Im\{F[Sound](N-1)\} \tag{25}$$

By performing the inverse discrete Fourier transform on the data F'[Sound](p) which has been obtained by subjecting the Fourier transformed data F[Sound](p) corresponding to the audio data Sound(n) in one block to the information embedding process by using the above-described formulae (8)~(15), information-embedded audio data Sound'(n) is obtained as represented by the following formula (26).

$$Sound'(n) = \sum_{n=0}^{N} F'[Sound](p)e^{j2\pi pn/N} \qquad (26)$$

Next, the embedded-information extraction process will be described briefly.

In this process, the Sound(n) and the Sound'(n) are respectively subjected to the Fourier transform, and the respective Fourier-transformed data are compared. When the values of these data are different from each other, the signature data bit string is extracted with the signature bit data being 1. When the values of these data are identical, the signature data bit string is extracted with the signature bit data being 0.

The algorithm will be briefly described in the following.

In { }, n moves from 1 to N in order.
{
    If F[Sound](n)=F[Sound'](n) does not hold, syomei[n−1]=1
    If F[Sound](n)=F[Sound'](n) holds, syomei[n−1]=0
}

As described above, in recent years, as a method for protecting the copyright for video data or audio data, the watermarking technique for embedding information indicating the copyright holder or the like (relevant information) in these data to clarify the data source, has been put to practical use.

However, there are various watermarking methods for embedding such relevant information in digital data and, under the existing circumstances, it is difficult to handle the digital data in which the copyright information is embedded, by a reproduction apparatus or the like which employs a predetermined watermarking method.

Meanwhile, an electronic distribution system has been proposed, in which video data or audio data is distributed not through a distribution medium (data recording medium) but through a network.

In the electronic distribution system, distribution of video data has a considerable technical problem because the quantity of video data is large. However, distribution of audio data can be easily realized even in the existing limited network band because the quantity of audio data is smaller than the quantity of video data, and therefore, the audio data distribution will be carried out in the near future.

Hence, there will be a demand for a system for embedding relevant information which specifies the copyright holder or the like in audio data to be distributed, by using a watermarking method, to identify the source of the audio data.

SUMMARY OF THE INVENTION

The present invention is made to solve the above-described problems and has for its object to provide a data processing apparatus which can appropriately perform electronic distribution of audio data and, moreover, which can protect the copyright for the electronic-distributed audio data.

It is another object of the present invention to provide a data processing apparatus which can convert digital data in which information has been embedded by using various watermarking methods, to data which can be processed by a predetermined watermarking method.

It is still another object of the present invention to provide a data recording medium which contains digital data having a data structure by which appropriate electronic distribution of audio data is performed and the copyright for the electronic-distributed audio data is protected.

It is a further object of the present invention to provide a data recording medium which contains, as digital data in which information has been embedded by various watermarking methods, digital data having a data structure which can be processed by a predetermined watermarking method.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data processing apparatus for receiving various kinds of information-embedded digital data which correspond to different watermarking methods and have been obtained by embedding relevant information in supply digital data to be supplied from the distribution end to the user, and processing these information-embedded digital data. This apparatus comprises a data obtaining unit for obtaining a desired information-embedded digital data as input digital data; a method information obtaining unit for obtaining used method information which corresponds to the input digital data and indicates the watermarking method used for the process of embedding the relevant information; an information extraction unit for extracting the relevant information from the input digital data by using the used watermarking method, in accordance with the used method information which has been obtained; and an information embedding unit for embedding the extracted relevant information or processed information obtained by processing the relevant information, in the input digital data or in processed digital data obtained by subjecting the input digital data to a predetermined data processing, by using a predetermined watermarking method. Therefore, when extracting the relevant information, it is avoided that wrong information is extracted by using another method. Further, when removing the relevant information, it is avoided that a portion other than the embedded relevant information is undesirably changed by using another method.

As the result, at the distribution end from which digital data such as audio data is distributed to the user, the relevant information can be embedded as a watermark in the supply digital data to be supplied, by using a desired watermarking method. In other words, especially when the digital data is recorded on a recording medium at the user end, the distribution end of the digital data can select a watermarking method which provides the least degradation due to the information embedding process. Further, the distribution end can select the optimum method according to the communication rate or the like when transmitting the digital data.

Further, when the information-embedded digital data obtained from the network N is recorded on a writable recording medium, a watermarking method, which is different from the watermarking method used for embedding information in the supply digital data at the distribution end, can be used for embedding information in the digital data to be written in the recording medium. Therefore, information can be embedded in digital data by a watermarking method adapted to an apparatus which reproduces the digital data.

According to a second aspect of the present invention, in the data processing apparatus of the first aspect, the relevant information embedded in the information-embedded digital data is information relating to the copyright holder of the supply digital data. Therefore, the copyright for the supply digital data to be supplied from the distribution end to the user can be protected.

According to a third aspect of the present invention, in the data processing apparatus of the first aspect, the information embedding unit embeds the relevant information or the processed information in the input digital data by using the predetermined watermarking method, thereby generating output digital data. Therefore, regardless of the watermarking method by which the relevant information has been embedded in the obtained digital data, reproduction apparatuses as domestic electrical equipment which employ the predetermined watermarking method can appropriately reproduce the information-embedded digital data, according to the embedded information like copyright information.

According to a fourth aspect of the present invention, the data processing apparatus of the third aspect further comprises a data reproduction unit for reproducing the output digital data. Therefore, reproduction of the obtained information-embedded digital data can be controlled according to the relevant information.

According to a fifth aspect of the present invention, the data processing apparatus of the third aspect further comprises a data recording unit for recording the output digital data. Therefore, regardless of the watermarking method used for the information-embedded digital data, the information-embedded digital data can be stored, as digital data corresponding to a predetermined watermarking method, in recording media used in reproduction apparatuses as domestic electrical equipment.

According to a sixth aspect of the present invention, the data processing apparatus of the first aspect further comprises an information removal unit for removing the relevant information from the input digital data in accordance with the used method information obtained by the method information obtaining unit, thereby generating information-removed digital data as the processed digital data; and the information embedding unit embeds the relevant information or the processed information in the information-removed digital data by using the predetermined watermarking method, thereby generating output digital data. Therefore, the relevant information in the input digital data, which corresponds to various watermarking methods, can be replaced with the relevant information corresponding to the predetermined watermarking method.

According to a seventh aspect of the present invention, the data processing apparatus of the sixth aspect further comprises a data reproduction unit for reproducing the output digital data. Therefore, reproduction of the obtained information-embedded digital data can be controlled according to the relevant information. Further, when the processed digital data is digital audio data which has been obtained by removing the embedded information from the input digital data, reproduction of the information-embedded digital data can be performed according to the processed digital data, while minimizing degradation of sound quality.

According to an eighth aspect of the present invention, the data processing apparatus of the sixth aspect further comprises a data recording unit for recording the output digital data. Therefore, regardless of the watermarking method used for the obtained information-embedded digital data, the information-embedded digital data can be stored, as digital data of less noise, in recording media used in reproduction apparatuses as domestic electrical equipment which employ the predetermined watermarking method.

According to a ninth aspect of the present invention, in the data processing apparatus of the first aspect, the information-embedded digital data comprises a first data portion of a fixed length and a second data portion of a variable length; the used method information indicating the used watermarking method is embedded in the first data portion by the used watermarking method; and the method information obtaining unit obtains the used method information indicating the used watermarking method, from the first data portion of the input digital data. Therefore, the method information obtaining unit can easily detect the position of the used method information in the information-embedded digital data.

According to a tenth aspect of the present invention, in the data processing apparatus of the first aspect, the information-embedded digital data has a data structure including a plurality of data packets; the used method information indicating the used watermarking method is included in a header of a predetermined data packet amongst the plural data packets; and the method information obtaining unit obtains the used method information indicating the used watermarking method from the header of the predetermined data packet of the information-embedded digital data. Therefore, the method information obtaining unit can easily detect the position of the used method information in the information-embedded digital data.

According to an eleventh aspect of the present invention, in the data processing apparatus of the first aspect, the information-embedded digital data is followed by an auxiliary data portion; the used method information indicating the used watermarking method is included in the auxiliary data portion; and the method information obtaining unit obtains the used method information indicating the used watermarking method from the auxiliary data portion which follows the information-embedded digital data. Therefore, the method information obtaining unit can easily detect the position of the used method information in the information-embedded digital data.

According to a twelfth aspect of the present invention, in the data processing apparatus of the first aspect, the data obtaining unit is able to obtain the information-embedded digital data from at least one of plural data recording media and plural data transmission paths; and the method information obtaining unit decides the used watermarking method in accordance with any of the data recording media and the data transmission paths from which the information-embedded digital data has been obtained, and obtains the used method information corresponding to the result of the decision. Therefore, it is not necessary to insert the watermarking method information in the digital data to be distributed from the distribution end to the network. Further, it is not necessary to insert the watermarking method information in the distributed digital data to be stored in the recording medium. Thereby the data processing for the supply digital data to be supplied from the distribution end to the user can be reduced.

According to a thirteenth aspect of the present invention, in the data processing apparatus of the first aspect, the information-embedded digital data is multiplexed digital data obtained by multiplexing audio digital data, or video digital data, or audio digital data and video digital data. Therefore, the relevant information embedded in the various kinds of digital data, which corresponds to various watermarking methods, can be converted to the relevant information corresponding to the predetermined watermarking method.

According to a fourteenth aspect of the present invention, in the data processing apparatus of the first aspect, the data obtaining unit has an antenna for receiving a broadcast wave from a broadcasting station, and a received-wave decoder for demodulating the wave received by the antenna to output the information-embedded digital data. Therefore, the information-embedded digital data can be obtained from the broadcast wave from the broadcast station.

According to a fifteenth aspect of the present invention, in the data processing apparatus of the first aspect, the data obtaining unit has a data reading unit for reading the information-embedded digital data stored in a bulk memory, from the bulk memory. Therefore, the information-embedded digital data can be obtained from DVD-ROM, DVD-RAM, or a semiconductor recording media.

According to a sixteenth aspect of the present invention, in the data processing apparatus of the first aspect, the information-embedded digital data is obtained by embedding plural pieces of relevant information in the supply digital data by using plural watermarking methods; plural pieces of used method information corresponding to the plural watermarking methods are included in the information-embedded digital data, as the used method information indicating the used watermarking method; and the information extracting unit is able to extract the relevant information corresponding to each of the plural watermarking methods from the input digital data, according to the used method information corresponding to the plural watermarking methods. Therefore, various kinds of relevant information can be embedded in the supply digital data by optimum watermarking methods.

According to a seventeenth aspect of the present invention, in the data processing apparatus of the first aspect, the information-embedded digital data is obtained by embedding plural pieces of relevant information in the supply digital data by using plural watermarking methods; and the information embedding unit embeds a predetermined one of the plural pieces of relevant information in the input digital data by using the predetermined watermarking method, thereby generating output digital data. Therefore, a desired relevant information amongst the various kinds of relevant information embedded in the digital data can be adapted to the predetermined watermarking method.

According to an eighteenth aspect of the present invention, in the data processing apparatus of the first aspect, the information-embedded digital data is obtained by embedding plural pieces of relevant information in the supply digital data by using plural watermarking methods; and the information embedding unit embeds a predetermined number of relevant information amongst the plural pieces of relevant information, in the input digital data, by using the corresponding watermarking methods amongst the plural watermarking methods or a watermarking method different from the plural watermarking methods, thereby generating output digital data. Therefore, a desired relevant information amongst the various kinds of relevant information embedded in the digital data can be adapted to the required watermarking method.

According to a nineteenth aspect of the present invention, in the data processing apparatus of the sixth aspect, the information-embedded digital data is obtained by embedding plural pieces of relevant information in the supply digital data by using plural watermarking methods; and the information embedding unit embeds a predetermined one of the plural pieces of relevant information in the processed digital data by using the predetermined watermarking method, thereby generating output digital data. Therefore, the information-embedded digital data containing various kinds of relevant information can be converted to new digital data in which a desired one of the various kinds of relevant information is adapted to the predetermined watermarking method.

According to a twentieth aspect of the present invention, in the data processing apparatus of the sixth aspect, the information-embedded digital data is obtained by embedding plural pieces of relevant information in the supply digital data by using plural watermarking methods; and the information embedding unit embeds a predetermined number of relevant information amongst the plural pieces of relevant information, in the processed digital data, by using the corresponding watermarking methods amongst the plural watermarking methods or a watermarking method different from the plural watermarking method, thereby generating output digital data. Therefore, the information-embedded digital data containing various kinds of relevant information can be converted to new digital data in which a desired one of the various kinds of relevant information is adapted to the predetermined watermarking method.

According to a twenty-first aspect of the present invention, there is provided a data recording medium in which information-embedded digital data is recorded, which information-embedded digital data is obtained by embedding relevant information in supply digital data to be supplied from the distribution end to the user. In this recording medium, the information-embedded digital data is composed of a first data portion having a fixed length and a second data portion having a variable length; used method information indicating the watermarking method used for embedding the relevant information in the supply digital data is embedded in the first data portion; the relevant information is embedded in the second data portion by the used watermarking method indicated by the used method information; and the relevant information can be extracted or removed from the second data portion by using an appropriate watermarking method, according to the used method information. Therefore, an apparatus which obtains the information-embedded digital data can decide the watermarking method used for embedding the information in the digital data. Thereby, the apparatus can perform extraction or removal of the embedded information without extracting wrong information by using another method or changing a portion other than the embedded information by using another method. Further, the apparatus can easily detect the position of the used method information in the information-embedded digital data.

As the result, at the distribution end from which digital data such as audio data is distributed to the user, the relevant information can be embedded as a watermark in the supply digital data to be supplied, by using a desired watermarking method. In other words, especially when the digital data is recorded on a recording medium at the user end, the distribution end of the digital data can select a watermarking method which provides the least degradation due to the information embedding process. Further, the distribution end can select the optimum method according to the communication rate or the like when transmitting the digital data.

Further, when the information-embedded digital data obtained from the network N is recorded on a writable recording medium, a watermarking method, which is different from the watermarking method used for embedding information in the supply digital data at the distribution end, can be used for embedding information in the digital data to be written in the recording medium. Therefore, information can be embedded in digital data by a watermarking method adapted to an apparatus which reproduces the digital data.

According to a twenty-second aspect of the present invention, in the data recording medium of the twenty-first aspect, the used method information is embedded in the first data portion of the information-embedded digital data by a predetermined watermarking method. Therefore, the used method information indicating the used watermarking method can be easily extracted.

According to a twenty-third aspect of the present invention, in the data recording medium of the twenty-first aspect, plural pieces of used method information indicating different used watermarking methods, which have been used for embedding the relevant information in the supply digital data, are embedded in the first data portion of the information-embedded digital data. Therefore, an apparatus which obtains the information-embedded digital data can control reproduction of the digital data according to the plural pieces of used method information.

According to a twenty-fourth aspect of the present invention, there is provided a data recording medium in which information-embedded digital data and used method information are recorded. The information-embedded digital data is obtained by embedding relevant information in supply digital data to be supplied from the distribution end to the user. The used method information indicates the watermarking method used for embedding the relevant information in the supply digital data, and follows the information-embedded digital data. In this recording medium, the information-embedded digital data has a data structure in which the relevant information can be extracted or removed by using an appropriate watermarking method, according to the used method information. Therefore, an apparatus which obtains the information-embedded digital data can perform processing or reproduction of the digital data according to the used method information. Further, the apparatus can decide the watermarking method used for embedding the information in the digital data. Therefore, the apparatus can perform extraction or removal of the embedded information without extracting wrong information by using another method or changing a portion other than the embedded information by using another method.

According to a twenty-fifth aspect of the present invention, in the recording medium of the twenty-fourth aspect, plural pieces of used method information indicating different watermarking methods, which have been used for embedding the relevant information in the supply digital data, are recorded as the used method information. Therefore, an apparatus which obtains the information-embedded digital data can perform processing or reproduction of the digital data according to the used method information.

BRIEF DESCRIPTION OF THE DRAWINGS

FIG. 16(*a*) is a diagram illustrating the values of information Irm1 of watermarking method used at recording which is included in the first embedded information Iwm1, and the meaning of each value, and FIG. 16(*b*) is a diagram illustrating the values of information Ium of watermarking method used at recording which is included in the second embedded information Iwm2, and the meaning of each value.

DETAILED DESCRIPTION OF THE PREFERRED EMBODIMENTS

The inventors of the present invention have earnestly studied the recent watermarking technique and the electronic distribution system for digital data, and discovered that, when employing the watermarking technique for the electronic distribution system, the variety of existing watermarking methods will be a great problem.

To be specific, the supply of audio data by electronic distribution can be performed very easily as compared with the supply of audio data by data recording media, and so the number of the data sources will increase considerably. Therefore, it is impossible to unify the watermarking methods amongst the distributors of the respective audio data. On the other hand, in the electronic-distribution system, it is very easy to obtain audio data and so the possibility of illegal copying is high. Therefore, to unify the watermarking methods amongst the different distributors is not desirable because, in this case, illegal utilization of audio data cannot be supervised when the watermarking method is decrypted.

Hereinafter, the problem in the electronic distribution system and the countermeasure against the problem will be described in more detail.

Figure 23:
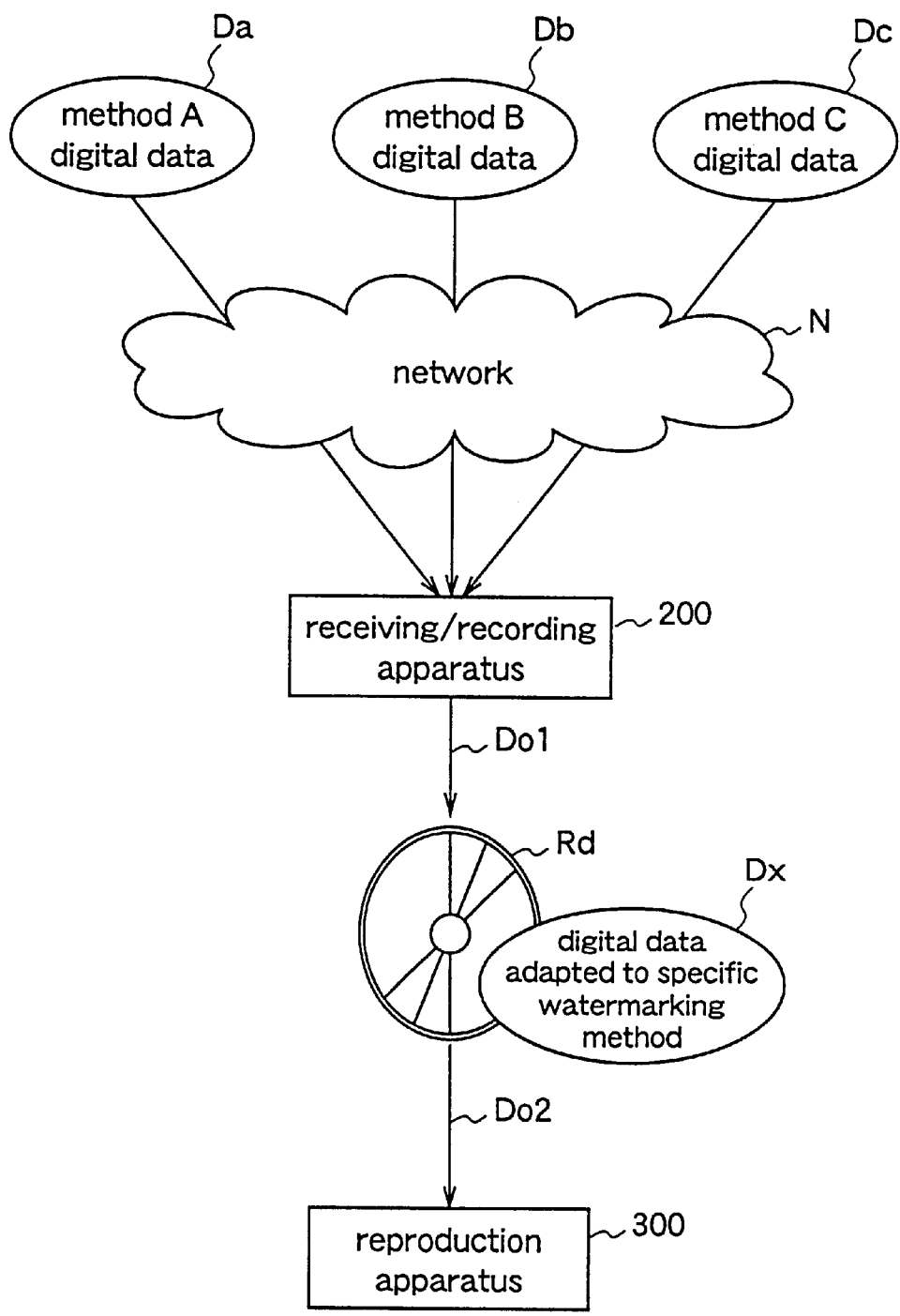
FIG. 23 is a conceptual diagram illustrating the flow of digital audio data in an electronic distribution system which is a premise of the present invention.

FIG. 23 is a diagram illustrating the flow of digital audio data in the electronic distribution system.

With reference to FIG. 23, a receiving/recording unit 200 is connected to a network N. Information-embedded digital data in which information is embedded by various watermarking methods, exist on the network N. In FIG. 23, three watermarking methods (method A, method B, and method C) are employed, and digital audio data Da, Db, and Dc in which information is embedded by the respective methods are supplied to the receiving/recording unit 200. Further, the receiving/recording unit 200 records the received digital data Do1 on a data recording medium Rd This system further includes a reproduction unit 300 on which the data recording medium Rd is mounted, wherein the digital data Do2 recorded on the data recording medium Rd is reproduced. It is assumed that a personal computer is used as the receiving/recording unit 200, and a semiconductor player or a DVD player (domestic electrical equipment) is used as the reproduction unit 300.

In the electronic distribution system so constructed, initially, the digital audio data Da, Db, and Dc are received by the receiving/recording unit 200, and the received digital audio data is output to the data recording medium Rd as the output digital data Do1. Then, the output digital data Do1 is recorded in the data recording medium Rd.

Next, in the reproduction unit 300 on which the data recording medium Rd is mounted, the digital data Do2 which has been read from the data recording medium Rd is reproduced.

By the way, the reproduction unit 300 is a domestic equipment the specification of which cannot be changed easily after marketing of it has started and, therefore, it is difficult to change the watermarking method employed in the reproduction unit 300.

Accordingly, in the electronic distribution system for audio data, although it is necessary to supply digital audio data adapted to the predetermined watermarking method to the reproduction unit 300, it is impossible to unify the watermarking methods amongst the distributors of the respective digital audio data.

In order to solve this problem, the inventors of the present invention noticed that the personal computer used as the receiving/recording unit 200 can be adapted to digital data which have been processed by various watermarking methods, by changing the software.

However, even if the software is changed, the receiving/recording unit 200 cannot specify the watermarking method by which information has been embedded in the received digital data and, therefore, the embedded information cannot be extracted by the watermarking method suitable for the received digital data. To be specific, the arithmetic process for extracting or removing the embedded information from the digital data is the inverse of the arithmetic process for embedding the information in the digital data, and the same watermarking method is used for the information embedding process and the information extraction process. Therefore, if the watermarking method used for the information embedding process cannot be specified, the information extraction or removal process cannot be performed.

So, the inventors of the present invention has earnestly studied the electronic distribution system and finally discovered the following fact. That is, in the electronic distribution system, when the receiving/recording unit 200 constituted by a personal computer is provided with the function of specifying the watermarking method used for embedding information in the received digital data, the digital data in which information has been embedded by various watermarking methods can be converted to data adapted to a specific watermarking method used for the reproduction unit 300 as a domestic equipment.

For example, the digital data Da, Db, and Dc recorded by the above-described three methods A, B, and C, respectively, can be converted to the digital data Dx adapted to the specific watermarking method used for the reproduction unit 300.

More specifically, the embedded information is extracted from the received digital data by using the same watermarking method as that used for embedding the information in the digital data, and then the extracted information corresponding to the used watermarking method is again embedded in the received digital data by using a specific watermarking method employed in the reproduction unit 300. Thereby, regardless of the watermarking method used for embedding the information in the received digital data, the reproduction unit 300 as a domestic equipment can appropriately reproduce the received digital data.

Hereinafter, the embodiments of the present invention will be described in detail.

[Embodiment 1]

Figure 1:
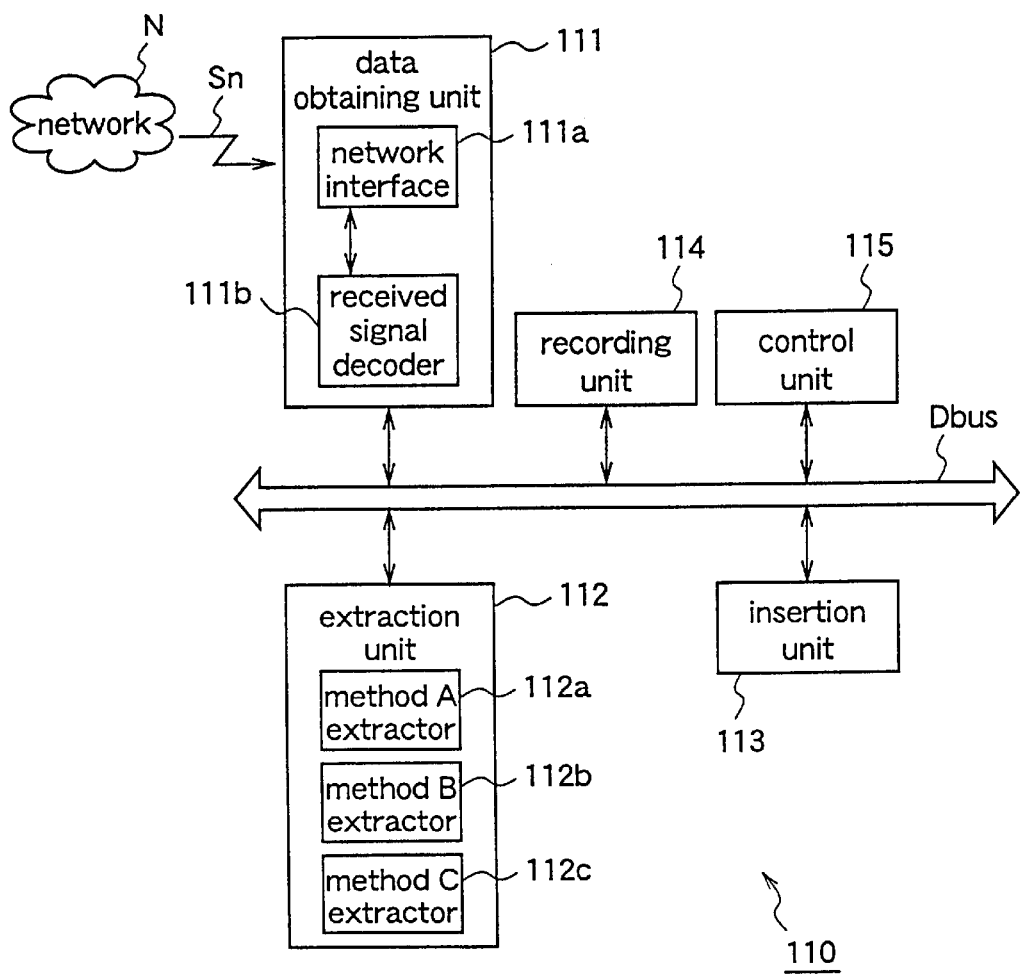
FIG. 1 is a block diagram for explaining a data processing apparatus according to a first embodiment of the present invention.

FIG. 1 is a block diagram for explaining a data processing apparatus 110 according to a first embodiment of the present invention.

The data processing apparatus 110 obtains various kinds of information-embedded digital data Dau corresponding to different watermarking methods from a network signal Sn on a network N, processes each of the information-embedded digital data so that it corresponds to a predetermined watermarking method, and records the digital data corresponding to the predetermined watermarking method in a data recording medium.

In this first embodiment, for simplification, it is assumed that the data processing apparatus 110 receives, as the various kinds of information-embedded digital data Dau, digital data Da, Db, and Dc which correspond to the three watermarking methods (method A, method B, and method C) shown in FIG. 23, respectively. To be specific, the digital data Da is distributed audio data which is obtained by embedding relevant information, as a watermark, in supply digital audio data to be supplied from the distribution end to the user, by using the watermarking method A. The digital data Db is distributed audio data which is obtained by embedding relevant information in another supply digital audio data by using the watermarking method A. The digital data Dc is distributed audio data which is obtained by embedding relevant information in still another supply digital audio data by using the watermarking method A. Further, the predetermined watermarking method is a versatile watermarking method employed in reproduction apparatuses as domestic electrical equipment, such as semiconductor players or DVD players.

Turning to FIG. 1, the data processing apparatus 110 includes a data obtaining unit 111 for obtaining, as input digital data, the information-embedded digital data Dau (any of the digital data Da, Db, and Dc) from the network signal Sn on the network N. This data obtaining unit 111 comprises a network interface 111a which exchanges a transmission signal with the network N, and a received signal decoder 111b which converts the network signal Sn received through the interface 111a to digital data by decoding. That is, the received signal decoder 111b decodes the network signal Sn and outputs the information-embedded digital data Dau as input digital data (distributed audio data).

Further, the data processing apparatus 110 includes a control unit 115 and an extraction unit 112. The control unit 115 has a function (method information obtaining means) for obtaining, from the input digital data, used method information indicating the watermarking method used for embedding the relevant information in the supply digital data. The extraction unit 112 extracts the embedded information (relevant information) from the input digital data, by the used watermarking method in accordance with the used method information.

The control unit comprises a CPU which controls various kinds of arithmetic processing and data processing, and a RAM which contains the operation program of the CPU and also serves as an execution memory. Accordingly, in the control unit 115, the method information obtaining means is mounted on the CPU. Further, the extraction unit 112 is constituted by a custom LSI. The extraction unit 112 comprises a method A extractor 112a which extracts the embedded information from the digital data Da by the watermarking method A, a method B extractor 112b which extracts the embedded information from the digital data Db by the watermarking method B, and a method C extractor 112c which extracts the embedded information from the digital data Dc by the watermarking method C.

The data processing apparatus 110 further includes an insertion unit (information embedding means) 113 and a recording unit 114. The insertion unit 113 embeds the extracted information in the input digital data (distributed audio data) by the predetermined watermarking method, thereby generating output digital data. The recording unit 114 stores the output digital data.

The insertion unit 113 is constituted by a custom LSI, and the recording unit 114 is provided with a DVD-RAM drive which writes and reads the output digital data in/from a DVD-RAM disk.

In the data processing apparatus 110, the data obtaining unit 111, the extraction unit 112, the insertion unit 113, the recording unit 114, and the control unit 115 are connected with each other by a data bus Dbus, and the control unit 115 controls the operations of the data obtaining unit 111, the extraction unit 112, the insertion unit 113, and the recording unit 114. That is, the control unit controls, not only the operation for obtaining the used watermarking method information from the input digital data, but also the following processes: the process of obtaining the information-embedded digital data Dau from the network signal Sn by the data obtaining unit 111; the process of extracting the embedded information by the extraction unit 112; the process of embedding the extracted information by the insertion unit 113; and the process of writing the output digital data by the recording unit 114.

In the data processing apparatus 110 of this first embodiment, the digital data obtaining unit 111 comprises the network interface 111a and the received signal decoder 111b, i.e., it is constructed so as to receive the network signal Sn from the network N through a communication line and decode this signal to obtain the information-embedded digital data Dau. However, the construction of the digital data obtaining unit is not restricted thereto.

For example, the digital data obtaining unit 111 may comprise an antenna which receives a broadcast wave, and a received wave decoder which demodulates the received wave output from the antenna. In this case, the output from the received wave decoder is obtained as the information-embedded digital data Dau.

Further, the digital data obtaining unit may comprises a modem connected to a telephone line or a coaxial cable. In this case, an analog transmission signal from the telephone line or the coaxial cable is converted to information-embedded digital data by the modem, and this information-embedded digital data is obtained as the input digital data.

Further, the digital data obtaining unit 111 may be a bulk storage which reads the information-embedded digital data Dau from bulk data storage media capable of handling multimedia data, such as disk storage media like DVD-ROM, DVD-RAM, and CD-ROM, or semiconductor media.

While in this first embodiment the extraction unit 112 and the insertion unit 113 are constituted by separated custom LSI circuits, these units may be constituted by a single custom LSI. As the extraction units 112 and the insertion unit 113 perform a lot of common processes, to constitute these units by a single custom LSI is desirable for reduction in the number of components.

Further, while in this first embodiment the extraction unit 112 and the insertion unit 113 are constituted by custom LSI circuits, these units may be constituted by a CPU performing arithmetic processing and a RAM which stores the arithmetic program and serves as an execution memory. Especially in this case, the extraction unit 112 and the insertion unit 113 can share the constituents such as the CPU and the memory with the control unit 115, whereby the number of components can be reduced effectively.

Furthermore, while in this first embodiment the recording unit 114 is constituted by a DVD-RAM drive, this recording unit 114 may be constituted by any storage as long as it is a bulk writable storage capable of handling multimedia data, such as a CD-R drive or a semiconductor media writing unit.

(Data Structure of Digital Data)

Next, a description will be given of the data structure of the information-embedded digital data Dau which is obtained from the network signal Sn on the network N, and the output digital data which is output from the insertion unit 113.

Figures 2, 3:
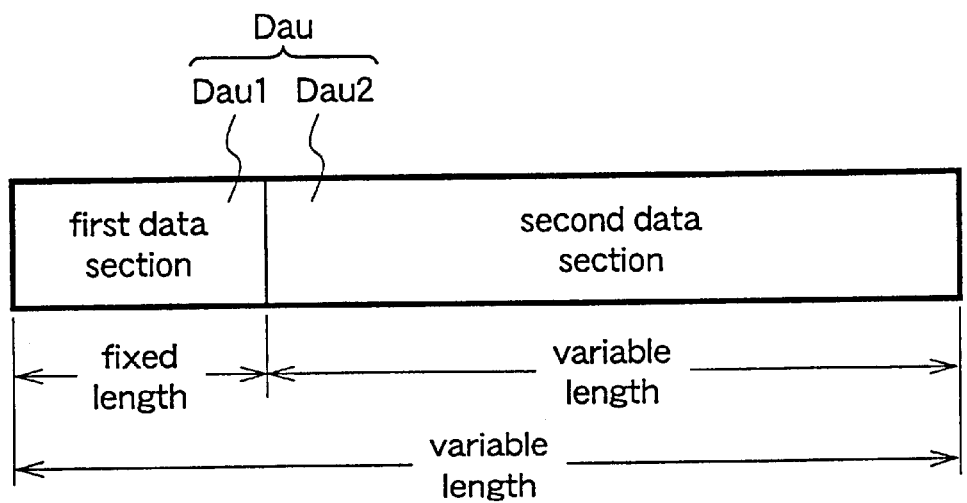
FIG. 2 is a diagram illustrating the data structure of distributed audio data Dau supplied by a network signal to the data processing apparatus of the first embodiment.
FIG. 3 is a diagram for explaining used watermarking method information included in the distributed audio data Dau.

These digital data have the same data structure, and FIG. 2 shows the data structure of the information-embedded digital data Dau.

The information-embedded digital data Dau is composed of a first data section Dau1 and a second data section Dau2. Although the size (length) of the information-embedded digital data Dau is variable, the size of the first data section Dau1 is fixed. Therefore, the data processing apparatus which obtains the information-embedded digital data Dau can distinguish the first data section Dau1 from the second data section Dau2.

In the digital data corresponding to the first data section Dau1, used method information indicating the used watermarking method is embedded by a versatile watermarking method amongst the above-described watermarking methods A, B, and C. On the other hand, in the digital data corresponding to the second data section Dau2, relevant information such as copyright information is embedded as a watermark by the watermarking method indicated by the used method information.

Although the output digital data from the insertion unit 113 is not shown in FIG. 2, in this first embodiment the data structure of the output digital data is identical to that of the information-embedded digital data Dau. That is, the output digital data is composed of a fixed-length first data section and a variable-length second data section, and the used method information indicating the used watermarking method is inserted in the digital data corresponding to the first data section while the relevant information is embedded in the digital data corresponding to the second data section by the used watermarking method.

While in this first embodiment the first data section in the information-embedded digital data (the output digital data) has a fixed length, the first data section may have a variable length when attribute information indicating the attribute of the digital data is included in the digital data. In this case, however, size information indicating the size of the first data section must be inserted in the attribute information.

Further, also when the information-embedded digital data (the output digital data) includes information indicating the end point of the first data section, the first data section may have a variable length.

Moreover, in the information-embedded digital data (the output digital data), the first and second data sections are arranged such that the fixed-length first data section is followed by the variable-length second data section. However, these data sections may be arranged such that the variable-length second data section is followed by the fixed-length first data section. Moreover, a plurality of fixed-length first data sections and a plurality of variable-length second data sections may be dispersed in the digital data.

(Data Structure of Used Method Information)

Next, a description will be given of the data structure of the used method information Ium indicating the used watermarking method. This used method information is embedded in the first data section of the information-embedded digital data Dau by a versatile watermarking method (e.g., the watermarking method A). The used method information is 2-bit data. In the control unit 115 of the data processing apparatus 110, according to the value of this data, the used method information indicating the watermarking method used for embedding the relevant information in the supply audio data is obtained.

FIG. 3 shows the values of the first and second bits of the two-bit data as the used method information. The value "00" of the used method information indicates that the input digital data has no embedded information according to the watermarking method. Further, the values "01", "10", and "11" of the used method information indicate that the input digital data has embedded information according to the watermarking methods A, B, and C, respectively.

Hereinafter, the operation of the data processing apparatus 110 will be described.

(Acquisition of Digital Data)

Initially, in the data processing apparatus 110, the data obtaining unit 111 obtains desired digital data from the network signal Sn on the network N. It is assumed that the desired digital data is the information-embedded digital audio data (distributed audio data) Dau, in which relevant information such as copyright information has been embedded, as a watermark, in supply audio data to be supplied from the distribution end to the user, by a predetermined watermarking method (e.g., the watermarking method A).

To be specific, the network signal (transmission signal) Sn corresponding to the desired digital data, which has been transmitted from the network N through the network cable, is received by the network interface 111a of the data obtaining unit 111. The received network signal Sn is converted to the desired digital data Dau by decoding in the received signal decoder 111b. The desired digital data Dau so obtained is transmitted through the data bus Dbus to the extraction unit 112, the insertion unit 113, and the control unit 115.

While in this first embodiment all of the digital data obtained by the data processing apparatus 110 are subjected to the data conversion process, only some of the obtained digital audio data selected by the user of the apparatus may be subjected to the data conversion process.

While in this first embodiment the digital data received by the data processing apparatus 110 is only the information-embedded digital data Dau, the data processing apparatus 110 may receive other kinds of digital data than the information-embedded digital data Dau as long as the apparatus 110 can identify the received digital data as digital data to be subjected to the data conversion process.

(Acquisition of Used Method Information)

Then, the information-embedded digital data Dau obtained by the data obtaining unit 111 is transmitted through the data bus Dbus to the extraction unit 112 and the control unit 115. In the control unit 115, since the information-embedded digital data Dau is composed of the fixed-length first data section Dau1 and the variable-length second data section Dau2, the first data section is distinguished from the second data section, and the extraction unit 112 extracts the used method information from the first data section in accordance with a control signal from the control unit 115.

To be specific, in the extraction unit 112, the used method information which has been embedded by the predetermined watermarking method is extracted from the first data section Dau1 of the information-embedded digital data Dau, according to the control signal from the control unit 115. Since the two-bit data having the value of "01" is included as the used method information in the digital data corresponding to the first data section, the extraction unit 112 obtains the used method information indicating the used watermarking method A from the first data section The used method information so obtained is stored in the execution memory of the control unit 115.

While in this first embodiment the predetermined watermarking method is the versatile watermarking method A, any of the methods A, B, and C may be used for embedding the used method information, according to the construction of the control unit 115. Further, an arbitrary watermarking method other than these methods may be employed.

(Extraction of Embedded Information)

In the second data section Dau2 of the information-embedded digital data Dau transmitted from the data obtaining unit 111 through the data bus Dbus to the extraction unit 112, the relevant information has been embedded by the watermarking method A which is indicated by the obtained used method information.

In the extraction unit 112, the relevant information (embedded information) is extracted from the information-embedded digital data Dau in accordance with the used method information stored in the execution memory of the control unit 115. The relevant information so extracted is once stored in the execution memory of the control unit 115.
(Re-embedding of Embedded Information)

In the insertion unit 113, the relevant information which is stored in the execution memory of the control unit 115 is embedded again in the information-embedded digital data Dau from the data obtaining unit 111, by the predetermined watermarking method, whereby output digital data is created. At this time, the relevant information which was embedded in the second data section Dau2 of the information-embedded digital data Dau is again embedded in the second data section Dau2, by the predetermined watermarking method. Further, during this information re-embedding process, the used method information indicating the used watermarking method is inserted in the first data section Dau1 of the information-embedded digital data Dau so as to define that the information is embedded by the predetermined watermarking method. In this case, the used watermarking method is the predetermined watermarking method. Then, the output digital data so created is supplied to the recording unit 114 through the data bus Dbus.
(Recording of Output Digital Data)

When the output digital data is supplied from the insertion unit 113 through the data bus Dbus to the recording unit 114, the output digital data is stored in the DVD-RAM disk in the recording unit 114. Since a file system is constructed in the DVD-RAM disk, the output digital data is given an arbitrary file name and recorded in the DVD-RAM disk.

Although the digital audio data is recorded with an arbitrary file name by utilizing the file system of the DVD-RAM disk, the recording manner is not restricted thereto.

For example, the digital audio data may be simply recorded from the head of the recording area of the DVD-RAM medium. Further, the digital audio data may be written in a vacant area of the DVD-RAM disk which is detected at the time of recording the data in the disk. Furthermore, the digital audio data may be written in an area of the DVD-RAM disk which is specified by the user of the apparatus.

While in this first embodiment the file name used when the digital audio data is recorded in the DVD-RAM disk is an arbitrary one, the user may specify the file name. Further, a file name described in attribute information which follows or is included in the digital data, may be used.

As described above, the data processing apparatus 110 according to this first embodiment is provided with the data obtaining unit 111 which obtains the information-embedded digital data Dau in which the relevant information such as copyright information is embedded as a watermark, from the network signal Sn on the network N, and the control unit 115 which obtains the used method information indicating the watermarking method which has been used when embedding the copyright information or the like. According to the obtained used method information, the embedded information such as copyright information is extracted from the information-embedded digital data Dau by using an appropriate watermarking method, and the extracted information such as copyright information is embedded again in the information-embedded digital data Dau by using a predetermined watermarking method, thereby creating the output digital data to be recorded on the recording medium. Therefore, regardless of the watermarking method by which the relevant information has been embedded in the received digital data Dau, a reproduction apparatus as a domestic electrical apparatus can appropriately reproduce the information-embedded digital data Dau recorded on the recording medium, according to the embedded information such as copyright information.

To be specific, since the used watermarking method information is embedded in the information-embedded digital data in which the relevant information has been embedded by a watermarking method, the data processing apparatus which obtains this information-embedded digital data can distinguish the watermarking method used for embedding the relevant information in the digital data. Thereby, in the data processing apparatus, extraction or removal of the embedded information can be performed without extracting wrong information by using another method or without changing a portion other than the embedded information by using another method.

As the result, at the distribution end from which digital data such as audio data is distributed to the user, the relevant information can be embedded as a watermark in the supply digital data to be supplied, by using a desired watermarking method. In other words, especially when the digital data is recorded on a recording medium at the user end, the distribution end of the digital data can select a watermarking method which provides the least degradation due to the information embedding process. Further, the distribution end can select the optimum method according to the communication rate or the like when transmitting the digital data.

Further, when the information-embedded digital data obtained from the network N is recorded on a writable recording medium, a watermarking method, which is different from the watermarking method used for embedding information in the supply digital data at the distribution end, can be used for embedding information in the digital data to be written in the recording medium. Therefore, information can be embedded in digital data by a watermarking method adapted to an apparatus which reproduces the digital data.

[Embodiment 2]

Figure 4:
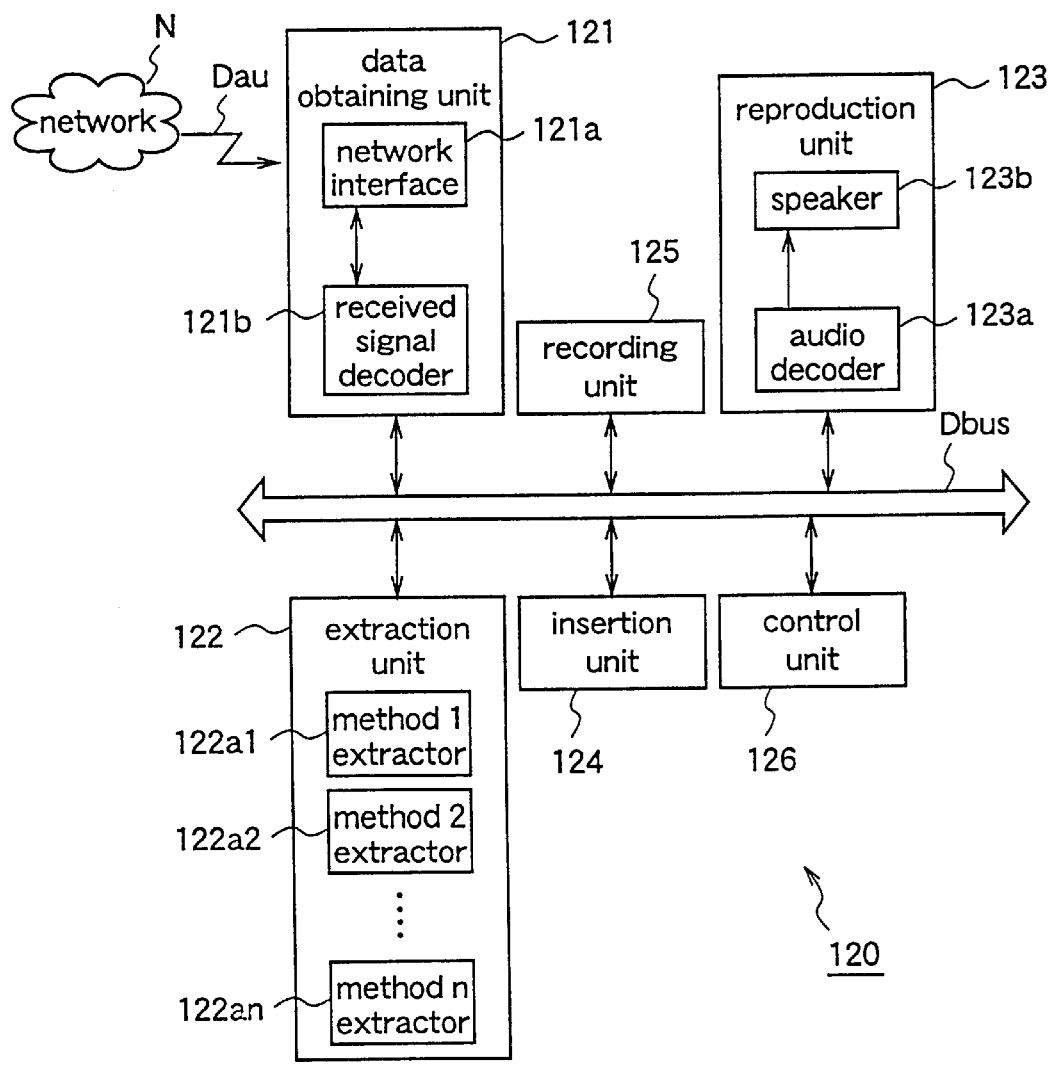
FIG. 4 is a block diagram for explaining a data processing apparatus according to a second embodiment.

FIG. 4 is a block diagram for explaining a data processing apparatus 120 according to a second embodiment of the present invention.

This data processing apparatus 120 obtains, from a network signal Sn on a network N, information-embedded digital audio data (distributed audio data) Dau as input audio data, and audio data attribute information (hereinafter also referred to simply as attribute information) indicating the attribute of the distributed audio data Dau. on receipt of these data, the data processing apparatus 120 embeds information in the input audio data and reproduces the input audio data, in accordance with control information included in the attribute information.

The information-embedded digital audio data Dau is obtained, at the distribution end, by embedding information in digital audio data to be supplied from the distribution end to the user (supply audio data) by using various watermarking methods. The audio data attribute information is transmitted from the distribution end together with the information-embedded digital audio data Dau. There are several transmission modes for the audio data attribute information, for example, the attribute information is arranged in a predetermined position (fixed position) in the audio data Dau to be transmitted, or the attribute information is multiplexed in the audio data Dau to be transmitted, or the attribute information is transmitted as a data file separated from the audio data Dau to he transmitted.

Hereinafter, an electronic distribution system for audio data, including the data processing apparatus 120 of this second embodiment, will be described in detail.

In the electronic distribution system, the information-embedded digital audio data Dau and the corresponding audio data attribute information are electronic-distributed from the distribution end by the network signal Sn through the network N.

The audio data attribute information has a data structure including at least used watermarking method information (used method information). The used method information indicates the watermarking method which has been used for embedding relevant information in the supply audio data at the distribution end (used watermarking method). It is needless to say that the audio data attribute information may include other information in addition to the used method information.

Further, when employing a specific method for constructing watermarking methods, even if plural pieces of information are embedded in one piece of target audio data by using the corresponding watermarking methods, the plural pieces of information do no affect each other. For example, when information is embedded in a high-frequency domain of the target audio data by using a watermarking method while information is embedded in a low-frequency domain of the target audio data by using another watermarking method, the embedded two pieces of information do not affect each other.

(Data Structure of Used Watermarking Method Information)

In this second embodiment, in order to cope with the above-described case, the used watermarking method information has a data structure which enables setting of method use status information indicating whether or not each of plural watermarking methods has been used for embedding information in the supply audio data.

Figure 5:
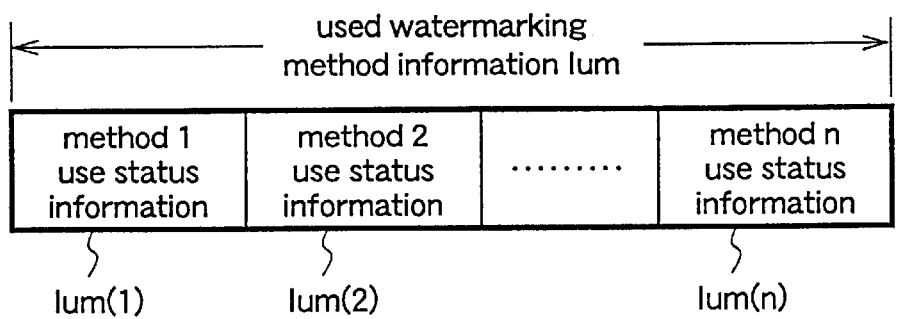
FIG. 5 is a diagram illustrating the data structure of used watermarking method information included in audio data attribute information supplied to the data processing apparatus of the second embodiment.

FIG. 5 is a diagram illustrating the data structure of the used watermarking method information Ium.

This used watermarking method information Ium is composed of plural pieces of method use status information Ium(1), Ium(2), . . . , Ium(n) corresponding to plural watermarking methods (n pieces of watermarking methods) which may be used in the information embedding process at the distribution end.

To be specific, method 1 use status information Ium(1) indicates whether a watermarking method (1) has been used for embedding information in the supply audio data. The value "1" of this information Ium(1) indicates that the watermarking method (1) has been used for the information embedding process at the distribution end, while the value "0" thereof indicates that the watermarking method (1) has not been used for the information embedding process at the distribution end. Likewise, method 2 use status information Ium(2), . . . , method n use status information Ium(n) indicate whether watermarking methods (2), . . . , (n) have been used for embedding information in the supply audio data. The value "1" of the information Ium(2), . . . , Ium(n) indicates that the corresponding watermarking methods (2), . . . , (n) have been used for the information embedding process at the distribution end while the value "0" of the information Ium(2), . . . , Ium(n) indicates that the corresponding watermarking methods (2), . . . , (n) have not been used for the information embedding process at the distribution end.

(Data Structure of Embedded Information)

The embedded information in the information-embedded digital audio data includes at least reproduction permission information. This reproduction permission information indicates whether reproduction of the information-embedded digital audio data Dau obtained as input digital audio data is permitted or not. The value "1" of this information indicates that reproduction of the audio data Dau is permitted while the value "0" of this information indicates that reproduction of the audio data Dau is not permitted.

(Construction of Data Processing Apparatus)

The data processing apparatus 120 of this second embodiment includes a data obtaining unit 121 and an extraction unit 122. The data obtaining unit 121 obtains, from the network signal Sn on the network N, the information-embedded digital audio data (distributed audio data) Dau as input digital audio data, and the audio data attribute information which is transmitted together with the distributed audio data Dau. The extraction unit 122 extracts the embedded information from the digital audio data Dau according to a control signal.

The data obtaining unit 121 comprises a network interface 121a which exchanges the network signal Sn signal with the network N, and a received signal decoder 121b which decodes the network signal Sn supplied from the interface 121a to generate the information-embedded digital audio data Dau and the audio data attribute information. Further, the extraction unit 122 comprises a method 1 extractor 121a1, a method 2 extractor 121a2, . . . , a method n extractor 121an corresponding to the above-described watermarking methods (1), (2), . . . , (n), respectively, and the embedded information is extracted from the information-embedded digital audio data Dau by a desired extractor in accordance with a control signal.

For example, the method 1 extractor 121a1 extracts the embedded information from the digital audio data Dau by using the watermarking method (1). The method 2 extractor 121a2 extracts the embedded information from the digital audio data Dau by using the watermarking method (2). The method n extractor 121an extracts the embedded information from the digital audio data Dau by the watermarking method (n).

Further, the data processing apparatus 120 includes an insertion unit 124 and a recording unit 125. The insertion unit 124 embeds the extracted information again in the information-embedded digital data Dau by using a predetermined watermarking method employed in reproduction apparatuses as domestic electrical equipment, thereby generating output digital data. The recording unit 125 stores the output digital data.

Further, the data processing apparatus 120 includes a reproduction unit 123 and a control unit 126. The reproduction unit 123 reproduces the information-embedded digital audio data Dau obtained in the data obtaining unit 121, according to a control signal. The control unit 126 controls the respective units 121~125 by using the corresponding control signals. The reproduction unit 123 comprises an audio decoder 123a which converts the information-embedded digital data Dau to an audio signal, and a speaker 123b which converts the audio signal to sound. Further, the control unit 126 comprises a CPU which performs various kinds of arithmetic processing and data processing, and a RAM (Random Access memory) which stores the operation program of the CPU, thereby controlling the operations of the respective units 121~125. The RAM also serves as an execution memory for temporarily storing the audio data or the audio data attribute information.

To be specific, the control unit 126 decides the value of each method use status information in accordance with the used watermarking method information which is included in the audio data attribute information obtained by the data obtaining unit 121, and controls the process of extracting the embedded information by the method extractor corresponding to each watermarking method, in accordance with the result of the decision. Further, the control unit 126 controls the process of reproducing the audio data Dau by the reproduction unit 123, in accordance with the reproduction permission information included in the extracted information. To be specific, when the values of the reproduction permission information included in all of the method use status information constituting the used watermarking method information are "1", the control unit 126 permits the reproduction unit 123 to reproduce the audio data Dau, and controls the reproduction unit 123 so that it reproduces the audio data Dau.

Further, in the data processing apparatus 120, the respective units are connected with each other by a data bus Dbus, and the control unit 126 controls not only the extraction unit 122 and the reproduction unit 123 but also the data obtaining unit 121, the insertion unit 124, and the recording unit 125.

Further, the extraction unit 122 and the insertion unit 124 are implemented by custom LSIs, respectively. The recording unit 125 is implemented by a DVD-RAM drive, wherein the output digital audio data is recorded in a DVD-RAM disk.

Hereinafter, a description will be given of the operation of the data processing apparatus 120.

(Acquisition of Audio Data Dau and Attribute Information Dpr)

When a network signal Sn supplied from the network N through the network cable is received by the network interface 121a of the data obtaining unit 121, the received network signal Sn is output to the received signal decoder 121b. The signal decoder 121b decodes the network signal Sn to generate the information-embedded digital audio data Dau and the audio data attribute information Dpr which follows the audio data Dau.

The audio data Dau so obtained is sent to the extraction unit 122 and the insertion unit 121 through the data bus Dbus, while the audio data attribute information Dpr is sent to the control unit 126 through the data bus Dbus. In the control unit 126, the audio data attribute information Dpr is temporarily stored in the RAM serving as an execution memory.

(Extraction of Embedded Information)

The control unit 126 controls the extraction unit 122 by a control signal, in accordance with the used watermarking method information included in the audio data attribute information Dpr. That is, according to the value of each of the method use status information included in the used watermarking method information, the control unit 126 outputs a control signal to the corresponding method extractor.

To be specific, in the control unit 126, initially, the value of the method 1 use status information in the used watermarking method information is referred to. When the value of the method 1 use status information is "1", the control unit 126 outputs a control signal which instructs the method 1 extractor 122a1 in the extraction unit 122 to extract the embedded information from the input audio data Dau by using the watermarking method (1). Thereby, in the method 1 extractor 122a1, the information which has been embedded by the watermarking method (1) is extracted from the audio data Dau by the watermarking method (1). The information so extracted is temporarily stored in the execution memory of the control unit 126 via the data bus Dbus. On the other hand, when the value of the method 1 use status data is "0", the control unit 126 does not output a control signal which instructs extraction of the embedded information from the input audio data Dau, to the method 1 extractor 122a1.

Next, in the control unit 126, the value of the method 2 use status information included in the used watermarking method information is referred to. When the value of the method 2 use status data is "1", the control unit 126 outputs a control signal which instructs the method 2 extractor 122a2 in the extraction unit 122 to extract the embedded information from the input audio data Dau by the watermarking method (2). Thereby, in the method (2) extractor 122a2, the information which has been embedded by the watermarking method (2) is extracted from the input audio data Dau by the watermarking method (2). The information so extracted is temporarily stored in the execution memory of the control unit 126 via the data bus Dbus. On the other hand, when the value of the method 2 use status information is "0", the control unit 126 does not output a control signal which instructs extraction of the embedded information from the input audio data Dau, to the method 2 extractor 122a2.

In this way, in the control unit 126, the process of supplying a control signal to the corresponding method extractor according to the value of the method use status data is performed for each of the plural pieces of method use status information (method 1 use status information~method n use status information) which may be used at the distribution end, and accordingly, each method extractor extracts the embedded information from the input audio data Dau in response to the control signal from the control unit 126. Thereby, plural pieces of embedded information are extracted.

(Reproduction of Audio Data Dau)

Thereafter, the control unit 126 decides the values of the reproduction permission information included in all of the information obtained by the above-described information extraction process. According to the result of the decision, the control unit 126 outputs a control signal indicating whether the input digital audio data Dau is to be reproduced or not, to the reproduction unit 123.

To be specific, when the values of the reproduction permission information included in all of the method use status information constituting the used watermarking method information are "1", the control unit 126 permits the reproduction unit 123 to reproduce the audio data Dau. Then, under control of the control unit 126, the audio data Dau is transmitted from the data obtaining unit 121 through the data bus Dbus to the reproduction unit 123. In the reproduction unit 123, the received audio data Dau is decoded by the audio decoder 123a to be converted to an audio signal, and sound corresponding to this audio signal is output from the speaker 123b.

(Re-embedding of Embedded Information)

Further, in the data processing apparatus 120, independently of the process of reproducing the audio data Dau obtained by the data obtaining unit 121, the information (embedded information) extracted from the audio data Dau is again embedded in the audio data Dau by a predetermined watermarking method. The predetermined watermarking method is a watermarking method employed in reproduction apparatuses as domestic electrical equipment.

As described above, in the control unit 126, the watermarking method which has been used for embedding information in the target audio data at the distribution end is decided according to the value of each method use status data included in the used watermarking method information, and according to the result of the decision, the information embedded by the corresponding watermarking method is supplied to the insertion unit 124.

In the insertion unit 124, the information supplied from the control unit 126 is again embedded in the audio data Dau supplied from the data obtaining unit 121, by the predetermined watermarking method, thereby generating output digital audio data.

(Recording of Output Digital Audio Data)

The output digital audio data generated in the insertion unit 124 is supplied to the recording unit 125 and recorded in a recording medium, according to a control signal from the control unit 126. The recording unit 125 is implemented by a DVD-RAM drive, and the output digital audio data is stored in a DVD-RAM disk.

In this second embodiment, the control unit 126 permits the reproduction unit 123 to reproduce the audio data Dau only when the values of the reproduction permission information included in all of the method use status information constituting the used watermarking method information are "1". However, the condition under which the control unit 126 permits the reproduction unit 123 to reproduce the audio data Dau is not restricted thereto.

For example, reproduction of the audio data Dau may be permitted when the value of at least one piece of reproduction permission information included in the method use status information is "1".

Alternatively, whether reproduction of the audio data Dau is to be permitted or not may be decided as follows. That is, a weighting factor is set for each of the method use status information constituting the used watermarking method information, and the product of this weighting factor and the value of the reproduction permission information included in each method use status information is obtained, and then the products obtained for all of the method use status information are summed up. According to whether this sum exceeds a predetermined threshold or not, reproduction of the audio data Dau is permitted.

As described above, according to the second embodiment of the present invention, the data processing apparatus 120 is provided with the data obtaining unit 121 which receives a network signal Sn from the network N and obtains the information-embedded digital audio data Dau and the audio data attribute information Dpr. The embedded information, which has been embedded in the audio data Dau by various watermarking methods, is extracted from the audio data Dau according to the method use status information included as the used watermarking method information in the audio data attribute information Dpr, and reproduction of the audio data Dau is controlled according to each extracted information. Therefore, in the data processing apparatus 120 receiving the audio data Dau, reproduction of the audio data Dau can be correctly controlled according to the embedded information which has been embedded in the audio data Dau by various watermarking methods at the distribution end.

Furthermore, since the extracted information is again embedded in the audio data Dau by a predetermined watermarking method and then recorded in the recording medium, even if the information has been embedded by using various watermarking methods at the distribution end of the audio data Dau, the embedded information in the audio data Dau corresponding to the respective watermarking methods can be converted to information corresponding to the predetermined watermarking method. Thereby, as in the first embodiment of the invention, even in a reproduction apparatus as a domestic equipment which employs the predetermined watermarking method, the information-embedded digital audio data supplied from the network can be reproduced satisfactorily according to the embedded information which has been embedded by the various watermarking methods.

While in this second embodiment, the reproduction unit 123 reproduces the obtained information-embedded digital audio data (distributed audio data) Dau, the reproduction unit 123 may reproduce the data which is obtained by re-embedding the embedded information in the distributed audio data Dau.

In this second embodiment, the information-embedded digital data may be obtained by embedding plural pieces of relevant information in the supply digital data by using a plurality of watermarking methods, and the insertion unit may embed a predetermined number of relevant information amongst the plural pieces of relevant information, in the input digital data, by using the corresponding watermarking methods amongst the plural watermarking methods or using a watermarking method which is different from these watermarking methods, thereby generating the output digital data.

[Embodiment 3]

Figure 6:
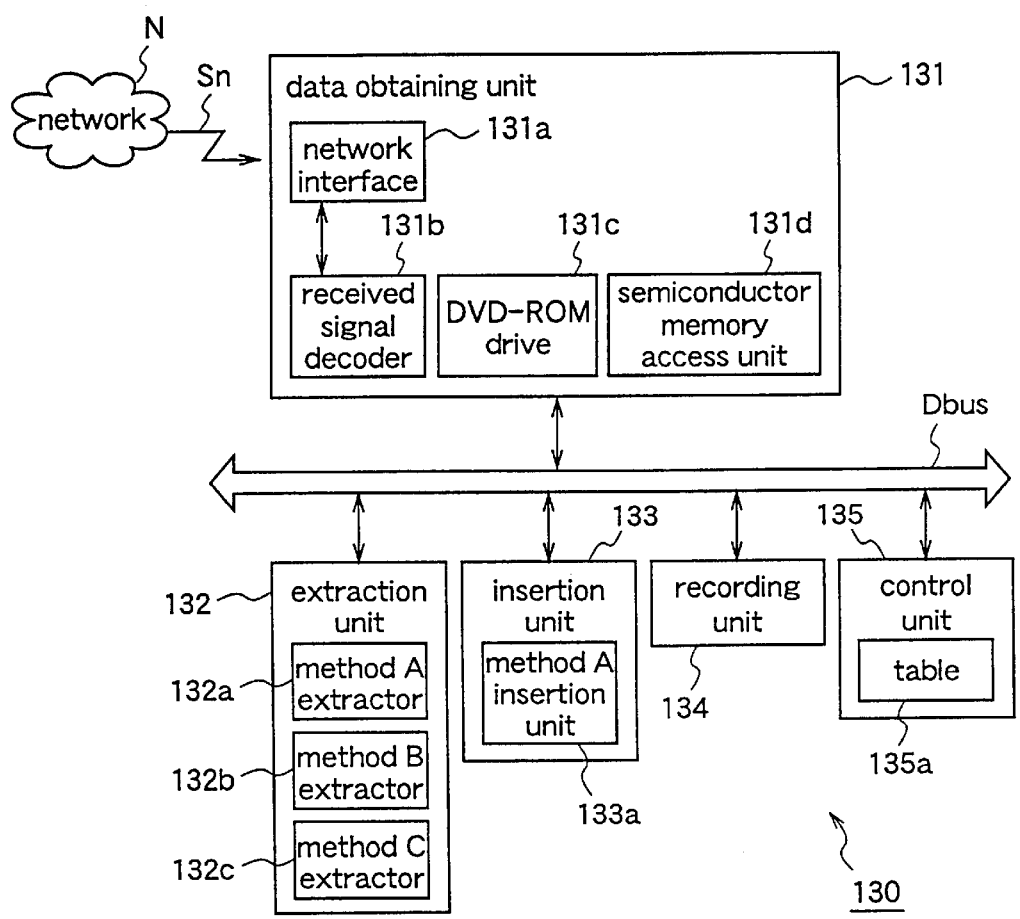
FIG. 6 is a block diagram for explaining a data processing apparatus according to a third embodiment.

FIG. 6 is a block diagram for explaining a data processing apparatus 130 according to a third embodiment of the present invention.

The data processing apparatus 130 obtains information-embedded audio data (distributed audio data) Dau which has been obtained by embedding information in digital audio data to be supplied from the distribution end to the user (supply audio data) by using various watermarking methods, from a network signal Sn on a network N or various kinds of data recording media. Then, the apparatus 130 decides whether the information has been embedded in the distributed audio data Dau by a predetermined watermarking method or not and, according to the result of this decision, embeds the information again in the distributed audio data Dau.

The predetermined watermarking method is a versatile method employed in reproduction apparatuses as domestic electrical equipment. Further, in the data processing apparatus 130, when the embedded information in the obtained audio data Dau has been embedded by the predetermined watermarking method, this audio data Dau is recorded in a data recording medium as it is. on the other hand, when the embedded information in the obtained audio data Dau has been embedded by a watermarking method other than the predetermined watermarking method, the embedded information is extracted from the audio data Dau by using the corresponding watermarking method. Then, the extracted information is again embedded in the audio data Dau by using the predetermined watermarking method, and the resultant audio data is recorded in the recording medium.

Hereinafter, a description will be given of an audio data supply system including the data processing apparatus 130 of this third embodiment.

In the supply system, there are two cases where the audio data (distributed audio data) is supplied by electronic distribution from the network N and where audio data is supplied by distribution from the data recording medium.

(Data Structure of Audio Data)

In this third embodiment, the supplied audio data (distributed audio data) has a data structure including no information relating to a watermarking method. Therefore, the data processing apparatus 130 distinguishes the watermarking method which has been used for embedding information in the supplied audio data, according to the route through which the audio data is obtained (hereinafter referred to as "data obtaining route").

To be specific, for digital data like the above-mentioned audio data, a watermarking method is decided in advance according to its supply mode, and so the watermarking method which has been used for embedding information in this data can be specified by specifying the data obtaining route.

For example, when the audio data is supplied through a network, a watermarking method according to a protocol used for communication is employed. Further, when the audio data is supplied from a recording medium, a watermarking method according to the type of the recording medium is employed. Therefore, the audio data supply system of this third embodiment does not require the following processes according to the first and second embodiments: the process of inserting the corresponding used watermarking method information in the information-embedded digital audio data to be electronic-distributed (first embodiment); and the process of inserting the used watermarking method information in the audio data attribute information which follows the digital audio data to be electronic-distributed (second embodiment).

(Construction of Data Processing Apparatus)

The data processing apparatus 130 of this third embodiment includes a data obtaining unit 131 and an extraction unit 132. The data obtaining unit 131 obtains, as the distributed audio data, the information-embedded digital audio data from the network signal Sn on the network N, and the information-embedded digital audio data from the data recording medium. The extraction unit 132 extracts the embedded information from the distributed audio data in accordance with a control signal.

The data obtaining unit 131 comprises a network interface 131a which exchanges the network signal Sn with the network N; a received signal decoder 131b which decodes the network signal Sn from the interface 131a to generate the information-embedded digital audio data (distributed audio data); a DVD-ROM drive 131c which reads the information-embedded digital audio data from a DVD-ROM disk; and a semiconductor memory access unit 131d which reads the information-embedded digital audio data from a semiconductor recording medium.

Further, the extraction unit 132 comprises a method A extractor 132a, a method B extractor 132b, and a method C extractor 132c which correspond to the watermarking methods A, B, and C, respectively. In the extraction unit 132, the embedded information in the information-embedded digital audio data is extracted by a desired extractor according to a control signal.

For example, the method A extractor 132a extracts the embedded information from the information-embedded digital audio data by using the watermarking method A. The method B extractor 132b extracts the embedded information from the information-embedded digital audio data by using the watermarking method B. The method C extractor 132c extracts the embedded information from the information-embedded digital audio data by using the watermarking method C.

Further, the data processing apparatus 130 includes an insertion unit 133 and a recording unit 134. The insertion unit 133 embeds the information extracted by the extraction unit 132 again in the information-embedded digital audio data by using a predetermined watermarking method employed in reproduction apparatuses as domestic electrical equipment, thereby generating output audio data. The recording unit 134 stores the output audio data. The insertion unit 133 includes a method A insertion unit 133a which embeds the extracted information in the information-embedded digital audio data by using the watermarking method A.

Further, the data processing apparatus 130 includes a control unit 135 which controls the respective units 131~134 by the corresponding control signals. In this data processing apparatus 130, the respective units 131~135 are connected with each other through a data bus Dbus.

The extraction unit 132 and the insertion unit 133 are implemented by custom LSI, respectively. The recording unit 134 is provided with a DVD-RAM drive, wherein the output digital audio data is recorded in a DVD-RAM disk.

The control unit 135 comprises a CPU which performs various kinds of arithmetic processing and data processing, and a RAM (Random Access Memory) which contains the operation program for the CPU. The control unit 135 controls the operations of the respective units 131~134. The RAM also serves as an execution memory which temporarily stores the audio data output from the respective units, and the used watermarking method information.

Further, the control unit 135 has a table 135a in which the data obtaining routes are correlated with the watermarking methods. This table 135a is stored in a nonvolatile memory in the control unit 135. The control unit 135 further includes a method information decision means and a re-insertion decision means. The method information decision means decides the information indicating the watermarking method which has been used when embedding the information in the obtained audio data (used watermarking method information) in accordance with the information indicating the data obtaining route (hereinafter referred to simply as "route information"). The re-insertion decision means decides whether the extracted information is to be inserted again in the obtained audio data or not, in accordance with the used watermarking method information.

The watermarking method used for the digital audio data obtained from the network signal Sn on the network N depends on information relating to a server connected to the network N through which the audio data is obtained (URL: Uniform Resource Locator), a communication protocol used when the audio data is obtained, and the like. Further, the watermarking method for the digital audio data stored in the data recording medium depends on the type of the data recording medium. So, if the data obtaining route is found, the control unit 135 can decide one watermarking method corresponding to the audio data by referring to the table 135a. In this third embodiment, the data obtaining unit 131 decides the audio data obtaining route, and information indicating the audio data obtaining route is supplied from the data obtaining unit 131 to the control unit 135.

Furthermore, in this third embodiment, the watermarking method B corresponds to the audio data obtained from the network signal Sn on the network N, the watermarking method A corresponds to the audio data obtained from the DVD-ROM, and the watermarking method C corresponds to the audio data obtained from the semiconductor recording medium. Further, the predetermined watermarking method which is employed in reproduction apparatuses or the like as domestic electrical equipment, is the watermarking method A.

While in this third embodiment a DVD-ROM disk and a semiconductor memory are employed as data recording media, other media such as a DVD-RAM disk and a CD-ROM disk may be employed. Since a predetermined watermarking method is used for each of these recording media, the receiver of digital data stored in each of these recording media can distinguish the corresponding watermarking method according to the data obtaining route.

Next, the operation of the data processing apparatus 130 will be described.

(Acquisition of Digital Audio Data)

In the data processing apparatus 130 of this third embodiment, digital audio data is obtained from the network signal Sn on the network N or from the recording medium. For example, the network signal Sn on the network N is transmitted through the network cable and received by the network interface 131a of the data obtaining unit 131. The received network signal Sn is decoded by the received signal decoder 131b, thereby generating the information-embedded digital audio data (distributed audio data) Dau. On the other hand, the digital audio data recorded in the DVD-ROM disk is read by the DVD-ROM drive 131c in the data obtaining unit 131. Further, the digital audio data recorded in the semiconductor memory is read by the semiconductor memory access unit 131d in the data obtaining unit 131.

The distributed audio data obtained in the data obtaining unit 131 is supplied to the extraction unit 132 and the insertion unit 133 Further, this digital audio data is supplied to the control unit 135, together with the route information indicating the route through which it is obtained. In the control unit 135, the digital audio data is temporarily stored in the execution memory.

(Acquisition of Used Watermarking Method Information)

In the control unit 135, it is decided which of the plural watermarking methods on the table 135a has been used for embedding the information in the digital audio data supplied from the data obtaining unit 135, based on the route information, by referring to the correspondence of the data obtaining routes and the watermarking methods on the table 135a. The result of this decision is temporarily stored in the execution memory of the control unit 135.

(Extraction of Embedded Information)

In the extraction unit 132, the embedded information is extracted from the digital audio data obtained in the data obtaining unit 131, by a watermarking method according to a control signal from the control unit 135.

For example, when it is decided that the obtained digital audio data corresponds to the watermarking method A, the extraction unit 132 is controlled so that extraction of the embedded information from the digital audio data is performed by the watermarking method A. To be specific, extraction of the embedded information is performed by the method A extractor 132 under control of the control signal from the control unit 135.

Further, when it is decided in the control unit 135 that the obtained digital audio data corresponds to the watermarking method B, in the extraction unit 132, extraction of the embedded information is performed by the method B extractor 132b. When it is decided that the obtained digital audio data corresponds to the watermarking method C, extraction of the embedded information is performed by the method C extractor 132c.

(Decision About Re-embedding of Embedded Information)

When the digital audio data obtained in the data obtaining unit 131 corresponds to the watermarking method A, the control unit 135 decides that it is not necessary to embed the information embedded in this digital audio data again in this digital audio data by using another watermarking method. The reason is as follows. The information embedded in this digital audio data can be extracted by a reproduction apparatus employing the predetermined watermarking method (in this case, method A), for example, an existing reproduction apparatus for playing a DVD-RAM disk.

On the other hand, when the digital audio data obtained in the data obtaining unit 131 corresponds to the watermarking method B, the control unit 135 decides that it is necessary to embed the embedded information again in the digital audio data by the watermarking method A.

(Re-embedding of Embedded Information)

When the digital audio data corresponds to the watermarking method A and the control unit 135 decides that re-embedding of information in the digital audio data is not necessary, no control signal is supplied from the control unit 135 to the insertion unit 133, and the digital audio data stored in the execution memory of the control unit 135 is supplied to the recording unit 134.

On the other hand, when the digital audio data corresponds to the watermarking method B and the control unit 135 decides that re-embedding of information in the digital audio data is necessary, in the insertion unit 133, the information embedded in the information-embedded digital audio data (distributed audio data) is again embedded in the distributed audio data by the watermarking method A in accordance with a control signal from the control unit 135.

(Recording of Digital Audio Data)

The digital audio data which is decided in the control unit 135 as corresponding to the watermarking method A is recorded in the recording unit 134 without being subjected to the re-embedding process in the insertion unit 133. on the other hand, the digital audio data which is decided in the control unit 135 as corresponding to a watermarking method other than the method A is subjected to the re-embedding process in the insertion unit 133 and, thereafter, stored in the recording unit 134.

As described above, according to the third embodiment of the invention, the data processing apparatus 130 includes, in addition to the constituents of the apparatus 110 of the first embodiment, the control unit 135 having the means for receiving the digital audio data in which information is embedded by a watermarking method, and deciding which of plural watermarking methods has been used for this digital audio data, according to the information indicating the route through which the audio data is obtained. Therefore, it is not necessary to provide-the audio data to be transmitted from the distribution end to the network N with the corresponding watermarking method information. Further, it is not necessary to provide the audio data to be stored in the recording medium with the corresponding watermarking method information.

Further, when the distributed audio data corresponds to a predetermined watermarking method employed in reproduction apparatuses or the like as domestic electrical equipment, this audio data is recorded as it is in the recording medium. On the other hand, when the distributed audio data corresponds to a watermarking method other than the predetermined method, the information embedded in the distributed audio data is again embedded in this audio data by the predetermined watermarking method, and the thus obtained data is recorded in the recording medium. Therefore, the digital audio data for which the re-embedding process is not required is prevented from being subjected to the information writing process again, thereby minimizing the processing for the digital audio data which causes degradation of sound quality.

[Embodiment 4]

Figure 7:
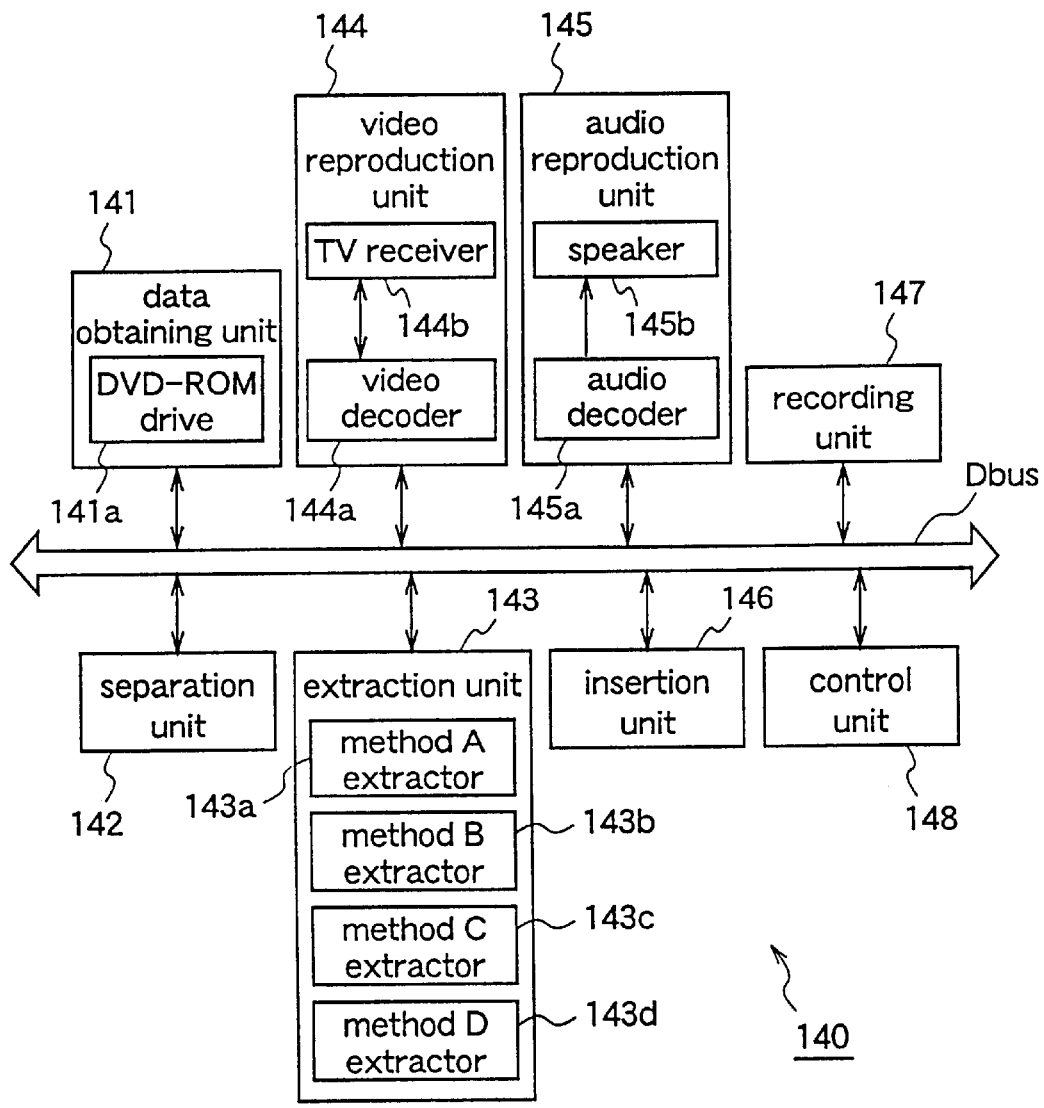
FIG. 7 is a block diagram for explaining a data processing apparatus according to a fourth embodiment.

FIG. 7 is a block diagram for explaining a data processing apparatus 140 according to a fourth embodiment of the present invention.

The data processing apparatus 140 reads multiplexed digital data obtained by multiplexing digital video data and digital audio data, from a data recording medium, and extracts embedded information from the digital audio data by using a watermarking method. Then, the apparatus 140 displays the extracted information as an image, and embeds the extracted information again in the digital audio data. In this fourth embodiment, the digital audio data included in the multiplexed digital data is data obtained by embedding relevant information in supply audio data to be supplied from the distribution end to the user by using a watermarking method (distributed audio data). Further, the extraction of the embedded information is performed by using an appropriate watermarking method, and the re-embedding process is performed by using a predetermined watermarking method which is employed in reproduction apparatuses or the like as domestic electrical equipment.

The appropriate watermarking method is identical to the watermarking method which has been used for embedding the relevant information in the supply audio data. Further, the multiplexed digital data corresponds to one program or one movie, and this is called a video object.

In the following description of the fourth embodiment, the digital video data and the digital audio data are referred to as video data and audio data, respectively.

(Data Structure of Video Object)

Figure 8:
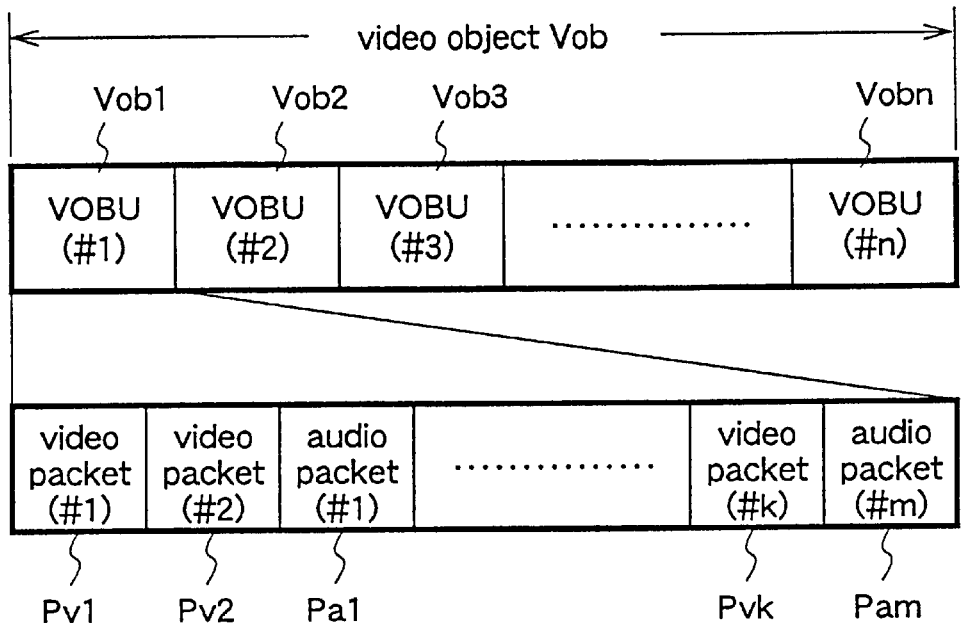
FIG. 8 is a diagram illustrating the data structure of a video object to be processed by the data processing apparatus of the fourth embodiment.

FIG. 8 shows the data structure of the video object.

In this fourth embodiment, the video object corresponds to one program stream in MPEG-2 (Moving Picture Experts Group Phase 2), and it is composed of plural video object units (VOBU).

Further, in a portion of the multiplexed digital data corresponding to one VOBU, video data and audio data are multiplexed by time division multiplexing. The digital data corresponding to one VOBU has a data quantity equivalent to a reproduction time required for about 15 frames (=0.5 sec). In this fourth embodiment, the unit of time division for data in one VOBU is 2048 bytes, and a portion comprising 2048 bytes of data is called a packet. Further, a packet comprising video data is called a video packet while a packet comprising audio data is called an audio packet.

For example, the video object Vob is composed of the first VOBU(#1) Vob1~the n-th VOBU(#n) Vobn, and the first VOBU(#1) Vob1 is composed of the first video packet (#1)Pv1~the k-th video packet (#k)Pvk, and the first audio packet (#1)Pa1~the m-th audio packet (#m)Pam.

Figure 9:
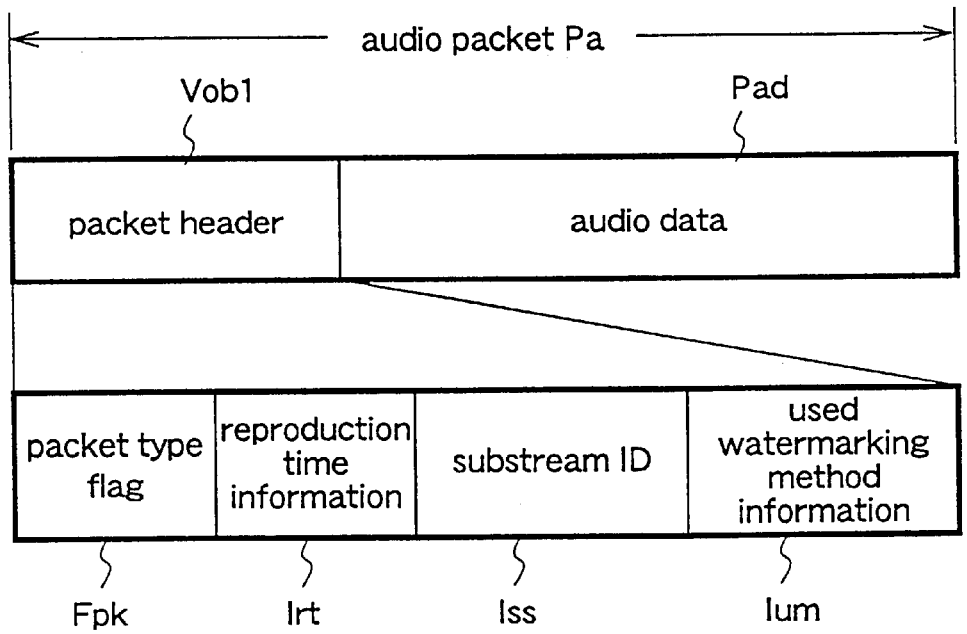
FIG. 9 is a diagram illustrating the data structure of an audio packet included in the video object.

FIG. 9 shows the data structure of an audio packet.

An audio packet Pa is composed of a packet header Pah and an audio data section Pad. An audio stream, which is a code string constituting audio data, is stored in the audio data section Pad, and information is embedded in the audio stream by an appropriate watermarking method. On the other hand, various kinds of information required for reproducing the audio data are stored in the packet header Pah.

To be specific, the packet header Pah contains a packet type flag Fpk, reproduction time information Irt, substream ID information Iss, and used watermarking method information Ium.

The packet type flag Fpk is information for identifying the type of the corresponding packet. The reproduction time information Irt indicates the time required for reproducing the data stored in the corresponding packet, and a relative time based on the reproduction time for the data at the head of the video object is used as the reproduction time.

Further, in the video object as multiplexed digital data, since plural kinds of audio streams can be multiplexed, information for identifying each audio stream is required. So, the packet header Pah contains the substream ID information Iss for identifying each of the plural kinds of audio streams included in the video object. For example, the substream ID information Iss indicates a serial number set for each audio stream.

Furthermore, the used watermarking method information Ium indicates a watermarking method by which information has been embedded in the audio streams stored in the audio data section Pad of the audio packet Pa.

Figure 10:
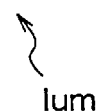
FIG. 10 is a diagram illustrating the values of 2-bit data stored in the header Pah of the audio packet as used watermarking method information Ium, and the meaning of each value.

FIG. 10 shows the values stored in the packet header Pah as the used watermarking method information Ium.

In FIG. 10, the used watermarking method information Ium is represented by 2-bit values (1st bit value and 2nd bit value). The value "00" of this method information Ium indicates that the watermarking method A has been employed for embedding information in the audio data. Likewise, the values "01", "10", and "11" of the method information Ium indicate that the watermarking methods B, C, and D have been employed for embedding information in the audio data.

In the data structure of the video object according to this fourth embodiment, the used watermarking method information corresponding to the supply audio data is stored in the audio packets constituting the video object. However, the used watermarking method information may be stored in the video packets or other kinds of packets.

Further, although the used watermarking method information corresponding to the supply audio data is stored in the packet header Pah of each audio packet Pa, the storage location of the used watermarking method information is not restricted thereto.

For example, the used watermarking method information may be stored in some audio packets amongst the audio packets constituting the video object.

Further, the used watermarking method information may be stored in a recording area of a DVD-ROM disk, separately from the video object. Further, the used watermarking method information may be embedded in the audio streams stored in the audio data section, by an appropriate method.

In this fourth embodiment, the audio packet Pa contains, in its packet header Pah, the packet type flag Fpk, the reproduction time information Irt, the substream ID information Iss, and the used watermarking method information Ium. However, other kinds of information than the above-mentioned Fpk, Irt, Iss and Ium may be stored in the packet header pah of the audio packet Pa.

(Construction of Data Processing Apparatus 140)

Turning to FIG. 7, the data processing apparatus 140 includes a data obtaining unit 141 and a separation unit 142. The data obtaining unit 141 has a DVD-ROM for reading the video object from a DVD-ROM disk, and obtains the video object according to a control signal. The separation unit 142 is constituted by a custom LSI, and separates video data and audio data from the obtained video object, according to a control signal.

Further, the data processing apparatus 140 includes an extraction unit 143 and an insertion unit 146. The extraction unit 143 is constituted by a custom LSI, and extracts embedded information from the used watermarking method information Ium which is stored in the header Pah of each audio packet Pa of the separated audio data, according to a control signal. The insertion unit 146 is constituted by a custom LSI, and embeds the extracted information again in the separated audio data by using a predetermined watermarking method, according to a control signal, thereby generating output audio data The extraction unit 143 comprises a method A extractor 143a, a method B extractor 143b, a method C extractor 143c, and a method D extractor 143d which correspond to the above-mentioned watermarking methods A, B, C, and D, respectively. In the extractor unit 143, the embedded information in the input audio data is extracted by a desired extractor, according to a control signal.

For example, the method A extractor 143a extracts the embedded information from the input audio data (distributed audio data) by the watermarking method A. The method B extractor 143b extracts the embedded information from the input audio data by the watermarking method B. The method C extractor 143c extracts the embedded information from the input audio data by the watermarking method C. The method D extractor 143*d* extracts the embedded information from the input audio data by the watermarking method D.

The data processing apparatus 140 further includes a video reproduction unit 144 and an audio reproduction unit 145. The video reproduction unit 144 performs image display of the separated video data, and image display of the information (e.g., copyright information) extracted from the audio data, according to a control signal. The audio reproduction unit 145 reproduces the output audio data. The video reproduction unit 144 comprises a video decoder 144*a* and a television receiver 144*b*. The video decoder 144*a* converts the video data to an analog video signal by signal processing such as decoding, and decodes the information (embedded information) such as copyright information supplied from the extraction unit 143. The television receiver 144*b* performs image display of the input analog video signal, and image display of the decoded information (embedded information). Further, the audio reproduction unit 145 comprises an audio decoder 145*a* and a speaker 145*b*. The audio decoder 145*a* decodes the audio data to output.an audio signal, and the speaker 145*b* converts the audio signal to sound to be output.

The data processing apparatus 140 further includes a recording unit 147 and a control unit 148. The recording unit 147 records the output audio data from the insertion unit 146, according to a control signal. The control unit 148 comprises a CPU which performs various kinds of arithmetic processing and data processing, and a RAM (Random Access Memory) which stores the operation program of the CPU. The control unit 148 controls the operations of the respective units 141~147 by using the control signals. The RAM of this control unit 148 also serves as an execution memory for temporarily storing the data from the separation unit 142, the information (embedded information) from the extraction unit 143, and the data from the insertion unit 146.

While in this fourth embodiment the audio reproduction unit 145 reproduces the obtained input audio data (distributed audio data), the audio reproduction unit 145 may reproduce the output audio data which is obtained by embedding the embedded information again in the input audio data by using a predetermined watermarking method.

Further, in this fourth embodiment, the data processing apparatus 140 includes the data obtaining unit 141 having a DVD-ROM drive. However, the data obtaining unit 141 may have any storage unit, such as a DVD-RAM drive, a CD-ROM drive, or a semiconductor memory reading unit, as long as it is a bulk storage unit capable of handling multimedia data.

Further, in this fourth embodiment, the data processing apparatus 140 includes, as units for reproducing the obtained video object, both of the video reproduction unit 144 for reproducing video data and the audio reproduction unit 145 for reproducing audio data. However, the data processing apparatus 140 may includes one of the video reproduction unit 144 and the audio reproduction unit 145. Further, the apparatus 140 may include, besides these units 144 and 145, a unit for reproducing data such as subtitle.

Further, in this fourth embodiment, the separation unit 142, the extraction unit 143, and the insertion unit 144 are constituted by custom LSI circuits, respectively. However, these units 142~144 may be constituted by a CPU performing various kinds of arithmetic processing and a RAM for storing the operation program of the CPU and also serving as an execution memory. In this case, these units 142~144 can share the constituents with the control unit 148.

Hereinafter, the operation of the data processing apparatus 140 will be described.

In the following description, for simplification, it is assumed that the video object is continuously recorded in the DVD-ROM drive, starting from the head of the data recording area of the disk.

(Reading of Video Object)

In the data obtaining unit 141, the multiplexed digital data as the video object are successively read in packet units, from the head of the reading area of the DVD-ROM disk, in accordance with the control signal from the control unit 148, and the read data are successively transmitted to the separation unit 142 in packet units.

(Separation of Video Object)

In the separation unit 142, the packet type flags Fpk which are stored in the packet headers of the respective packets (video packets and audio packets) are read. Then, the video packets and the audio packets are identified according to the packet type flags Fpk, and these packets are separated from the video object. Thereafter, under control of the control unit 148, the packets decided as being video packets are sent to the video reproduction unit 144 and the control unit 148, while the packets decided as being audio packets are sent to the extraction unit 143, the insertion unit 146, the audio reproduction unit 145, and the control unit 148.

(Extraction of Embedded Information)

In the control unit 148, the used watermarking method information Irm which is stored in the packet header Pah of the audio packet Pa (refer to FIG. 9) is read. Then, the value of the used watermarking method information Tum is decided, and a control signal according to the value of the method information is output to the extraction unit 143. In the extraction unit 143, according to the control signal, embedded information is extracted from the audio stream stored in the audio data section Pad of the audio packet Pa, by a method extractor according to an appropriate watermarking method. The embedded information includes information corresponding to a copyright display character string of the copyright holder.

For example, when the value of the used watermarking method information Ium is "00", the method A extractor 143*a* extracts the embedded information by using the watermarking method A, according to the control signal. Likewise, when the value of the used watermarking method information Ium is "01", "10", or "11", the method B extractor 143*b*, the method C extractor 143*c*, or the method D extractor 143*d* extracts the embedded information by using the watermarking method B, C, or D, according to the control signal, respectively.

(Reproduction of Video Data)

When the video packets separated in the separation unit 142 are supplied to the video reproduction unit 144, the video decoder 144*a* performs MPEG2 system decoding on the video data stored in each video packet, which data has been subjected to MPEG2 system coding, according to the control signal from the control unit 148. When a video signal obtained by the decoding process in the video decoder 144*a* is input to the TV receiver 144*b*, the video signal is reproduced and displayed.

(Display of Copyright Information)

When the copyright display character string information (embedded information) is supplied from the extraction unit 143 to the video reproduction unit 144, this information is converted to a display signal by the decoder 144*a* to be output to the TV receiver 144*b*. In the TV receiver 144*b*, the copyright display character string information is displayed so that it is laid over the display image corresponding to the video signal.

Although the copyright display character string information as copyright information is laid over the display image of the video signal, it may be displayed by display means other than the TV receiver. Image display of the copyright information is not necessarily performed.

(Reproduction of Audio Data)

When the audio packet Pa separated from the video object by the separation unit 142 is supplied to the audio reproduction unit 145, the audio decoder 145a performs LPCM decoding on the audio streams stored in the audio data section Pad of the audio packet Pa (i.e., audio data which has been subjected to LPCM coding), thereby generating an audio signal. This audio signal is converted to sound by the speaker 145b to be output.

In the data processing apparatus 140, while performing the above-described reproduction of the video data and the audio data, re-embedding of embedded information in the distributed audio data and recording of the output audio data obtained by the re-embedding process are carried out in like manner as described for the first to third embodiments.

(Decision About Re-embedding of Information)

When the audio data in the audio packet Pa supplied from the separation unit 142 corresponds to the watermarking method A, the control unit 148 decides that it is not necessary to embed the information embedded in this digital audio data again in this digital audio data by using another watermarking method. The reason is as follows. The information embedded in this audio data can be extracted by a reproduction apparatus which employs the predetermined watermarking method (in this case, method A), for example, an existing reproduction apparatus for a DVD-RAM disk.

On the other hand, when the audio data in the audio packet Pa supplied from the separation unit 142 corresponds to the watermarking method B, the control unit 148 decides that it is necessary to embed the embedded information again in the digital audio data by using the watermarking method A.

(Re-embedding of Embedded Information)

When the audio data corresponds to the watermarking method A and so the control unit 148 decides that re-embedding of information in the digital audio data is not necessary, no control signal is supplied from the control unit 148 to the insertion unit 146, and the audio data stored in the execution memory of the control unit 148 is supplied to the recording unit 147.

On the other hand, when the audio data corresponds to the watermarking method B and so the control unit 148 decides that re-embedding of information in the digital audio data is necessary, in the insertion unit 146, the embedded information is again embedded in the audio data by the watermarking method A, according to the control signal from the control unit 148.

(Recording of Digital Audio Data)

The audio data which is decided in the control unit 148 as corresponding to the watermarking method A is recorded in the recording unit 147 without being subjected to the re-embedding process in the insertion unit 146. On the other hand, the audio data which is decided in the control unit 148 as corresponding to a watermarking method other than the method A is subjected to the re-embedding process in the insertion unit 146 and, thereafter, stored in the recording unit 147.

As described above, the data processing apparatus 140 of this fourth embodiment includes the data obtaining unit 141 having the DVD-ROM drive, instead of the data obtaining unit 111 of the apparatus 110 according to the first embodiment, and further, the apparatus 140 includes the separation unit 142 for separating video packets and audio packets from the video object read from the DVD-ROM disk, and the video reproduction unit 144 for reproducing video data. In this construction, embedded information (e.g., copyright information) extracted from the data section of each audio packet is displayed in the video reproduction unit 144 in accordance with the used watermarking method information stored in the header of the audio packet, whereby the copyright information can be confirmed as an image.

Further, when the digital audio data corresponds to a predetermined watermarking method which is employed in reproduction apparatuses or the like as domestic electrical equipment, this digital audio data is recorded as it is in the recording medium. On the other hand, when the digital audio data corresponds to a watermarking method different from the predetermined method, the information embedded in this audio data is embedded again in this audio data by using the predetermined watermarking method, and thus obtained data is recorded in the recording medium. Therefore, the digital audio data for which the re-embedding process is not required is prevented from being subjected to the information writing process again, thereby minimizing the processing for the audio data, which causes degradation of sound quality.

In this fourth embodiment, the video object is recorded from the head of the recording area of the DVD-ROM disk. However, when auxiliary information such as management information is recorded at the head of the recording area of the DVD-ROM disk, the video object may be recorded after the auxiliary information.

Further, while in this fourth embodiment the video object is continuously recorded in the recording area of the DVD-ROM disk, the recording form of the video object in the DVD-ROM disk is not restricted thereto.

For example, when the management information includes TOC (Table of Contents) information which indicates the recording start position of the video object in the DVD-ROM disk and the recording size, the video object can be dispersedly recorded in arbitrary positions in the recording area of the DVD-ROM disk.

Further, in this fourth embodiment, the video object is sequentially read, starting from the head of the recording area of the DVD-ROM disk. However, when the management information includes scenario information indicating the access order to the respective recording areas in the disk, the video objects which are dispersedly stored in the plural recording areas in the disk can be read by accessing the respective recording areas in an arbitrary order. Especially when the data processing apparatus 140 is provided with a function of accepting a signal under control of the user, the access order to the respective recording areas can be changed according to this signal when reading the video objects.

Further, while in this fourth embodiment the audio packets separated from the video object in the separation unit are supplied directly to the audio reproduction unit, these audio packets may be transmitted through the extraction unit to the audio reproduction unit.

While in this fourth embodiment only the audio data contains the embedded information, the video data may contain the embedded information. In this case, the data processing apparatus 140 is provided with a video extraction unit for extracting the embedded information from the video data, and the video packets separated from the video object are supplied to the video reproduction unit through this video extraction unit.

Further, while in this fourth embodiment the embedded information in the audio data includes the information indicating the copyright display character string for the copyright holder, the embedded information may include, besides the copyright information, information indicating the names of persons authorized to reproduce the audio data by the copyright holder, the dates of authorizations, etc. Especially when video object can be copied, the embedded information in the audio data may include copy generation information or the like.

[Embodiment 5]

Figure 11:
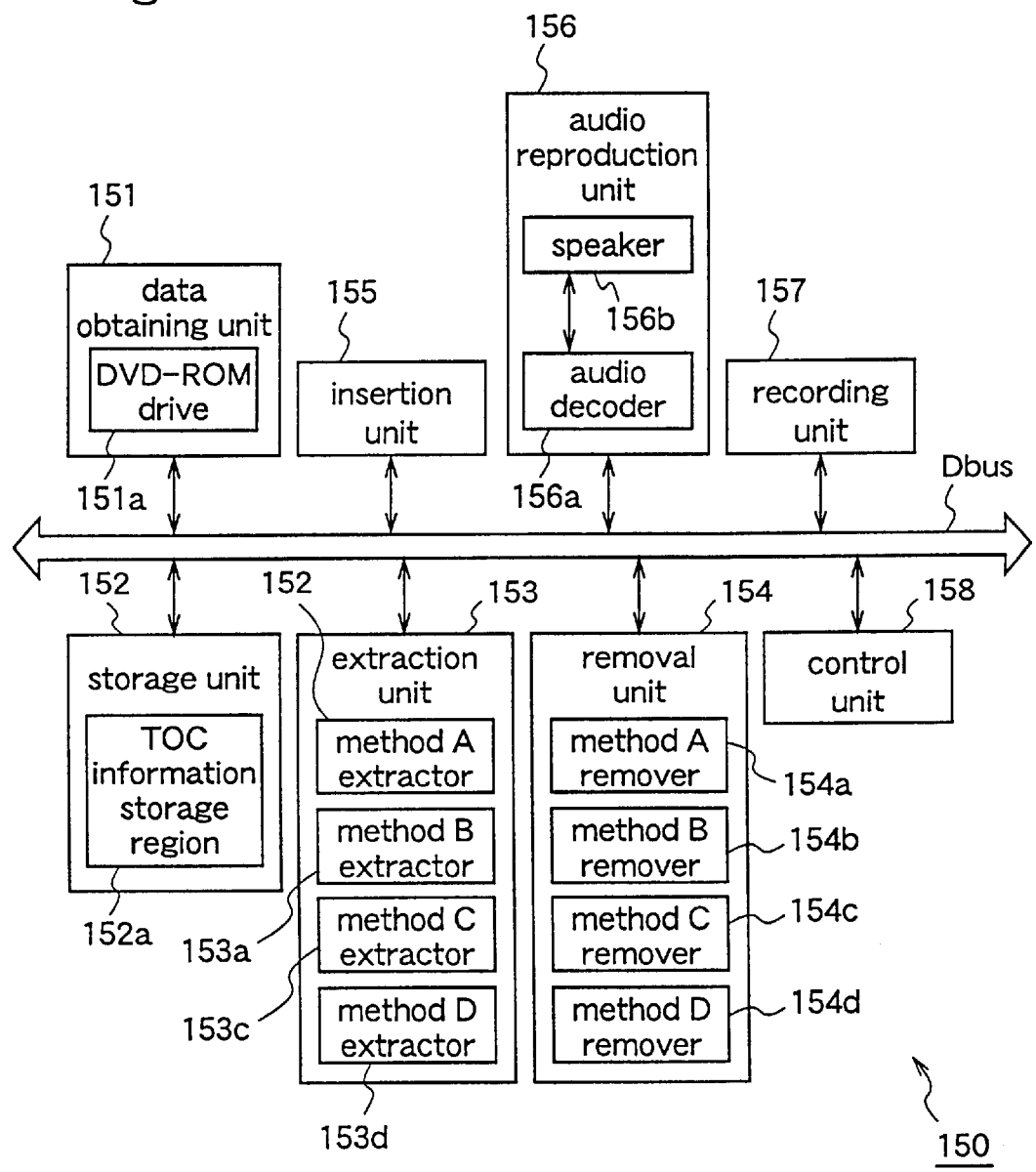
FIG. 11 is a block diagram for explaining a data processing apparatus according to a fifth embodiment.

FIG. 11 is a block diagram for explaining a data processing apparatus 150 according to a fifth embodiment of the present invention.

The data processing apparatus 150 performs the following processes: an extraction process for obtaining, from a data recording medium, digital audio data (distributed audio data) which has been obtained by embedding information in digital audio data to be supplied from the distribution end to the user (supply) by using a watermarking method, together with information indicating the watermarking method used for the information embedding process, and then extracting the embedded information from the input audio data; a removal process for removing the embedded information from the input audio data to obtain processed audio data; a reproduction process for reproducing the processed audio data; and a re-embedding process for embedding the extracted information again in the processed audio information by using a predetermined watermarking method.

The data processing apparatus 150 is adaptable to plural watermarking methods because there is a case where plural watermarking methods are used for one audio data.

To be specific, when using a specific method for constructing watermarking methods, even when plural pieces of information are embedded in one audio data by using the corresponding watermarking methods, the plural pieces of embedded information do not affect each other. For example, when the information is embedded in high-frequency components of the audio data by using a watermarking method while the information is embedded in low-frequency components of the audio data by using another watermarking method, the information embedded in the high-frequency components and the information embedded in the low-frequency components do not affect each other. The data processing apparatus 150 of this fifth embodiment is adaptable to such a case.

In this fifth embodiment, the watermarking method used for embedding information in the supply audio data is one of the four watermarking methods A, B, C, and D. Further, extraction of the embedded information is performed by using an appropriate watermarking method, and the re-embedding process is performed by using a predetermined watermarking method which is employed in reproduction apparatuses or the like as domestic electrical equipment. Further, the appropriate watermarking method described above is identical to the watermarking method used for embedding information in the supplied audio data.

(Data Structure of Distributed Audio Data)

Figure 12:
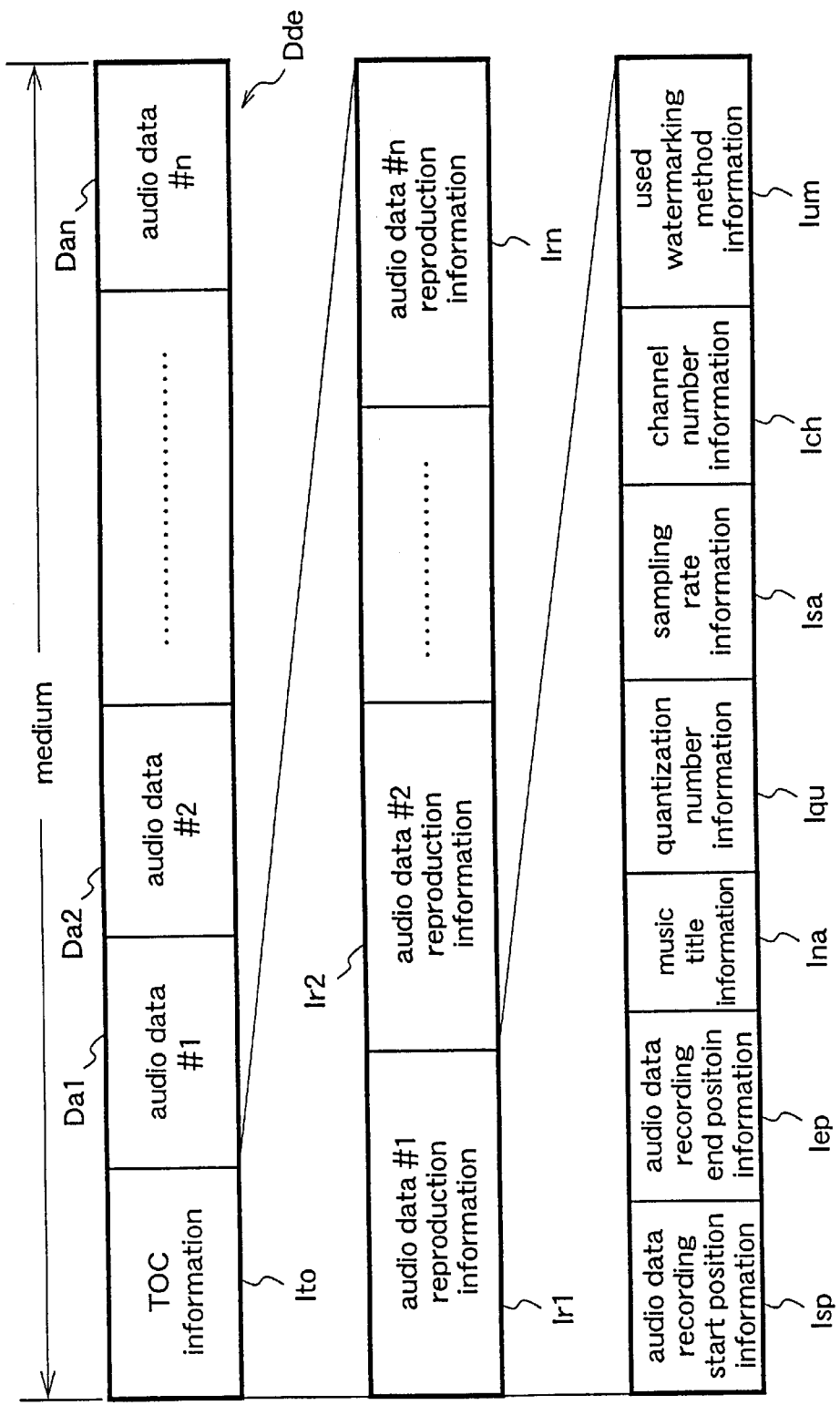
FIG. 12 is a diagram illustrating the data structure of distributed audio data recorded on a data recording medium, which data is to be processed by the data processing apparatus of the fifth embodiment.

FIG. 12 shows the data structure of the distributed audio data recorded in the data recording medium.

The distributed audio data Dde comprises TOC (Table of Contents) information Ito indicating the contents of music, and various kinds of discrete audio data Da1~Dan which have been coded by the LPCM (Linear Pulse Code Modulation).

The TOC information Ito is recorded at the head of the recording area of the data recording medium, and includes plural pieces of information to be used when reproducing the audio data Da1~Dan recorded in the recording medium. To be specific, the plural pieces of information used for reproducing the audio data are as follows: audio data recording start position information Isp, audio data recording end position information Iep, music title information Ina, quantization number information Iqu, sampling rate information Isa, channel number information Ich, and used watermarking method information Ium.

In the recording area of the data recording medium, the TOC information Ito is followed by the audio data Da1~Dan which have been coded by LPCM.

While in this fifth embodiment LPCM is employed as the audio data coding method, other coding methods, such as AC3, MPEG-audio, and DTS, may be employed. The AC3 is an audio compressive coding method for processing movie audio (5.1ch, 2ch, ect.), and this method is used in DVD-VIDEO and the like. Also DTS is an audio compressive coding method for processing movie audio (5.1ch, 2ch, etc.), and this method is used for movie theaters and DVD-VIDEO.

Figure 13:
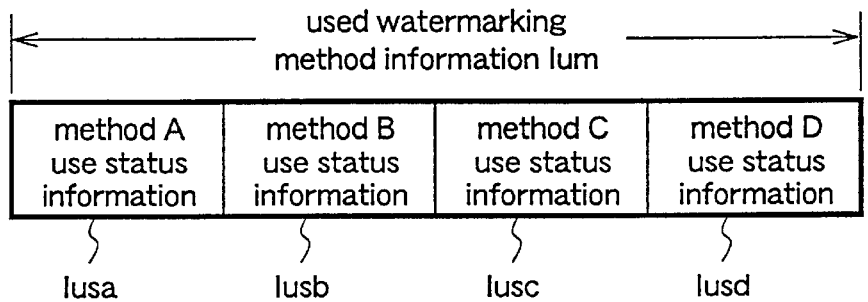
FIG. 13 is a diagram illustrating the data structure of used watermarking method information Ium included in TOK information in the distributed audio data.

FIG. 13 shows the data structure of the used watermarking method information Ium.

In this fifth embodiment, since the watermarking method used for embedding information in the supply audio data is any of the above-mentioned four methods (method A, method B, method C, and method D), the used watermarking method information Ium is composed of four pieces of use status information Ius corresponding to the respective watermarking methods, i.e., method A use status information Iusa, method B use status information Iusb, method C use status information Iusc, and method D use status information Iusd.

For each use status information, "0" or "1" is set.

For example, when the value of use status information is set at "1", this means that a watermarking method corresponding to this use status information has been used for embedding information in the supply audio data. On the other hand, when the value of use status information is set at "0", this means that a watermarking method corresponding to this use status information has not been used for embedding information in the supply audio data.

The data recording medium may contain not only the TOC information and the audio data but also other information. Further, the TOC information may include not only the audio data reproduction information but also other information, such as information indicating the reproduction order of the audio data. Further, the audio data reproduction information may include composer information, copyright information and the like, in addition to the audio data recording start position information Isp, the audio data recording end position information Iep, the music title information Ina, the quantization number information Iqu, the sampling rate information Isa, the channel number information Ich, and the used watermarking method information Ium.

While in this fifth embodiment the audio data which has been coded is recorded on the data recording medium, the audio data recorded on the recording medium may be multiplexed with other data by a multiplexing method based on MPEG2 or the like.

Further, while in this fifth embodiment the TOC information is recorded at the head of the recording area of the data recording medium, the TOC information may be recorded in an arbitrary position in the data recording medium as long as the data reading means (in this case, data obtaining unit) can recognize the storage position of the TOC information in the data recording medium.

(Construction of Data Processing Apparatus)

Turning to FIG. 11, the data processing apparatus 150 includes a data obtaining unit 151 and a storage unit 152.

The data obtaining unit 151 has a DVD-ROM drive for reading information or data recorded in a DVD-ROM disk, and obtains the TOC information Ito and the plural pieces of audio data Da1~Dan from the DVD-ROM disk in accordance with a control signal. The storage unit 152 has a TOC information storage region 152*a* wherein the TOC information Ito obtained by the data obtaining unit 151 is stored, and stores the TOC information Ito in this storage region 152*a* in accordance with a control signal. The storage unit 152 is provided with a DRAM (Dynamic Random Access Memory).

Further, the data processing apparatus 150 includes an extraction unit 153, a removal unit 154, and an insertion unit 155. The extraction unit 153 is constituted by a custom LSI, and extracts embedded information from the audio data, with reference to the used watermarking method information Ium included in the obtained TOC information Ito, according to a control signal. The removal unit 154 is constituted by a custom LSI, and removes embedded information from the distributed audio data, with reference to the used watermarking method information Ium included in the obtained TOC information Ito, according to a control signal, thereby generating processed audio data. The insertion unit 155 is constituted by a custom LSI, and embeds the extracted information again in the processed audio data by using a predetermined watermarking method, according to a control signal, thereby generating output audio data.

The extraction unit 153 comprises a method A extractor 153*a*, a method B extractor 153*b*, a method C extractor 153*c*, and a method D extractor 153*d* which correspond to the above-mentioned watermarking methods A, B, C, and D, respectively. In the extractor unit 153, the embedded information in the distributed audio data is extracted by a desired extractor, according to a control signal.

For example, the method A extractor 153*a* extracts the embedded information from the distributed audio data (input audio data) by the watermarking method A. The method B extractor 153*b* extracts the embedded information from the input audio data by the watermarking method B. The method C extractor 153*c* extracts the embedded information from the input audio data by the watermarking method C. The method D extractor 153*d* extracts the embedded information from the input audio data by the watermarking method D.

Further, the removal unit 154 comprises a method A remover 154*a*, a method B remover 154*b*, a method C remover 154*c*, and a method D remover 154*d* which corresponds to the above-described watermarking methods A, B, C, and D, respectively. In the removal unit 154, the embedded information in the distributed audio data is removed by a desired remover according to a control signal.

For example, the method A remover 154*a* removes the embedded information from the distributed audio data (input audio data) by the watermarking method A. The method B remover 154*b* removes the embedded information from the input audio data by the watermarking method B. The method C remover 154*c* removes the embedded information from the input audio data by the watermarking method C. The method D remover 154*d* removes the embedded information from the input audio data by the watermarking method D.

The data processing apparatus 150 further includes an audio reproduction unit 156 for reproducing the processed audio data according to a control signal, and a recording unit 157 for recording the output audio data according to a control signal. The audio reproduction unit 156 comprises an audio decoder 156*a* for decoding the output audio data to output an audio signal, and a speaker 156*b* for converting the audio signal to sound to be output. In the audio reproduction unit 156, the discrete audio data are reproduced in order of the audio data reproduction information Da1~Dan included in the TOC information.

The data processing apparatus 150 further includes a control unit 158. The control unit 158 comprises a CPU which performs various kinds of arithmetic processing and data processing, and a RAM (Random Access Memory) which stores the operation program of the CPU. The control unit 158 controls the operations of the respective units 151~157 by using the control-signals. The RAM of this control unit 158 also serves as an execution memory for temporarily storing the audio data from the data obtaining unit 151 and the removal unit 154, and the extracted information from the extraction unit 153.

While in this fifth embodiment the audio reproduction unit 156 reproduces the processed audio data, the audio reproduction unit 156 may reproduce the output audio data which has been obtained by embedding the information embedded in the distributed audio data, again in the processed audio data, by using the predetermined watermarking method.

Further, in this fifth embodiment, the data processing apparatus 150 includes the data obtaining unit 151 having a DVD-ROM drive. However, the data obtaining unit 151 may have any storage unit, such as a DVD-RAM drive, a CD-ROM drive, or a semiconductor memory reading unit, as long as it is a bulk storage capable of handling multimedia data.

Further, while in this fifth embodiment the extraction unit 153, the removal unit 154, and the insertion unit 155 are constituted by custom LSI circuits, respectively, each of these units 153~155 may be constituted by a CPU performing various kinds of arithmetic processing and a RAM for storing the operation program of the CPU and also serving as an execution memory. In this case, these units 153~155 can share the constituents with the control unit 158.

Further, while in this fifth embodiment the storage unit 152 is provided with a DRAM, it may be provided with any memory as long as it is suitable for temporary storage, for example, a SRAM may be employed.

Hereinafter, the operation of the data processing apparatus 150 will be described.

In the following description, for simplification, it is assumed that the TOC information Ito is continuously recorded at the head of the recording area of the DVD-ROM disk, as information of a predetermined size.

(Reading of TOC Information)

In the data obtaining unit 151, information of a predetermined size is read from the head of the recording area of the DVD-ROM disk, according to a control signal from the control unit 158, and the read information, i.e., the TOC information Ito, is supplied to the storage unit 152.

(Storage of TOC Information)

In the storage unit 152, according to a control signal from the control unit 158, the whole TOC information Ito obtained in the data obtaining unit 151 (i.e., all pieces of the audio data reproduction information Ir1~Irn included in the TOC information Ito) is stored as it is (i.e., without being processed) in the DRAM. Alternatively, a portion of the audio data reproduction information Ir1–Irn included in the TOC information Ito (e.g., only the audio data reproduction information corresponding to the audio data to be reproduced next) may be stored in the DRAM.

(Reading of Audio Data)

Next, in the control unit 158, the audio data reproduction information Ir1~Irn corresponding to the discrete audio data Da1~Dan to be reproduced are sequentially obtained from the TOC information Ito stored in the storage unit 152, in reproduction order of the discrete audio data.

Further, in the control unit 158, the audio data recording start position information Isp and the audio data recording end position information Iep are obtained from the obtained audio data reproduction information. Then, a control signal according to the audio data recording start position information Isp is supplied from the control unit 158 to the data obtaining unit 151. In the data obtaining unit 151, according to the control signal from the control unit 158, discrete audio data to be reproduced is obtained from the DVD-ROM disk. The discrete audio data so obtained is supplied to the extraction unit 153 and the removal unit 154.

While the data obtaining process is being preformed, the control unit 158 monitors where the data is being read from the recording area of the DVD-ROM disk, and when the position where the data is being read agrees with the position indicated by the audio data recording end position information Iep, the data obtaining unit 151 is controlled by the control unit 158 so as to stop reading the discrete audio data.

Thereafter, in the control unit 158, to obtain discrete audio data to be reproduced next, the audio data reproduction information corresponding to this audio data is obtained from the storage unit 152, followed by the process of obtaining the next discrete audio data.

(Extraction of Embedded Information)

In the control unit 158, the used watermarking method information is extracted from the audio data reproduction information corresponding to the discrete audio data to be reproduced. Then, the value of the used status information corresponding to each watermarking method in the used watermarking method information Ium is decided in the control unit 158. Then, a control signal according to the decided value of the use status information is output from the control unit 158 to the extraction unit 153. In the extraction unit 153, according to the control signal, the embedded information is extracted from the audio data to be reproduced, by an extractor corresponding to an appropriate watermarking method.

For example, when the value of the method A use status information Iuma in the used watermarking method information Ium is "1", the method A extractor 153a extracts the embedded information by using the watermarking method A, according to the control signal. On the other hand, when the value of the method A use status information Iuma is "0", extraction of the embedded information by using the method A extractor 153a is not carried out. Likewise, also the method B extractor 153b, the method C extractor 153c, and the method D extractor 154d perform extraction of embedded information by using the corresponding watermarking methods B, C and D, according to the values of the method B use status information Iumb, the method C use status information Iumc, and the method D use status information Iumd, respectively.

(Removal of Embedded Information)

The control unit 158 outputs a control signal according to the used watermarking method information obtained from the audio data reproduction information corresponding to the audio data to be reproduced, to the removal unit 154. In the removal unit 154, according to the control signal, embedded information is extracted from the audio data to be reproduced by a method remover corresponding to an appropriate watermarking method.

For example, in the control unit 158, the value of the method A use status information Iuma in the used watermarking method information Ium is decided. Based on the result of the decision, when the value of the method A use status information Iuma is "1", in the removal unit 154, the embedded information is removed by the watermarking method A, according to the control signal from the control unit 158. On the other hand, when the value of the method A use status information Iuma is "0", removal of the embedded information by the watermarking method A is not performed in the removal unit 154.

Likewise, in the control unit 158, the values of other method status information are successively decided. When the value is "1", the embedded information is removed by the method remover corresponding to the method use status information whose value has been decided. on the other hand, when the value is "0", removal of the embedded information by the method remover corresponding to the method use status information whose value has been decided, is not performed.

The distributed audio data which has been subjected to the removal process in the removal unit 154, i.e., the processed audio data, are supplied to the audio reproduction unit 156.

(Reproduction of Discrete Audio Data)

The transmitted discrete audio data supplied to the audio reproduction unit 156 is subjected to LPCM decoding to be converted to an audio signal by the audio decoder 156a, and this audio signal is converted to sound by the speaker 156b.

In the data processing apparatus 150, while reproducing the audio data as described above, re-embedding of information in the discrete audio data and recording of the output audio data obtained by the re-embedding process are carried out in like manner as described for the. first to fourth embodiments.

(Decision About Re-embedding of Information)

When the discrete audio data from the data obtaining unit 151 corresponds to the watermarking method A, the control unit 158 decides that it is not necessary to embed the information embedded in this discrete audio data again in this audio data by using another watermarking method. The reason is as follows. The information embedded in this discrete digital audio data can be extracted by a reproduction apparatus which employs the predetermined watermarking method (in this case, method A), for example, an existing reproduction apparatus for a DVD-RAM disk.

On the other hand, when the discrete audio data from the data obtaining unit 151 corresponds to the watermarking method B, the control unit 158 decides that it is necessary to embed the embedded information again in this audio data by the watermarking method A.

(Re-embedding of Information)

When the discrete audio data corresponds to the watermarking method A and so the control unit 158 decides that re-embedding of information in this audio data is not necessary, no control signal is supplied from the control unit 158 to the insertion unit 155, and the discrete audio data stored in the execution memory of the control unit 158 is supplied to the recording unit 157.

On the other hand, when the discrete audio data corresponds to the watermarking method B and so the control unit 158 decides that re-embedding of information in this audio data is necessary, in the insertion unit 155, the embedded information is again embedded in the discrete audio data by the watermarking method A, according to the control signal from the control unit 158.

(Recording of Discrete Audio Data)

The discrete audio data which is decided by the control unit 158 as corresponding to the watermarking method A is recorded in the recording unit 157 without being subjected to the re-embedding process in the insertion unit 155. On the other hand, the discrete audio data which is decided by the control unit 158 as corresponding to a watermarking method other than the method A is subjected to the re-embedding process in the insertion unit 155 and, thereafter, stored in the recording unit 157.

As described above, the data processing apparatus 150 of this fifth embodiment includes, instead of the data obtaining unit 111 of the apparatus 110 according to the first embodiment, the data obtaining unit 151 which has the DVD-ROM drive for reading the distributed audio data from the DVD-ROM disk, and obtains the TOC information Ito and plural pieces of discrete audio data Da1~Dan which are included in the audio data read from the DVD-ROM disk. According to the use watermarking method information Ium which is stored in the TOC information Ito as the audio data reproduction information Ir1~Irn corresponding to the respective discrete audio data, information embedded in the discrete audio data, such as copyright information, is removed from the audio data before reproducing the audio data. Therefore, reproduction of the discrete audio data distributed by the recording medium can be satisfactorily performed without degradation of sound quality due to the embedded information such as copyright information.

Further, when the discrete audio data corresponds to a predetermined watermarking method which is employed in reproduction apparatuses or the like as domestic electrical equipment, this discrete audio data is recorded as it is in the recording medium. On the other hand, when the discrete audio data corresponds to a watermarking method different from the predetermined method, the information embedded in this audio data is again embedded in this audio data by using the predetermined watermarking method and thus obtained audio data is recorded in the recording medium. Therefore, the discrete audio data for which the re-embedding process is not required is prevented from being subjected to the information writing process again, thereby minimizing the processing for the digital audio data, which causes degradation of sound quality.

In this fifth embodiment, the TOC information is recorded at the head of the recording area of the DVD-ROM disk. However, if the control unit 158 can recognize the position where the TOC information is recorded in the recording area of the disk, the TOC information may be recorded in any position in the recording area.

For example, when a file system is constructed on the DVD-ROM disk and information recorded on the disk is accessible according to its file name, the TOC information is given a file name when being recorded on the disk, whereby the TOC information can be read regardless of the physical location of the TOC information in the disk.

Further, in this fifth embodiment, reproduction of the discrete audio data is carried out in the order of the audio data reproduction information corresponding to the respective discrete audio data recorded in the TOC information. However, when the data processing apparatus 150 has a function of accepting user's selection for discrete audio data to be reproduced next, the user can specify the discrete audio data to be reproduced next.

Further, when information indicating the reproduction order of the discrete audio data (reproduction order information) is included in the TOC information, the control unit 158 can decide the reproduction order of the discrete audio data by referring to the reproduction order information.

Further, in this fifth embodiment, the audio reproduction unit 156 decodes the supplied discrete audio data by the audio decoder 156*a* and reproduces the decoded data by the speaker 156*b*. However, the construction of the audio reproduction unit 156 is not restricted to this. For example, the audio reproduction unit having the audio decoder and the speaker may be constructed such that an analog audio signal obtained by decoding the discrete audio data by the audio decoder can be output to another recording unit through an audio cable or the like.

Further, the data processing apparatus 150 of this fifth embodiment may be constructed such that the discrete audio data supplied to the audio reproduction unit is output, as being digital data, to another digital data recording unit through a digital transmission cable or the like.

Further, in this fifth embodiment, the recording medium (DVD-ROM disk) mounted on the DVD-ROM drive of the data obtaining unit 151 may be a recording medium in which the following data and information are recorded: information-embedded digital data obtained by embedding relevant information in supply digital data to be supplied from the distribution end to the user, and used method information indicating the watermarking method which has been used for embedding the relevant information in the supply digital data, and following the information-embedded digital data. In this case, the information-embedded digital data has the data structure which enables extraction or removal of the relevant information by using an appropriate watermarking method based on the used method information. Further, in the recording medium (DVD-ROM disk), plural pieces of used method information indicating different watermarking methods which have been used for embedding the relevant information in the supply digital data, may be recorded.

[Embodiment 6]

Figure 14:
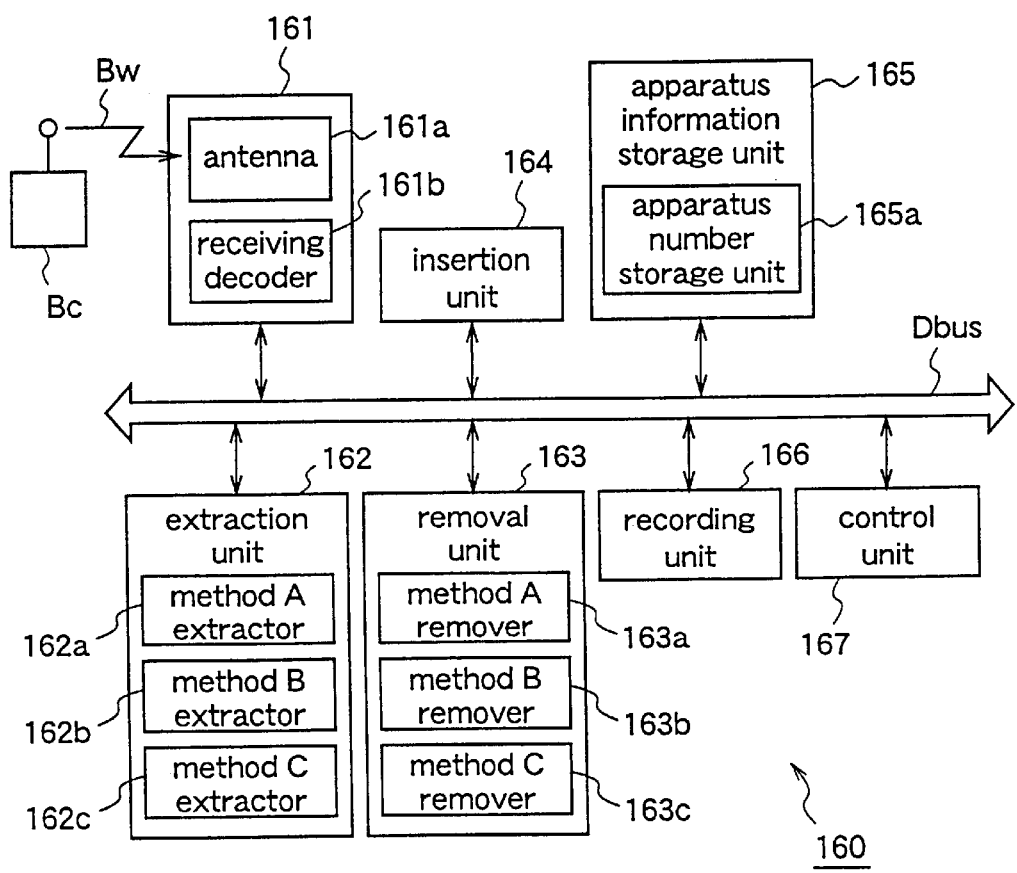
FIG. 14 is a block diagram for explaining a data processing apparatus according to a sixth embodiment.

FIG. 14 is a block diagram for explaining a data processing apparatus 160 according to a sixth embodiment of the present invention.

This data processing apparatus 160 receives a broadcast wave from a broadcast station and obtains, from the received broadcast wave, first digital audio data (distributed audio data) which has been obtained by embedding information in digital audio data to be supplied from the distribution end to the user (supply audio data) by using a watermarking method. Then, the apparatus 160 performs extraction and removal of the embedded information (hereinafter also referred to as first embedded information) from the distributed audio data, and processes the extracted information (first embedded information) to create processed information (second information). Then, the apparatus 160 embeds the processed information in second digital audio data (processed audio data) obtained by the removal process performed on the distributed audio data, by using a watermarking method different from the above-mentioned watermarking method, thereby generating third digital audio data (output audio data).

The watermarking method used for embedding information in the supply audio data is one of method A, method B, and method C. Further, the extraction of the first embedded information is performed by using an appropriate watermarking method, and the re-embedding process is performed by using at least a predetermined watermarking method employed in reproduction apparatuses as domestic equipment. Further, the appropriate watermarking method is identical to the watermarking method used for embedding information in the supplied audio data. The distributed audio data has been subjected to LPCM coding, and the first embedded information has been embedded in the distributed audio data by a predetermined watermarking method (method A).

(Data Structure of First Embedded Information)

Figure 15:
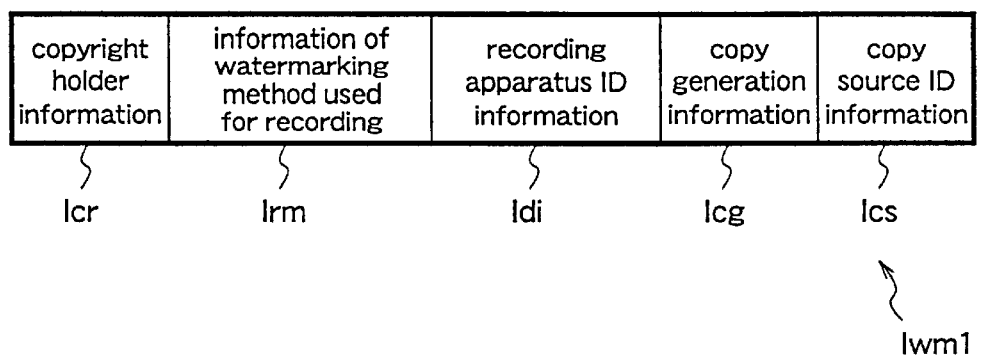
FIGS. 15(*a*) is a diagram illustrating the data structure of embedded information (first embedded information Iwm1) in distributed audio data supplied by a broadcast wave to the data processing apparatus of the sixth embodiment, and FIG. 15(*b*) is a diagram illustrating the data structure of processed embedded information (second embedded information Iwm2) obtaining by processing the first embedded information.
Figure 15:
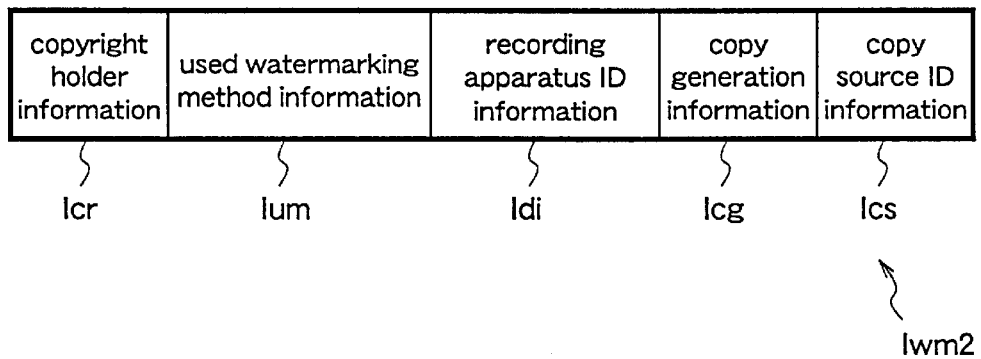

FIG. 15a shows the data structure of the first embedded information Iwm1.

The first embedded information Iwm1 contains copyright holder information Icr, information of a watermarking method used at recording Irm (hereinafter referred to simply as recording watermarking method information Irm), recording apparatus ID information Idi, copy generation information Icg, and copy source ID information Ics.

The first embedded information Iwm1 has a fixed data length. So, in the distributed audio data whose data length varies according to the length of music or the like, the same information is repeatedly embedded as the first embedded information.

FIG. 16(a) shows the values of the recording watermarking method information Irm included in the first embedded information Iwm1.

The recording watermarking method information Irm is information for identifying the watermarking method which is used for embedding information in audio data to be recorded in the data processing apparatus 160.

To be specific, the first embedded information Iwm1 has been embedded in the distributed audio data by a predetermined watermarking method. When the distributed audio data or processed audio data obtained by processing the distributed audio data is recorded on the recording medium, information corresponding to the first embedded information is again embedded by another watermarking method. The recording watermarking method information Irm is information for identifying the watermarking method to be used for this re-embedding process.

The recording watermarking method information Irm is represented by two bits. More specifically, the value "00" of this information Irm indicates that no information embedding process by a watermarking method is to be performed on the audio data to be recorded in the recording medium. The value "01" of this information Irm indicates that Information is to be embedded in the audio data to be recorded, by using the watermarking method A. Likewise, the values "10" and "11" of this information Irm indicate that information is to be embedded in the audio data to be recorded, by using the watermarking method B and C, respectively.

While in this sixth embodiment the LPCM is employed as the audio data coding method, other coding methods, such as AC3, MPEG-audio, and DTS, may be employed.

Further, while in this sixth embodiment audio data is independently transmitted by a broadcast wave to the data processing apparatus 160, the transmission mode of audio data is not restricted to this. For example, a video object (multiplexed digital data) in which video data and audio data are multiplexed may be transmitted to the apparatus 160.

Further, while in this sixth embodiment the distributed audio data is generated by embedding information in the supply audio data by a predetermined watermarking method, if information indicating the kind of the watermarking method used for the information embedding process is transmitted to the data processing apparatus 160, any watermarking method can be employed in the information embedding process.

Further, while in this sixth embodiment the same information is repeatedly embedded as the first embedded information Iwm1 in the distributed audio data, different kinds of information may be embedded as the first embedded information Iwm1.

Moreover, while in this sixth embodiment the first embedded information Iwm1 includes the copyright holder information Icr, the recording watermarking method information Irm, the recording apparatus ID information Idi, the copy generation information Icg, and the copy source ID information Isc, other information, such as recording date information Ird, may be included in the first embedded information Iwm1.

(Data Structure of Second Embedded Information)

FIG. 15(b) shows the data structure of the second embedded information Iwm2 which is embedded in the audio data to be recorded on the recording medium (distributed audio data or processed audio data) by a watermarking method.

The second embedded information Iwm2 includes used watermarking method information Ium, instead of the recording watermarking method information Irm included in the first information Iwm1. The used watermarking method information Ium indicates the watermarking method which has been used for embedding information in the distributed audio data or the processed audio data. The values of the used watermarking method information Ium and the meaning of each value are identical to those already described for the recording watermarking method information Irm.

That is, as shown in FIG. 16(b), the used watermarking method information Ium is represented by two bits. The value "00" of this information Ium indicates that no information embedding process by a watermarking method has been performed on the audio data to be recorded in the recording medium. The value "01" of this information Ium indicates that information has been embedded in the audio data to be recorded, by using the watermarking method A. Likewise, the values "10" and "11" of this information Ium indicate that information has been embedded in the audio data to be recorded, by using the watermarking method B and C, respectively.

While in this sixth embodiment the data structure of the second embedded information Iwm2 is identical to that of the first embedded information Iwm1, the second embedded information Iwm2 may have a data structure in which information of another title, such as copy date information, is added-to the first embedded information, or a data structure in which part of the first embedded information, such as the copy generation information, is deleted from the first embedded information.

Further, while in this sixth embodiment the used watermarking method information Ium is included in the second embedded information Iwm2, when attribute information of audio data is recorded in the recording medium separately from the distributed audio data or the processed audio data, the used watermarking method information Ium may be recorded as the attribute information. In this case, no used watermarking method information is included in the second embedded information Iwm2.

(Construction of Data Processing Apparatus)

Turning to FIG. 14, the data processing apparatus 160 includes a data obtaining unit 161 comprising an antenna 161a which receives a broadcast wave Bw from a broadcast station Bc, and a receiving decoder 161b which decodes the received broadcast wave Bw to generate the above-described distributed audio data (first digital audio data). The data obtaining unit 161 obtains the distributed audio data from the broadcast wave Bw according to a control signal.

The data processing apparatus 160 further includes an extraction unit 162, a removal unit 163, and an insertion unit 164. The extraction unit 162 is constituted by a custom LSI, and extracts the embedded information (first embedded information Iwm1) from the distributed audio data according to a control signal. The removal unit 163 is constituted by a custom LSI, and removes the embedded information Iwm1 from the distributed audio data according to a control signal, thereby generating processed audio data (second digital audio data). The insertion unit 164 is constituted by a custom LSI, and embeds processed information (second embedded information Iwm2) obtained by processing the first embedded information Iwm1, again in the processed audio data, by using various watermarking methods, thereby generating output audio data (third digital audio data).

The extraction unit 162 comprises a method A extractor 162a, a method B extractor 162b, and a method C extractor 162c which correspond to the above-mentioned watermarking methods A, B, and C, respectively. In the extractor unit 162, the embedded information Iwm1 in the distributed audio data is extracted by a desired extractor, according to a control signal.

For example, the method A extractor 162a extracts the embedded information Iwm1 from the distributed audio data (input audio data) by the watermarking method A. The method B extractor 162b extracts the embedded information Iwm1 from the input audio data by the watermarking method B. The method C extractor 162c extracts the embedded information Iwm1 from the input audio data by the watermarking method C.

Further, the removal unit 163 comprises a method A remover 163a, a method B remover 163b, and a method C remover 163c which corresponds to the above-described watermarking methods A, B, and C, respectively. In the removal unit 163, the embedded information Iwm1 in the distributed audio data is removed by a desired remover according to a control signal.

For example, the method A remover 163a removes the embedded information Iwm1 from the distributed audio data by the watermarking method A. The method B remover 163b removes the embedded information Iwm1 from the distributed audio data by the watermarking method B. The method C remover 163c removes the embedded information Iwm1 from the distributed audio data by the watermarking method C.

The data processing apparatus 150 further includes a recording unit 166, an apparatus information storage unit 165, and a control unit 167. The recording unit 166 stores the output audio data according to a control signal. The apparatus information storage unit 165 stores apparatus number information for identifying this apparatus 160. The control unit 167 comprises a CPU which performs various kinds of arithmetic processing and data processing, and a RAM (Random Access Memory) which stores the operation program of the CPU. The control unit 167 controls the operations of the respective units 161~166 by using the control signals.

The apparatus information storage unit 165 is provided with an EEPROM, and the apparatus number information is stored in an apparatus number storage region 165a of the EEPROM. Further, the recording unit 166 is provided with a DVD-RAM drive, wherein the output audio data is recorded on a DVD-RAM disk. Further, the control unit 167 processes the first embedded information in accordance with the apparatus number information stored in the recording area of the EEPROM, thereby producing the second embedded information. Further, the RAM of the control unit 167 also serves as an execution memory for temporarily storing the audio data supplied from the removal unit 163 and the insertion unit 164, the first embedded information Iwm1 extracted by the extraction unit 162, and the second embedded information Iwm2 generated in the control unit 167.

While in this sixth embodiment the data obtaining unit 161 includes the antenna and the decoder, the construction of the data obtaining unit 161 is not restricted thereto.

For example, the data obtaining unit 161 may have a receiving unit which receives a transmitted signal via a cable line, such as a network interface or a modem. Further, the data obtaining unit 161 may have a bulk storage unit capable of accessing multimedia data, such as a DVD-ROM drive, a DVD-RAM drive, a CD-ROM drive, or a semiconductor memory access unit.

Further, in this sixth embodiment, the extraction unit 162, the removal unit 163, and the insertion unit 164 are constituted by separated custom LSI circuits. However, since these units perform similar processes, these units are desired to be constituted by a single custom LSI circuit, for reduction in the number of components.

Further, while in this sixth embodiment the extraction unit 162, the removal unit 163, and the insertion unit 164 are constituted by custom LSI circuits, each of these units 162~164 may be constituted by a CPU performing various kinds of arithmetic processing and a RAM for storing the operation program of the CPU and also serving as an execution memory. In this case, these units 162~164 can share the constituents with the control unit 167.

Further, while in this sixth embodiment the apparatus information storage unit 165 is equipped with an EEPROM, the storage unit 165 may be equipped with any memory as long as it is a nonvolatile memory.

Further, while the apparatus information storage unit 165 stores the apparatus number information for identifying the apparatus, it may store an identification number for identifying the user of the apparatus. In this case, the apparatus information storage unit is equipped with a reader for an IC card or a magnetic card, and the user of the apparatus inserts the card in which the user's identification number is recorded, into the reader to inform the apparatus of the user's identification number.

While in this sixth embodiment the recording unit 166 is equipped with a DVD-RAM drive, the recording unit 166 may be equipped with any storage unit, such as a CD-R drive or a semiconductor memory access unit, as long as it is a bulk writable storage capable of accessing multimedia data.

Hereinafter, a description will be given of the operation of the data processing apparatus 160.

(Reading of Audio Data)

In the data obtaining unit 161, the broadcast wave Bw from the broadcast station Bc is received by the antenna 161a. When the broadcast wave Bw is input to the decoder 161b, it is converted to the distributed audio data (first digital audio data) by decoding. This distributed audio data is supplied to the extraction unit 162 and the removal unit 163.

(Extraction of Embedded Information)

In the extraction unit 162, the first embedded information Iwm1 is extracted from the distributed audio data obtained in the data obtaining unit 161, by using a predetermined watermarking method, according to a control signal from the control unit 167. The extracted information (first information Iwm1) is temporarily stored in the execution memory of the control unit 167.

(Removal of Embedded Information)

In the removal unit 163, the first embedded information Iwm1 is removed from the distributed audio data, by using a predetermined watermarking method, according to a control signal from the control unit 167, thereby generating processed audio data. The processed audio data is supplied to the insertion unit 162.

(Processing of Embedded Information)

In the control unit 167, the first information Iwm1 stored in the execution memory is processed to create the second information Iwm2.

To be specific, the second information Iwm2 is created according to the copyright holder information, the recording watermarking method information, the recording apparatus ID information, the copy generation information, and the copy source ID information which are included in the first information Iwm1 stored in the execution memory, and the apparatus number information stored in the apparatus information storage 165.

At this time, with respect to the copyright holder information and the recording watermarking method information, the values described in the first information Iwm1 are copied as they are into the second information Iwm2. As the recording apparatus ID information of the second information Iwm2, the apparatus number recorded in the apparatus information storage unit 165 is recorded as it is. Thereby, the possessor of the copied audio data can be specified. Further, in the second information Iwm2, as the value of the copy generation information, a value obtained by adding 1 to the value recorded in the first information Iwm1, is recorded. Thereby, when a copy of the distributed audio data is found, the generation of this copy, i.e., how many times the original audio data has been copied, can be specified.

Furthermore, as the copy source ID information of the second information Iwm2, the recording apparatus ID information in the first information Iwm1 is recorded. Thereby, the apparatus which has copied the distributed audio data can be specified. By tracing back the copy source ID information, the user or apparatus who/which has illegally copied the audio data can be specified.

The second information Iwm2 so created is sent to the insertion unit 164.

(Re-embedding of Second Information)

In the insertion unit 164, the second information Iwm2 generated in the control unit 167 is embedded in the processed audio data supplied from the removal unit 163, by using a watermarking method, according to a control signal, thereby generating output audio data (third digital audio data).

At this time, the second information Iwm2 is repeatedly embedded over the processed audio data, from the head to the end, according to the length of the audio data. Especially, the first embedding of the second information Iwm2 is performed by the predetermined watermarking method. The second and subsequent embedding are performed by using the watermarking method indicated by the recording watermarking method information included in the first information Iwm1.

Since the first embedding of the second information Iwm2 is performed by the predetermined watermarking method, when the second embedded information Iwm2 is extracted from the output audio data, the embedded information Iwm2 at the head of the output audio data can be extracted by using the predetermined watermarking method. Further, based on the second information Iwm2 so extracted, the information embedded in other regions of the output audio data can be extracted or removed.

The output audio data so created is supplied to the recording unit 166.

(Recording of Output Audio Data)

In the recording unit 166, the output audio data supplied from the insertion unit 164 is stored in the DVD-RAM disk according to a control signal from the control unit 167. The output audio data is sequentially stored from the head of the recording area of the DVD-RAM disk.

As described above, according to the sixth embodiment of the present invention, the data processing apparatus 160 includes, instead of the data obtaining unit 111 of the first embodiment, the data obtaining unit 161 which has the antenna for receiving a broadcast wave from a broadcast station and the decoder for decoding the received broadcast wave Bw, and obtains distributed audio data as the output from the decoder. Then, apparatus 160 performs extraction and removal of embedded information (first embedded information Iwm1) from the distributed audio data, and processes the extracted information (first information Iwm1) to create processed information (second information Iwm2). Then, the apparatus 160 embeds the processed information (second information Iwm2) in second digital audio data (processed audio data) obtained by the removal process performed on the distributed audio data, by using a watermarking method different from the above-mentioned watermarking method, thereby generating third digital audio data (output audio data). Therefore, addition or removal of information to/from the embedded information in the distributed audio data is possible.

Furthermore, when the processed audio data is recorded, additional information such as an apparatus identification number (e.g., CPU identification number) assigned to the apparatus which performs the recording or the date of the recording, is embedded in the processed audio data. Thereby, if the copyright holder has found an illegal copy of the digital data, the copyright holder can extract more specific information to prove the illegality from the digital data.

Furthermore, when copy permission information or the like is recorded in the digital data by a predetermined watermarking method, a recording apparatus adapted to the predetermined watermarking method can perform direct copy restriction, such as to inhibit copying of the digital data, according to the contents of the copy permission information. In this case, however, a recording apparatus which performs copying without referring to the copy permission information embedded by the watermarking method, cannot restrict illegal copying.

While in this sixth embodiment the distributed audio data is obtained by receiving a broadcast wave, it may be obtained by receiving a signal, which has been transmitted through a cable (e.g., internet or telephone line), with a network card or a modem.

Further, in this sixth embodiment, the user of the data processing apparatus 160 may select some pieces of distributed audio data to be processed, from the plural pieces of distributed audio data obtained from the received broadcast wave.

Further, the distributed audio data supplied by the broadcast wave may be in the state where the audio data is multiplexed with video data. In this case, the audio data can be extracted from the multiplexed digital data such as a video object transmitted by the broadcast wave.

While in this sixth embodiment, the output audio data is sequentially recorded from the head of the recording area of the DVD-RAM disk in the recording unit 166, the recording method of the output audio data in the recording unit is not restricted thereto.

For example, the output audio data may be written in a vacant area of the disk which is detected according to the recording status. Alternatively, the output audio data may be written in an area of the disk specified by the user of the apparatus. Further, when a file system is constructed in the DVD-RAM disk, the output audio data is written in the disk according to the file name. In this case, since the output audio data is recorded through the file system, the output audio data may be written in any position in the recording area of the disk.

[Embodiment 7]

Figure 17:
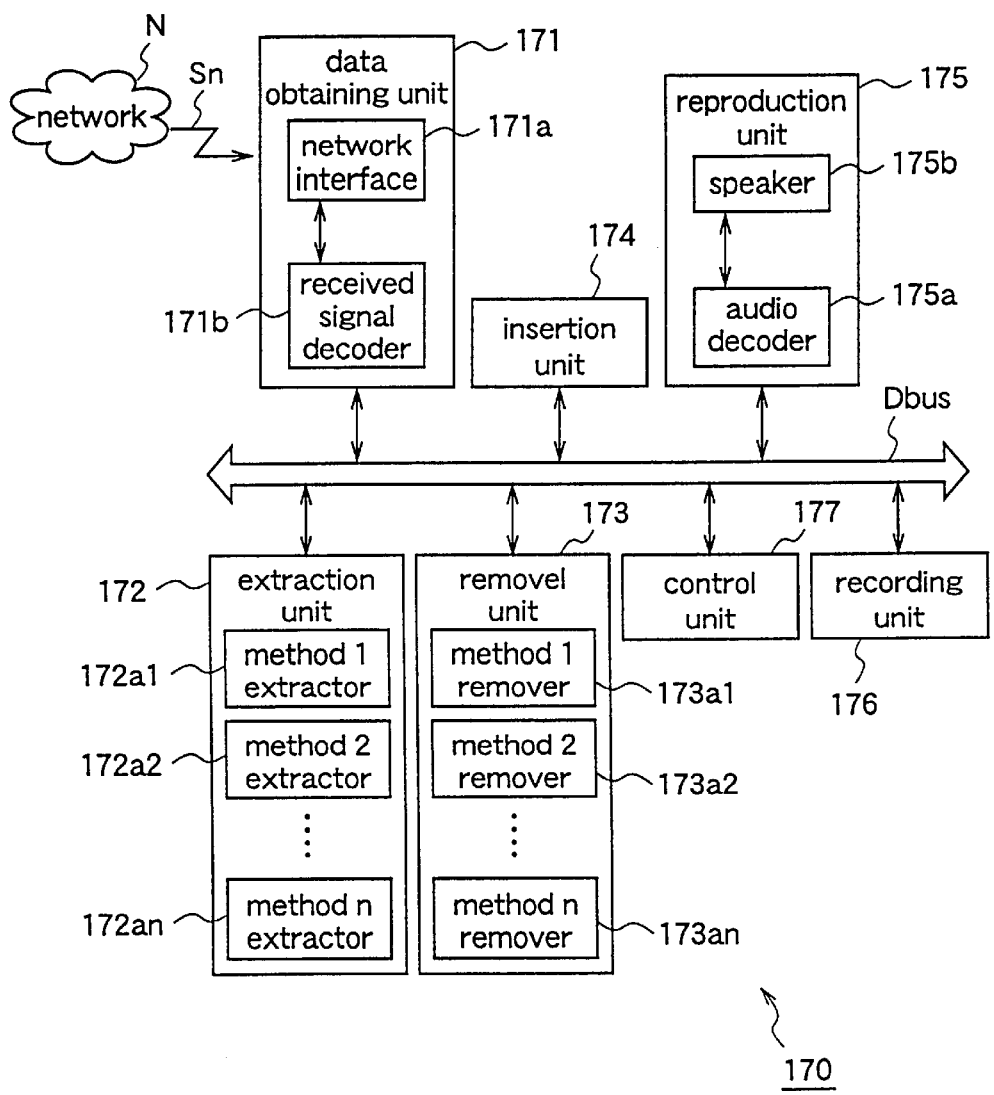
FIG. 17 is a block diagram for explaining a data processing apparatus according to a seventh embodiment of the present invention.
Figure 18:
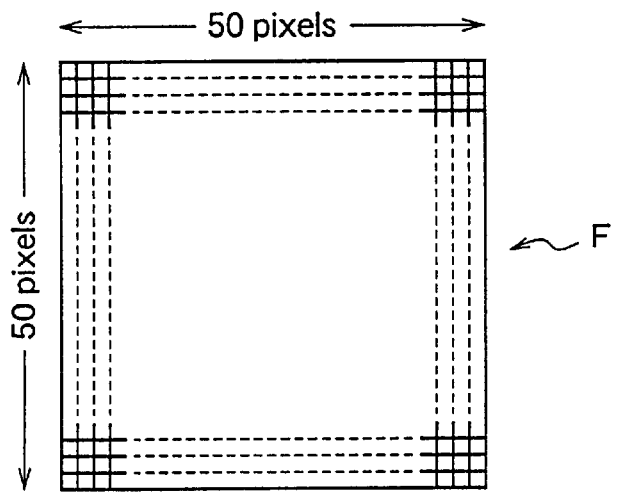
FIGS. 18(*a*) and 18(*b*) are diagram for explaining the method for embedding information (watermark) relating to the copyright holder of digital video data, by using watermarking technique, wherein 18(*a*) shows a matrix of pixels constituting an image, and 18(*b*) shows a matrix of pixels in each of plural blocks obtained by dividing the image.
Figure 18:
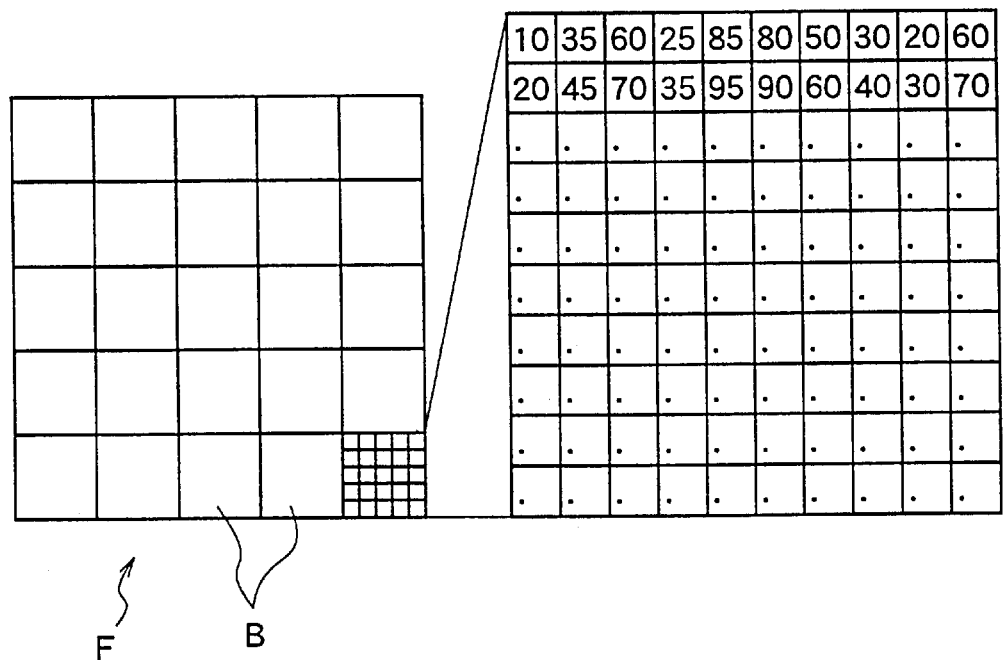
Figure 19:
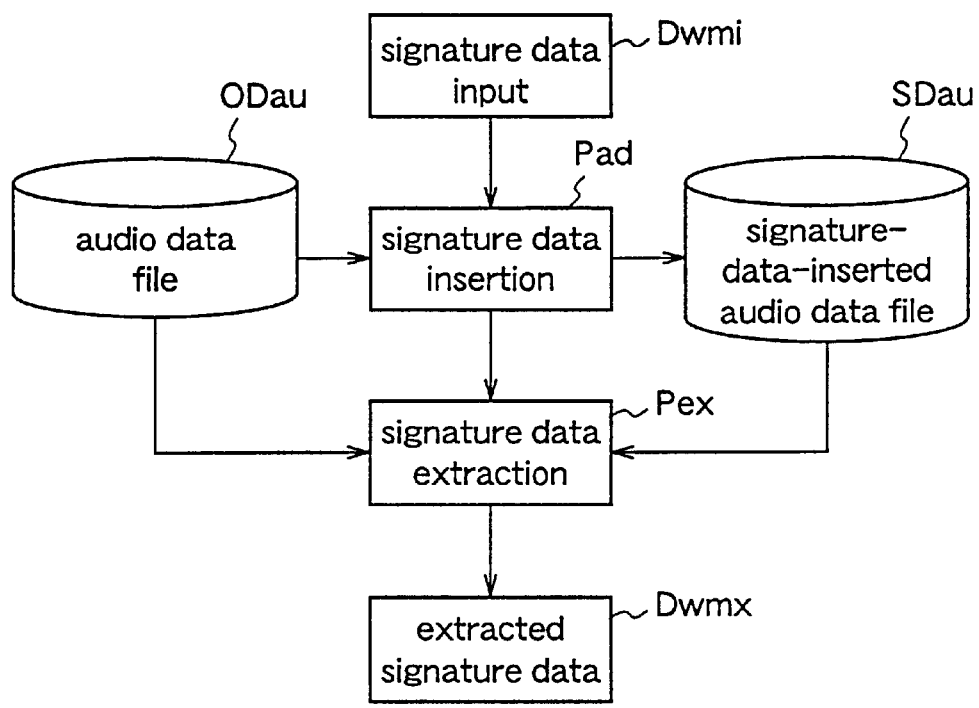
FIG. 19 is a diagram conceptually illustrating an information embedding process and an information extraction process in/from digital audio data.
Figure 20:
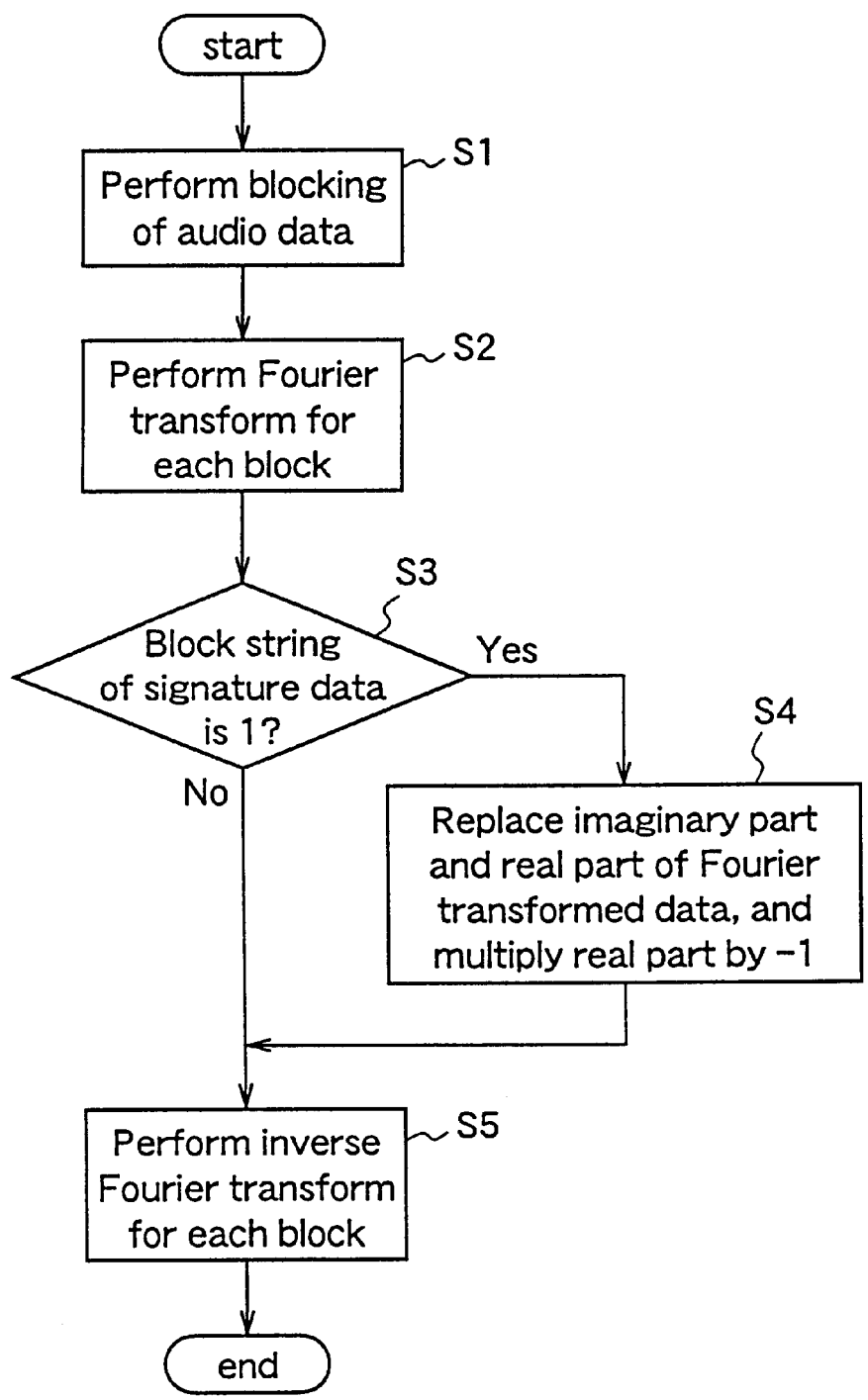
FIG. 20 is a flowchart of the information embedding process.
Figure 21:
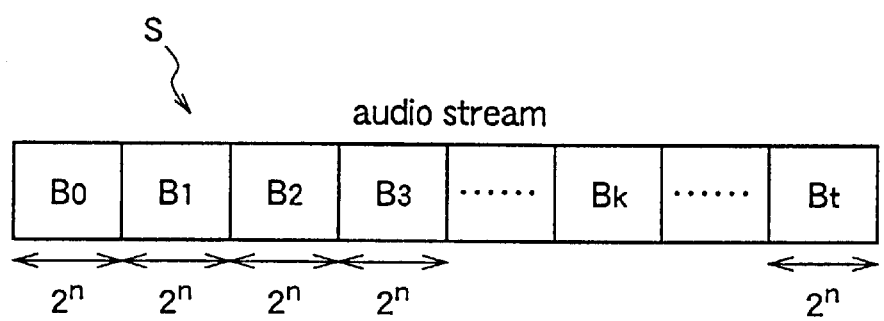
FIG. 21 is a diagram for explaining blocking of audio data in the information embedding process.
Figure 22:
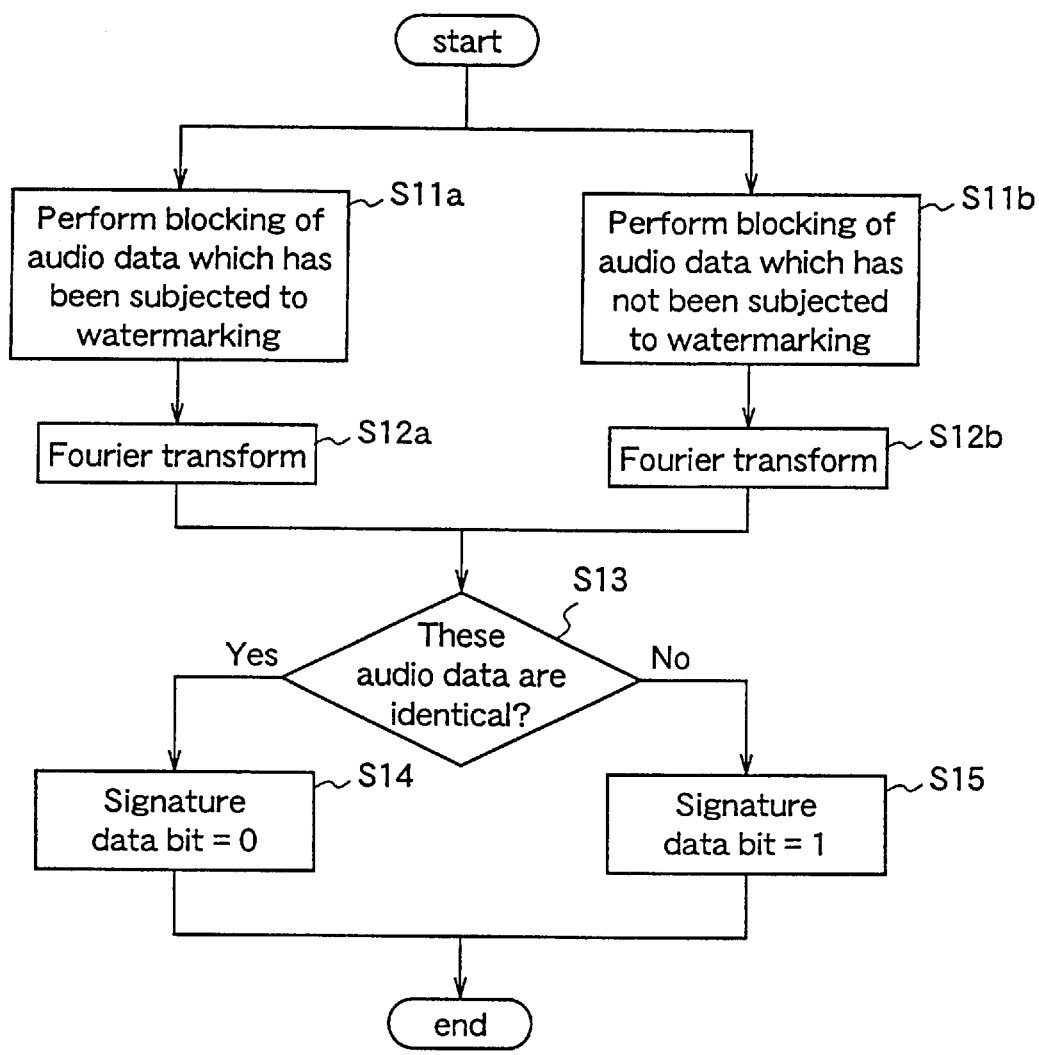
FIG. 22 is a flowchart of the information extraction process.

FIG. 17 is a block diagram for explaining a data processing apparatus 170 according to a seventh embodiment of the present invention.

This data processing apparatus 170 includes a removal unit 173 for removing embedded information from distributed audio data, in addition to the constituents of the data processing apparatus 120 according to the second embodiment.

(Construction of Data Processing Apparatus)

The data processing apparatus 170 of this seventh embodiment includes a data obtaining unit 171, an extraction unit 172, and a removal unit 173. The data obtaining unit 121 obtains, from a network signal Sn on a network N, information-embedded digital audio data (distributed audio data) Dau as input digital audio data, and audio data attribute information which is transmitted together with the distributed audio data Dau. The extraction unit 172 extracts the embedded information from the digital audio data Dau according to a control signal. The removal unit 173 removes the embedded information from the digital audio data Dau according to a control signal.

The data obtaining unit 171 comprises a network interface 171a which exchanges the network signal Sn with the network N, and a received signal decoder 171b which decodes the network signal sn supplied from the interface 171a, thereby generating the information-embedded digital audio data Dau and the audio data attribute information. Further, the extraction unit 172 comprises a method 1 extractor 172a1, a method 2 extractor 172a2, . . . , a method n extractor 172an corresponding to the above-described watermarking methods (1), (2), . . . , (n), respectively. In the extraction unit 172, the embedded information is extracted from the information-embedded digital audio data Dau by a desired extractor in accordance with a control signal. These method extractors are identical to those described for the second embodiment.

Further, the removal unit 173 comprises a method 1 remover 173a1, a method 2 remover 173a2, . . . , a method n remover 173an which corresponds to the above-described watermarking methods (1), (2), . . . , (n), respectively. In the removal unit 173, the embedded information is removed from the information-embedded digital audio data Dau by a desired remover according to a control signal.

For example, the method 1 remover 173a1 removes the embedded information from the digital audio data Dau by the watermarking method (1). The method 2 remover 173a2 removes the embedded information from the digital audio data Dau by the watermarking method (2). The method n remover 173an removes the embedded information from the digital audio audio data Dau by the watermarking method (n).

Further, the data processing apparatus 170 includes an insertion unit 174 and a recording unit 176. The insertion unit 174 embeds the extracted information again in the information-removed digital data by using a predetermined watermarking method employed in reproduction apparatuses as domestic electrical equipment, thereby generating output digital data. The recording unit 176 stores the output digital data.

Further, the data processing apparatus 170 includes a reproduction unit 175 and a control unit 177. The reproduction unit 175 reproduces the information-removed digital audio data from the removal unit 173, according to a control signal. The control unit 177 controls the respective units 171~176 by using the corresponding control signals. The reproduction unit 175 comprises an audio decoder 175a which converts the information-embedded digital data Dau to an audio signal, and a speaker 175b which converts the audio signal to sound. Further, the control unit 177 comprises a CPU which performs various kinds of arithmetic processing and data processing, and a RAM (Random Access Memory) which stores the operation program of the CPU, thereby controlling the operations of the respective units 171~176. The RAM also serves as an execution memory for temporarily storing the audio data or the audio data attribute information.

To be specific, the control unit 177 decides the value of each method use status information in accordance with the used watermarking method information which is included in the audio data attribute information obtained by the data obtaining unit 171, and controls the process of extracting or removing the embedded information by the method extractor or the method remover corresponding to each watermarking method, in accordance with the result of the decision. Further, the control unit 177 controls the process of reproducing the audio data by the reproduction unit 177, in accordance with the reproduction permission information included in the extracted information. To be specific, when the values of the reproduction permission information included in all of the method use status information constituting the used watermarking method information are "1", the control unit 177 permits the reproduction unit 175 to reproduce the audio data, and controls the reproduction unit 175 so that it reproduces the audio data.

Further, in the data processing apparatus 170, the respective units are connected with each other by a data bus Dbus, and the control unit 177 controls not only the extraction unit 172, the removal unit 173, and the reproduction unit 175 but also the data obtaining unit 171, the insertion unit 174, and the recording unit 176.

Further, the extraction unit 172, the insertion unit 174, and the removal unit 173 are implemented by custom LSIs, respectively. The recording unit 176 is implemented by a DVD-RAM drive, wherein the output digital audio data is recorded in a DVD-RAM disk.

Hereinafter, a description will be given of the operation of the data processing apparatus 170.

(Acquisition of Audio Data Dau and Its Attribute Information Dpr)

When a network signal Sn supplied from the network N through the network cable is received by the network interface 171a of the data obtaining unit 171, the received network signal Sn is output to the received signal decoder 171b. The signal decoder 171b decodes the network signal Sn to generate the information-embedded digital audio data Dau and the audio data attribute information Dpr which follows the audio data Dau.

The audio data Dau so obtained is sent to the extraction unit 172 and the removal unit 173 through the data bus Dbus, while the audio data attribute information Dpr is sent to the control unit 177 through the data bus Dbus. In the control unit 177, the audio data attribute information Dpr is temporarily stored in the RAM serving as an execution memory.

(Extraction of Embedded Information)

The control unit 177 controls the extraction unit 172 by a control signal, in accordance with the used watermarking method information included in the audio data attribute information Dpr. That is, according to the value of each of the method use status information included in the used watermarking method information, the control unit 177 outputs a control signal to the corresponding method extractor.

To be specific, as described for the second embodiment, in the control unit 177, the process of supplying a control signal to the corresponding method extractor according to the value of the method use status data is performed for each of the plural pieces of method use status information (method 1 use status information–method n use status information) which may be used at the distribution end, and accordingly, each method extractor extracts the embedded information from the input audio data Dau in response to the control signal from the control unit 177. Thereby, plural pieces of embedded information are extracted.

(Removal of Embedded Information)

The control unit 177 controls the removal unit 173 by a control signal, according to the used watermarking method information included in the audio data attribute information Dpr. That is, according to the value of each method use status information included in the used watermarking method information, the control unit 177 outputs a control signal to the corresponding method remover.

To be specific, in the control unit 177, initially, the value of the method 1 use status information in the used watermarking method information is referred to. When the value of the method 1 use status information is "1", the control unit 177 outputs a control signal which instructs the method 1 remover 173a1 in the removal unit 173 to remove the embedded information from the input audio data Dau by using the watermarking method (1). Thereby, in the method 1 remover 173a1, the information which has been embedded by the watermarking method (1) is removed from the audio data Dau by the watermarking method (1). On the other hand, when the value of the method 1 use status data is "0", the control unit 177 does not output a control signal which instructs removal of the embedded information from the input audio data Dau, to the method 1 remover 173a1.

Next, in the control unit 177, the value of the method 2 use status information in the used watermarking method information is referred to. When the value of the method 2 use status information is "1", the control unit 177 outputs a control signal which instructs the method 2 remover 173a2 in the removal unit 173 to remove the embedded information from the input audio data Dau by using the watermarking method (2). Thereby, in the method 2 remover 173a2, the information which has been embedded by the watermarking method (2) is removed from the audio data Dau by the watermarking method (2). On the other hand, when the value of the method 2 use status data is "0", the control unit 177 does not output a control signal which instructs removal of the embedded information from the input audio data Dau, to the method 1 remover 173a2.

In this way, in the control unit 177, the process of supplying a control signal to the corresponding method remover according to the value of the method use status data is performed for each of the plural pieces of method use status information (method 1 use status information–method n use status information) which may be used at the distribution end, and accordingly, each method remover removes the embedded information from the input audio data Dau in response to the control signal from the control unit 177.

(Reproduction of Audio Data Dau)

Thereafter, the control unit 177 decides the values of the reproduction permission information included in all of the information obtained by the above-described information extraction process. According to the result of the decision, the control unit 177 outputs a control signal indicating whether the input digital audio data Dau is to be reproduced or not, to the reproduction unit 175.

To be specific, when the values of the reproduction permission information included in all of the method use status information constituting the used watermarking method information are "1", the control unit 177 permits the reproduction unit 175 to reproduce the audio data Dau. Then, under control of the control unit 177, the audio data Dau is transmitted from the removal unit 173 through the data bus Dbus to the reproduction unit 175. In the reproduction unit 175, the received audio data Dau is decoded by the audio decoder 175a to be converted to an audio signal, and sound corresponding to this audio signal is output from the speaker 175b.

(Re-embedding of Information)

Further, in the data processing apparatus 170, independently of the process of reproducing the audio data Dau from the removal unit 173, the information (embedded information) extracted from the audio data Dau is again embedded in the audio data Dau from the removal unit 173 by a predetermined watermarking method. The predetermined watermarking method is a watermarking method employed in reproduction apparatuses as domestic electrical equipment.

In the control unit 177, as described above, the watermarking method which has been used for embedding information in the target audio data at the distribution end is decided according to the value of each method use status information included in the used watermarking method information, and according to the result of this decision, the information embedded by the corresponding watermarking method is supplied to the insertion unit 174. In the insertion unit 124, the information supplied from the control unit 177 is again embedded in the audio data supplied from the removal unit 173, by the predetermined watermarking method, thereby generating output digital audio data.

(Recording of Output Digital Audio Data)

The output digital audio data generated in the insertion unit 174 is supplied to the recording unit 176 and recorded in a recording medium according to a control signal from the control unit 177. The recording unit 176 is implemented by a DVD-RAM drive, and the output digital audio data is stored in a DVD-RAM disk.

In this seventh embodiment, the control unit 177 permits the reproduction unit 175 to reproduce the audio data Dau only when the values of the reproduction permission information included in all of the method use status information constituting the used watermarking method information are "1". However, the condition under which the control unit 177 permits the reproduction unit 175 to reproduce the audio data Dau is not restricted thereto.

For example, reproduction of the audio data Dau may be permitted when the value of at least one piece of reproduction permission information included in the method use status information is "1".

Alternatively, whether reproduction of the audio data Dau is to be permitted or not may be decided as follows. That is, a weighting factor is set for each of the method use status information constituting the used watermarking method information, and the product of this weighting factor and the value of the reproduction permission information included in each method use status information is obtained, and then the products obtained for all of the method use status information are summed up. According to whether this sum exceeds a predetermined threshold or not, reproduction of the audio data Dau is permitted.

As described above, according to the seventh embodiment of the present invention, the data processing apparatus 170 is provided with the data obtaining unit 171 which receives a network signal from the network N and obtains the information-embedded digital audio data Dau and the audio data attribute information Dpr. Extraction and removal of the embedded information from the audio data Dau are performed according to the method use status information included as the used watermarking method information in the audio data attribute information Dpr, and reproduction of processed audio data is controlled in accordance with each embedded information. Therefore, in the data processing apparatus 170 receiving the audio data Dau, reproduction of the audio data Dau can be correctly controlled according to the embedded information which has been embedded in the audio data Dau by various watermarking methods at the distribution end.

Furthermore, the embedded information in the distributed audio data is again embedded in the processed audio data obtained by removing the embedded information from the distributed audio data, by using a predetermined watermarking method. Therefore, even in a reproduction apparatus as a domestic equipment which employs the predetermined watermarking method, reproduction of the distributed audio data recorded on the recording medium can be controlled according to the embedded information. Furthermore, the quantity of the embedded information in the distributed audio data recorded on the recording medium can be reduced as compared with that of the second embodiment, whereby degradation of sound quality due to the embedded information can be reduced when reproducing the distributed audio data recorded on the recording medium.

While in this seventh embodiment the reproduction unit 175 reproduces the processed audio data, it may reproduces the output audio data which is obtained by embedding the information (embedded information) extracted by the extraction unit 172 again in the processed audio data.

In this seventh embodiment, the information-embedded digital data may be obtained by embedding plural pieces of relevant information in the supply digital data by using a plurality of watermarking methods, and the insertion unit may embed a predetermined number of relevant information amongst the plural pieces of relevant information, in the input digital data, by using the corresponding watermarking methods amongst the plural watermarking methods or using a watermarking method which is different from these watermarking methods, thereby generating the output digital data.

What is claimed is:

1. A data processing apparatus for receiving various kinds of information-embedded digital data which correspond to different watermarking methods and have been obtained by embedding relevant information in supply digital data to be supplied from the distribution end to the user, and processing these information-embedded digital data, said apparatus comprising:

a data obtaining unit for obtaining a desired information-embedded digital data as input digital data;

a method information obtaining unit for obtaining used method information which corresponds to the input digital data and indicates the watermarking method used for the process of embedding the relevant information;

an information extraction unit for extracting the relevant information from the input digital data by using the used watermarking method, in accordance with the used method information which has been obtained; and an information embedding unit for embedding the extracted relevant information or processed information obtained by processing the relevant information, in the input digital data or in processed digital data obtained by subjecting the input digital data to a predetermined data processing, by using a predetermined watermarking method.

2. The data processing apparatus of claim 1 wherein said relevant information embedded in the information-embedded digital data is information relating to the copyright holder of the supply digital data.

3. The data processing apparatus of claim 1 wherein said information embedding unit embeds the relevant information or the processed information in the input digital data by using the predetermined watermarking method, thereby generating output digital data.

4. The data processing apparatus of claim 3 further comprising a data reproduction unit for reproducing the output digital data.

5. The data processing apparatus of claim 3 further comprising a data recording unit for recording the output digital data.

6. The data processing apparatus of claim 1 further comprising:

an information removal unit for removing the relevant information from the input digital data in accordance with the used method information obtained by the method information obtaining unit, thereby generating information-removed digital data as the processed digital data; and said information embedding unit embedding the relevant information or the processed information in the information-removed digital data by using the predetermined watermarking method, thereby generating output digital data.

7. The data processing apparatus of claim 6 further comprising a data reproduction unit for reproducing the output digital data.

8. The data processing apparatus of claim 6 further comprising a data recording unit for recording the output digital data.

9. The data processing apparatus of claim 1 wherein:

said information-embedded digital data comprises a first data portion of a fixed length and a second data portion of a variable length;

the used method information indicating the used watermarking method is embedded in the first data portion by the used watermarking method; and said method information obtaining unit obtains the used method information indicating the used watermarking method, from the first data portion of the input digital data.

10. The data processing apparatus of claim 1 wherein:

said information-embedded digital data has a data structure including a plurality of data packets;

the used method information indicating the used watermarking method is included in a header of a predetermined data packet amongst the plural data packets; and said method information obtaining unit obtains the used method information indicating the used watermarking method from the header of the predetermined data packet of the information-embedded digital data.

11. The data processing apparatus of claim 1 wherein:

said information-embedded digital data is followed by an auxiliary data portion;

the used method information indicating the used watermarking method is included in the auxiliary data portion; and said method information obtaining unit obtains the used method information indicating the used watermarking method from the auxiliary data portion which follows the information-embedded digital data.

12. The data processing apparatus of claim 1 wherein:
said data obtaining unit is able to obtain the information-embedded digital data from at least one of plural data recording media and plural data transmission paths; and
said method information obtaining unit decides the used watermarking method in accordance with any of the data recording media and the data transmission paths from which the information-embedded digital data has been obtained, and obtains the used method information corresponding to the result of the decision.

13. The data processing apparatus of claim 1 wherein said information-embedded digital data is multiplexed digital data obtained by multiplexing audio digital data, or video digital data, or audio digital data and video digital data.

14. The data processing apparatus of claim 1 wherein said data obtaining unit has an antenna for receiving a broadcast wave from a broadcasting station, and a received-wave decoder for demodulating the wave received by the antenna to output the information-embedded digital data.

15. The data processing apparatus of claim 1 wherein said data obtaining unit has a data reading unit for reading the information-embedded digital data stored in a bulk memory, from the bulk memory.

16. The data processing apparatus of claim 15 wherein said data reading unit has an access unit for reading the information-embedded digital data from DVD-ROM, DVD-RAM, or semiconductor recording media.

17. The data processing apparatus of claim 1 wherein:
said information-embedded digital data is obtained by embedding plural pieces of relevant information in the supply digital data by using plural watermarking methods;
plural pieces of used method information corresponding to the plural watermarking methods are included in the information-embedded digital data, as the used method information indicating the used watermarking method; and
said information extracting unit is able to extract the relevant information corresponding to each of the plural watermarking methods from the input digital data, according to the used method information corresponding to the plural watermarking methods.

18. The data processing apparatus of claim 1 wherein:
said information-embedded digital data is obtained by embedding plural pieces of relevant information in the supply digital data by using plural watermarking methods; and
said information embedding unit embeds a predetermined one of the plural pieces of relevant information in the input digital data by using the predetermined watermarking method, thereby generating output digital data.

19. The data processing apparatus of claim 1 wherein:
said information-embedded digital data is obtained by embedding plural pieces of relevant information in the supply digital data by using plural watermarking methods; and
said information embedding unit embeds a predetermined number of relevant information amongst the plural pieces of relevant information, in the input digital data, by using the corresponding watermarking methods amongst the plural watermarking methods or a watermarking method different from the plural watermarking methods, thereby generating output digital data.

20. The data processing apparatus of claim 6 wherein:
said information-embedded digital data is obtained by embedding plural pieces of relevant information in the supply digital data by using plural watermarking methods; and
said information embedding unit embeds a predetermined one of the plural pieces of relevant information in the processed digital data by using the predetermined watermarking method, thereby generating output digital data.

21. The data processing apparatus of claim 6 wherein:
said information-embedded digital data is obtained by embedding plural pieces of relevant information in the supply digital data by using plural watermarking methods; and
said information embedding unit embeds a predetermined number of relevant information amongst the plural pieces of relevant information, in the processed digital data, by using the corresponding watermarking methods amongst the plural watermarking methods or a watermarking method different from the plural watermarking method, thereby generating output digital data.

22. A data recording medium in which information-embedded digital data is recorded, said information-embedded digital data being obtained by embedding relevant information in supply digital data to be supplied from the distribution end to the user, wherein:
the information-embedded digital data is composed of a first data portion having a fixed length and a second data portion having a variable length;
used method information indicating the watermarking method used for embedding the relevant information in the supply digital data is embedded in a first data portion;
the relevant information is embedded in the second data portion by the used watermarking method indicated by the used method information; and
the relevant information can be extracted or removed from the second data portion by using a watermarking method, according to the used method information.

23. The data recording medium of claim 22 wherein the used method information is embedded in the first data portion of the information-embedded digital data by a predetermined watermarking method.

24. The data recording medium of claim 22 wherein plural pieces of used method information indicating different used watermarking methods, which have been used for embedding the relevant information in the supply digital data, are embedded in the first data portion of the information-embedded digital data.

25. A data recording medium in which information-embedded digital data and used method information are recorded, said information-embedded digital data being obtained by embedding relevant information in supply digital data to be supplied from the distribution end to the user, and said used method information indicating the watermarking method used for embedding the relevant information in the supply digital data, and following the information-embedded digital data, wherein:
said information-embedded digital data has a data structure in which the relevant information can be extracted or removed by using an appropriate watermarking method, according to a used method information.

26. The data recording medium of claim 25 wherein plural pieces of used method information indicating different watermarking methods, which have been used for embedding the relevant information in the supply digital data, are recorded as the used method information.

* * * * *

UNITED STATES PATENT AND TRADEMARK OFFICE
CERTIFICATE OF CORRECTION

PATENT NO.    : 6,529,506 B1
DATED         : March 4, 2003
INVENTOR(S)   : Masaya Yamamoto et al.

It is certified that error appears in the above-identified patent and that said Letters Patent is hereby corrected as shown below:

<u>Title page,</u>
Item [56], OTHER PUBLICATIONS, change the title of the third document form "Adaptive Waterarking" to -- Adaptive Watermarking --.

<u>Column 14,</u>
Line 34, change "I rm1" to -- I rm --.

<u>Column 60,</u>
Line 27, change "the" to -- a --.
Line 29, chage "in a first" to -- in the first --.
Line 35, change "a watermarking" to -- a predetermined watermarking --.
Line 52, change "the watermarking" to -- a watermarking --.
Line 58, change "an appropiate watermarking" to -- a predetermined watermarking --.

Signed and Sealed this

Ninth Day of September, 2003

JAMES E. ROGAN
*Director of the United States Patent and Trademark Office*